(12) United States Patent
El Asmar et al.

(10) Patent No.: US 12,554,609 B2
(45) Date of Patent: Feb. 17, 2026

(54) DEVICES, METHODS, AND GRAPHICAL USER INTERFACES FOR PROVIDING ENVIRONMENT TRACKING CONTENT

(71) Applicant: Apple Inc., Cupertino, CA (US)

(72) Inventors: Karen El Asmar, San Francisco, CA (US); Christopher D. Mckenzie, Burlingame, CA (US); Kaely Coon, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/590,872

(22) Filed: Feb. 28, 2024

(65) Prior Publication Data

US 2024/0370344 A1 Nov. 7, 2024

Related U.S. Application Data

(60) Provisional application No. 63/470,529, filed on Jun. 2, 2023, provisional application No. 63/464,518, filed on May 5, 2023.

(51) Int. Cl.
*G06F 11/30* (2006.01)
*G06T 19/00* (2011.01)

(52) U.S. Cl.
CPC ........ *G06F 11/3003* (2013.01); *G06T 19/006* (2013.01)

(58) Field of Classification Search
CPC ...... G06F 11/3003; G06F 3/017; G06F 3/011; G06T 19/006
See application file for complete search history.

(56) References Cited

U.S. PATENT DOCUMENTS

| | | |
|---|---|---|
| 2014/0063060 A1 | 3/2014 | Maciocci et al. |
| 2014/0347391 A1 | 11/2014 | Keane et al. |
| 2022/0319128 A1 | 10/2022 | Bazin et al. |
| 2023/0137484 A1* | 5/2023 | Morgan .................. G06T 13/20 345/633 |
| 2023/0137920 A1* | 5/2023 | Klein .................... G06F 3/0482 715/863 |
| 2024/0378100 A1* | 11/2024 | Thresh ................ G06F 11/0706 |
| 2024/0402795 A1* | 12/2024 | Klein .................. G06F 3/04883 |
| 2025/0005869 A1* | 1/2025 | Lal ........................ G06V 10/462 |
| 2025/0085771 A1* | 3/2025 | Jang ........................ G06F 3/011 |

OTHER PUBLICATIONS

MacIntyre, Blair and Enylton Machado Coelho, "Adapting to Dynamic Registration Errors Using Levvel of Error (LOE) Filtering," Graphics, Visualization and Usability Center, College of Computing, Georgia of Institute of Technology, 2000. (Year: 2000).*

(Continued)

*Primary Examiner* — Matthew Maskulinski
*Assistant Examiner* — Kayo Lisa Rusin
(74) *Attorney, Agent, or Firm* — YHE Law LLP

(57) ABSTRACT

The present disclosure generally relates to devices, methods, and graphical user interfaces for providing content that utilizes environment tracking, such as environment tracking of a physical environment.

45 Claims, 40 Drawing Sheets

(56) References Cited

OTHER PUBLICATIONS

S. DiVerdi and T. Höllerer, "Heads Up and Camera Down: A Vision-Based Tracking Modality for Mobile Mixed Reality," in IEEE Transactions on Visualization and Computer Graphics, vol. 14, No. 3, pp. 500-512, May-Jun. 2008, doi: 10.1109/TCVG.2008.26. (Year: 2008).*

Hollerer, Tobias et al, "Steps Toward Accommodating Variable Tracking Accuracy in a Mobile Augmented Reality System," Department of Computer Science, Columbia University, AIMS '01: Second Int. Workshop on Artificial Intelligence in Mobile Systems, 2001, pp. 31-37 (Year: 2001).*

Welch, Greg. "Motion Tracking: No Silver Bullet, but a Respectable Arsenal," Motion Tracking Survey. IEEE. 2002 (Year: 2002).*

Singh, Shubham et al. Real-time Collaboration Between Mixed Really Users in Geo-referenced Virtual Environment. International Symposium of Mixed and Augmented Reality Conference, IEEE, 2020 (Year: 2020).*

"UI elements," AR Core, Google for Developers. Captured by Wayback Machine on Jun. 18, 2021. Accessed on Apr. 24, 2025. https://web.archive.org/web/20230610090853/https://developers.google.com/ar/design/interaction/ui (Year: 2021).*

Hock et al., "CarVR: Enabling In-Car Virtual Reality Entertainment", Proceedings of the 2017 Chi Conference on Human Factors in Computing Systems, Chi '17, ACM Press, New York, New York, USA, Available online at: 10.1145/3025453.3025665, May 2, 2017, pp. 4034-4044.

International Search Report and Written Opinion received for PCT Patent Application No. PCT/US2024/027251, mailed on Sep. 23, 2024, 20 pages.

Invitation to Pay Additional Fees and Partial International Search Report received for PCT Patent Application No. PCT/US2024/027251, mailed on Aug. 1, 2024, 20 pages.

Jonas et al., "In-Car 6-DoF Mixed Reality for Rear-Seat and Co-Driver Entertainment", 2018 IEEE Conference on Virtual Reality and 3D User Interfaces (VR), Available online at: 10.1109/VR.2018.8446461, Mar. 18, 2018, pp. 757-758.

International Preliminary Report on Patentability received for PCT Patent Application No. PCT/US2024/027251, mailed on Nov. 20, 2025, 14 pages.

* cited by examiner

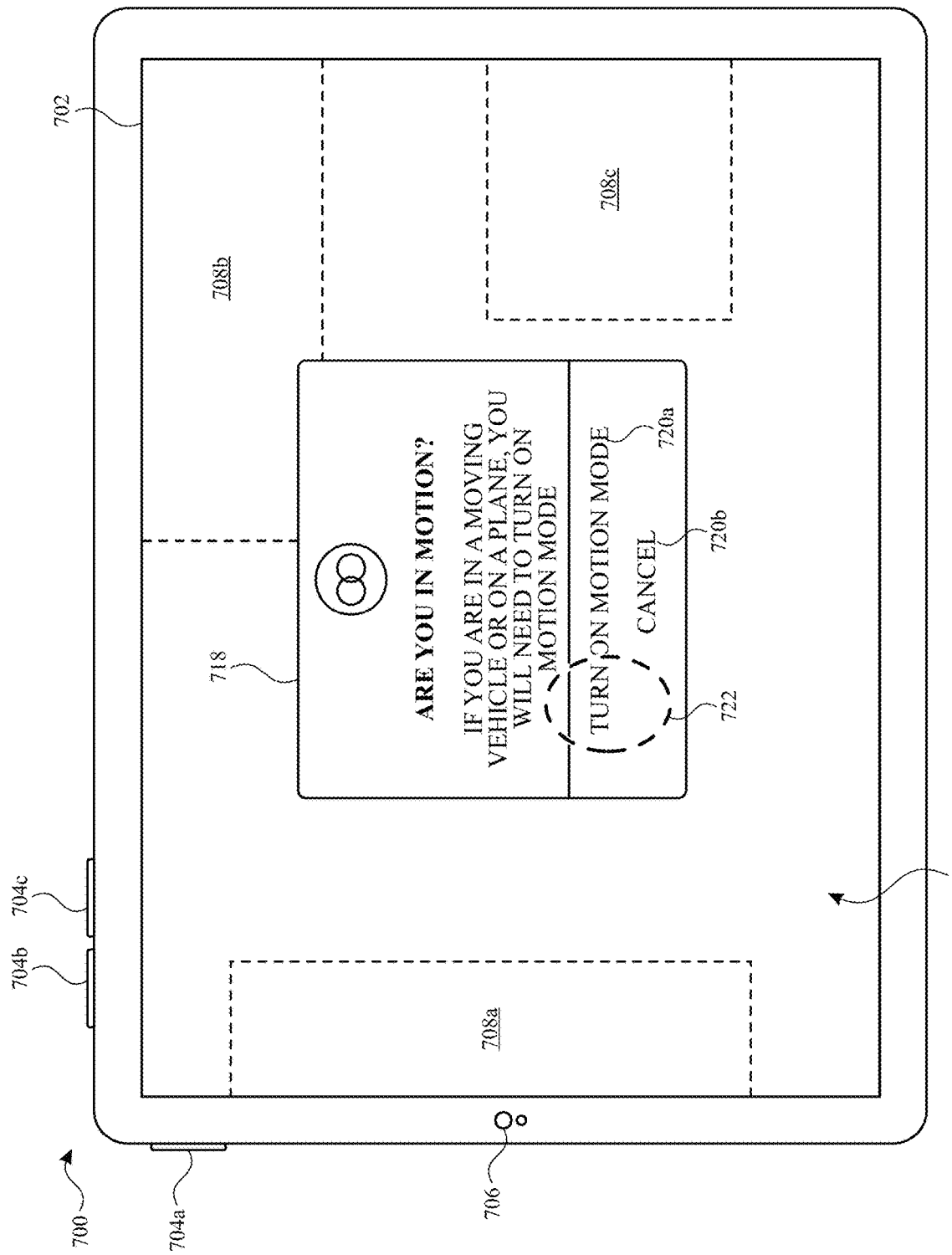
FIG. 7E1

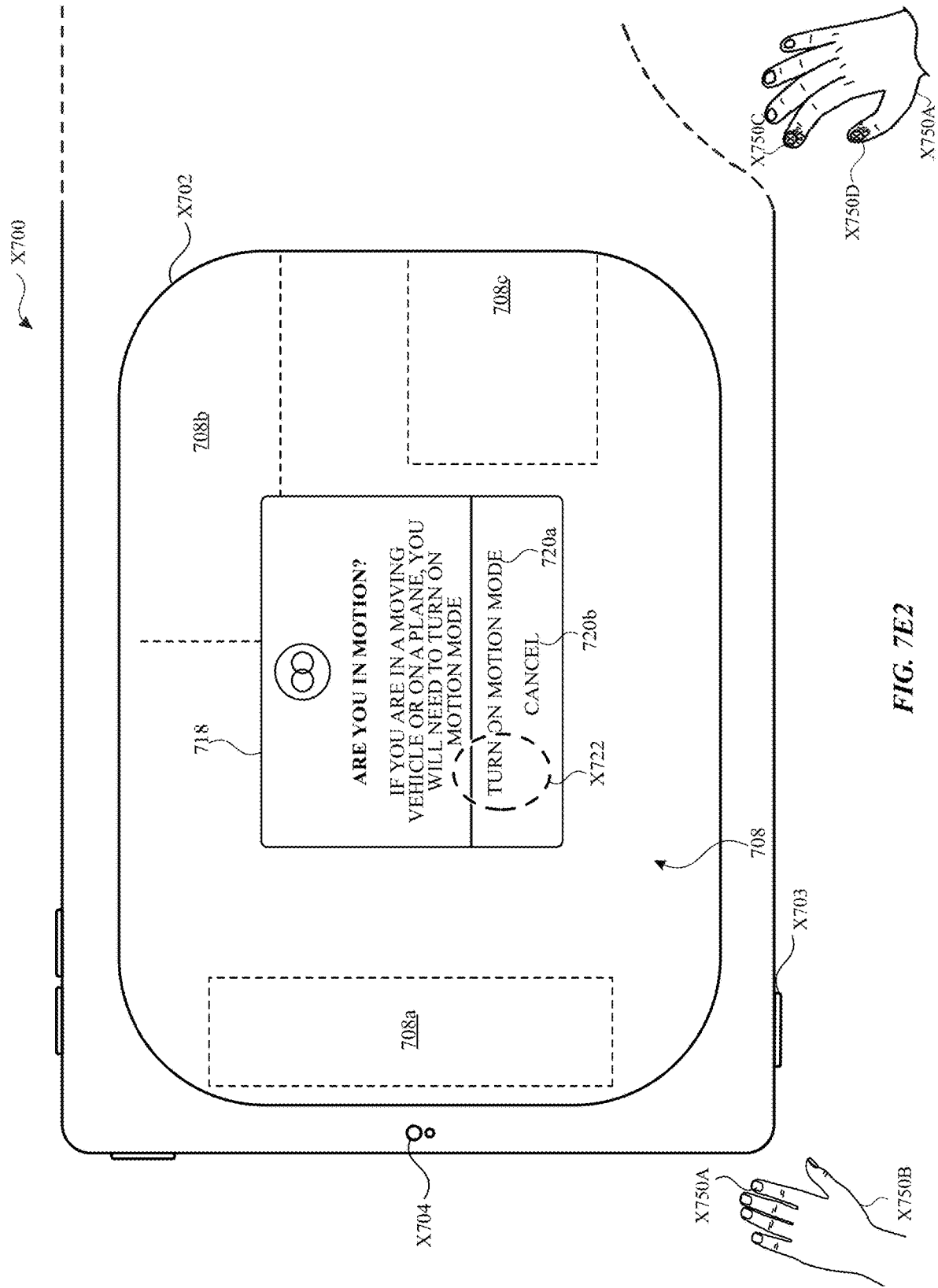
FIG. 7E2

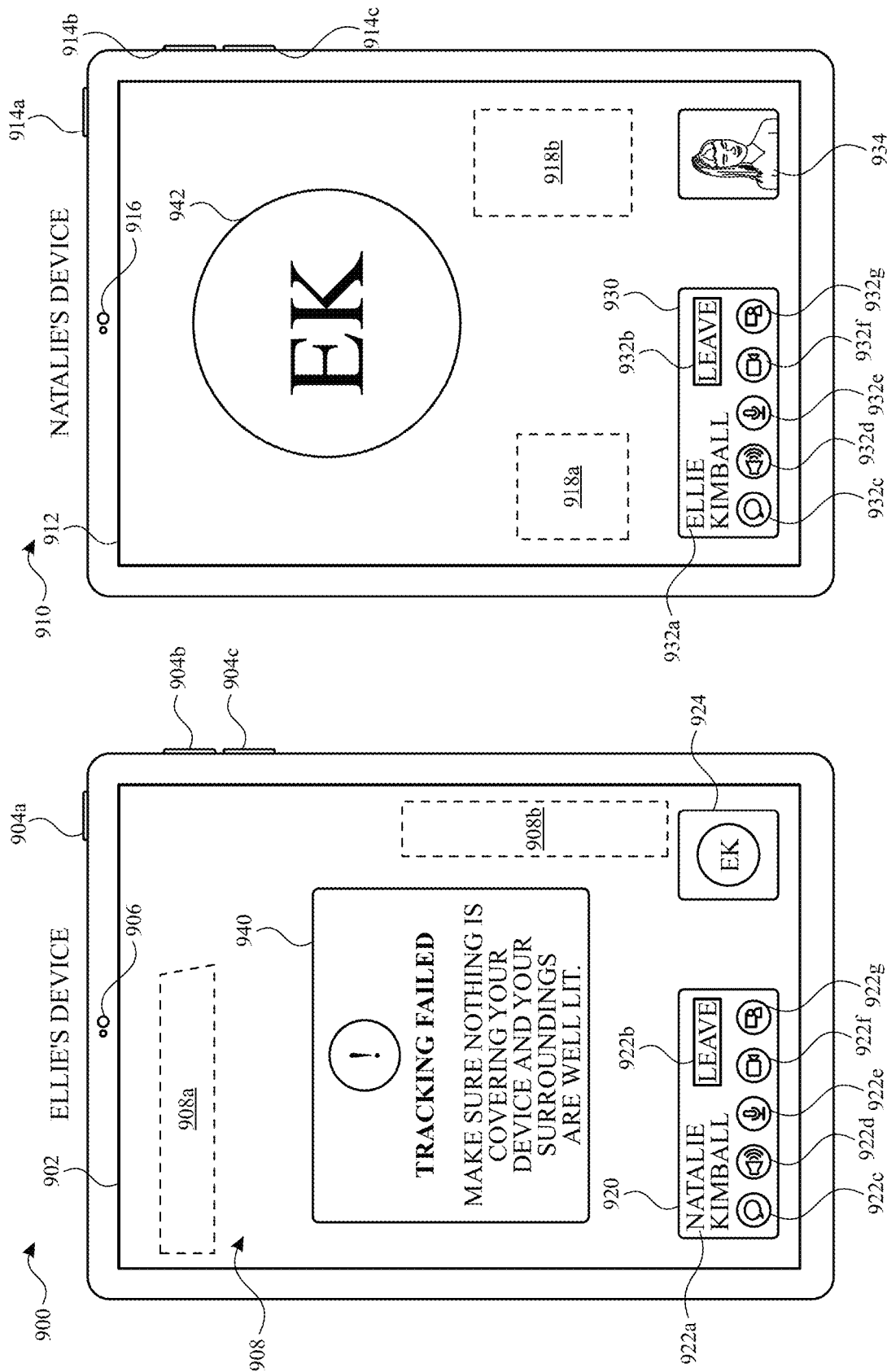
FIG. 9B1

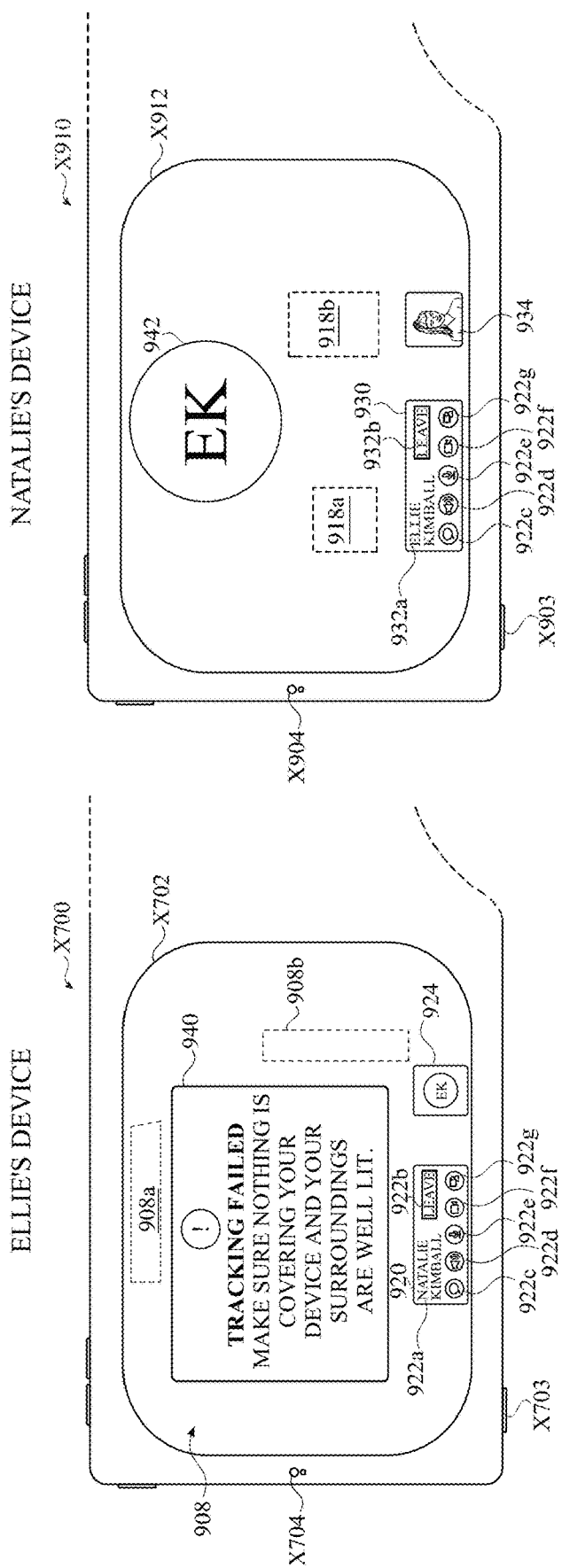
FIG. 9B2

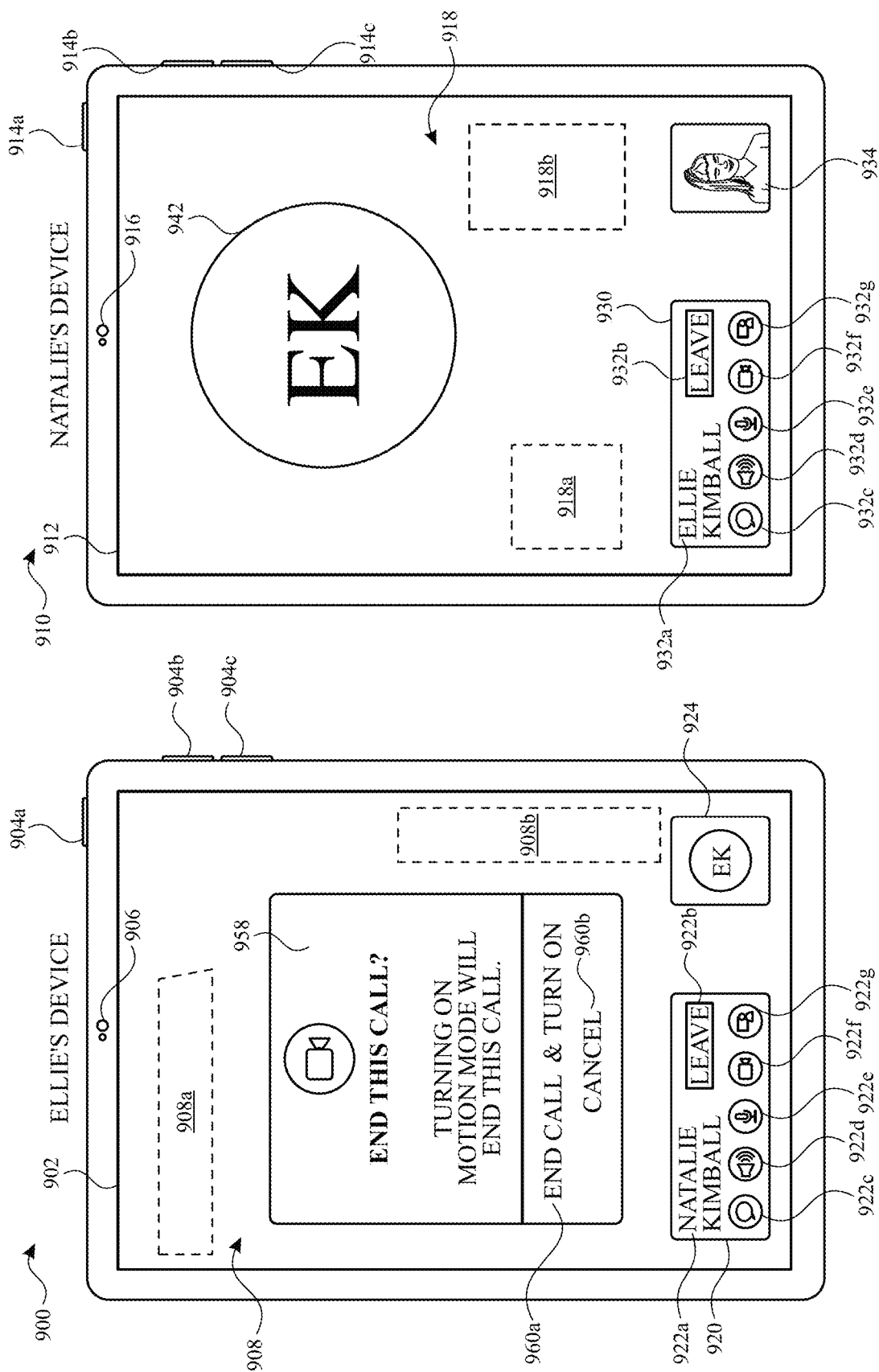

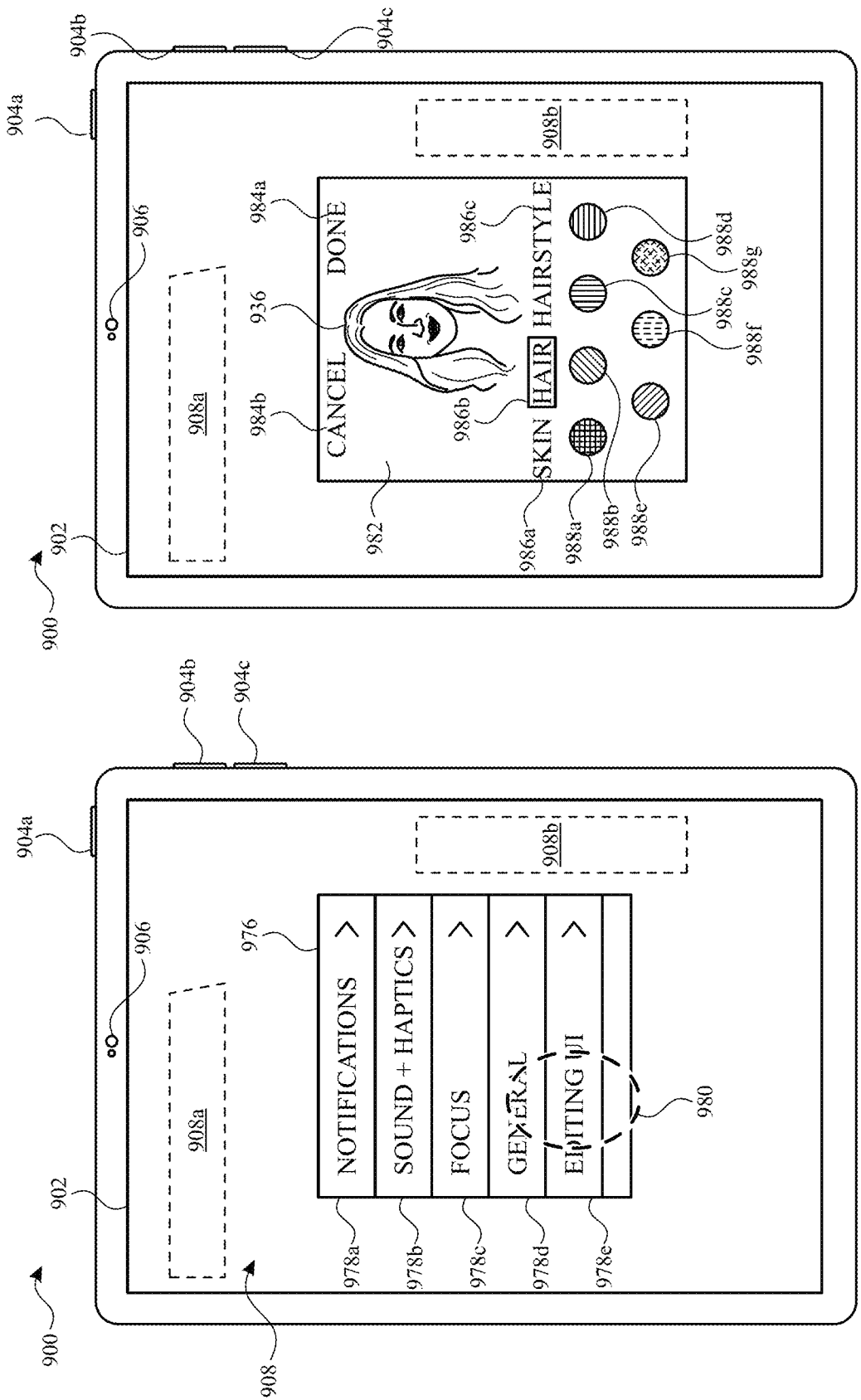

1000 ⇘

1002
Display, via the one or more display generation components, a real-time communication user interface that corresponds to a real-time communication session between a user of the computer system and one or more participants in the real-time communication session different from the user of the computer system, wherein the user of the computer system participates visually in the real-time communication session, including:

1004
Display, via the one or more display generation components and within the real-time communication user interface, a representation of a first participant of the one or more participants in the real-time communication session that moves based on detected movement of the first participant in a physical environment of the first participant.

1006
While displaying the real-time communication user interface:

1008
Detect, via the one or more input devices, one or more error conditions pertaining to environment tracking of a physical environment that surrounds the computer system.

1010
In response to detecting the one or more error conditions pertaining to the environment tracking of the physical environment that surrounds the computer system:

1012
Limit visual participation of the user of the computer system within the real-time communication session.

*FIG. 10*

DEVICES, METHODS, AND GRAPHICAL USER INTERFACES FOR PROVIDING ENVIRONMENT TRACKING CONTENT

This application claims priority to U.S. Provisional Patent Application No. 63/470,529, entitled "DEVICES, METHODS, AND GRAPHICAL USER INTERFACES FOR PROVIDING ENVIRONMENT TRACKING CONTENT," filed on Jun. 2, 2023, and U.S. Provisional Patent Application No. 63/464,518, entitled "DEVICES, METHODS, AND GRAPHICAL USER INTERFACES FOR PROVIDING ENVIRONMENT TRACKING CONTENT," filed on May 5, 2023, the contents of which are hereby incorporated by reference in their entirety for all purposes.

TECHNICAL FIELD

The present disclosure relates generally to computer systems that are in communication with a display generation component and, optionally, one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for providing content that utilizes environment tracking of a three-dimensional environment. Such methods and interfaces may complement or replace conventional methods for providing content that utilizes environment tracking of a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

In accordance with some embodiments, a method is described. The method comprises: at a computer system that is in communication with one or more display generation components and one or more input devices: displaying, via the one or more display generation components, visual content that utilizes environment tracking of a physical environment that surrounds the computer system; while displaying the visual content, detecting, via the one or more input devices, one or more error conditions pertaining to the environment tracking of the physical environment that surrounds the computer system; in response to detecting the one or more error conditions pertaining to the environment tracking of the physical environment that surrounds the computer system: ceasing display of the visual content; and in accordance with a determination that the one or more error conditions pertain to motion of the computer system, displaying, via the one or more display generation components, a first selectable option that is selectable to re-display the visual content while the one or more error conditions persist; while displaying the first selectable option and not displaying the visual content, receiving, via the one or more input devices, a user input corresponding to selection of the first selectable option; and in response to receiving the user input corresponding to selection of the first selectable option, re-displaying, via the one or more display generation components, the visual content while the one or more error conditions pertaining to motion of the computer system persist.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying, via the one or more display generation components, visual content that utilizes environment tracking of a physical environment that surrounds the computer system; while displaying the visual content, detecting, via the one or more input devices, one or more error conditions pertaining to the environment tracking of the physical environment that surrounds the computer system; in response to detecting the one or more error conditions pertaining to the environment tracking of the physical environment that surrounds the computer system: ceasing display of the visual content; and in accordance with a determination that the one or more error conditions pertain to motion of the computer system, displaying, via the one or more display generation components, a first selectable option that is selectable to re-display the visual content while the one or more error conditions persist; while displaying the first selectable option and not displaying the visual content, receiving, via the one or more input devices, a user input corresponding to selection of the first selectable option; and in response to receiving the user input corresponding to selection of the first selectable option, re-displaying, via the one or more display generation components, the visual content while the one or more error conditions pertaining to motion of the computer system persist.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying, via the one or more display generation components, visual content that utilizes environment tracking of a physical environment that surrounds the computer system; while displaying the visual content, detecting, via the one or more input devices, one or more error conditions pertaining to the environment tracking of the physical environment that surrounds the computer system; in response to detecting the one or more error conditions pertaining to the environment tracking of the physical environment that surrounds the computer system: ceasing display of the visual content; and in accordance with a determination that the one or more error conditions pertain to motion of the computer system, displaying, via the one or more display generation components, a first selectable option that is selectable to re-display the visual content while the one or more error conditions persist; while displaying the first selectable option and not displaying the visual content, receiving, via the one or more input devices, a user input corresponding to selection of the first selectable option; and in response to receiving the user input corresponding to selection of the first selectable option, re-displaying, via the one or more display generation components, the visual content while the one or more error conditions pertaining to motion of the computer system persist.

In accordance with some embodiments, a computer system is described. The computer system is configured to communicate with one or more display generation components and one or more input devices, and comprises: one or more processors; and memory storing one or more programs configured to be executed by the one or more processors, the one or more programs including instructions for: displaying, via the one or more display generation components, visual content that utilizes environment tracking of a physical environment that surrounds the computer system; while displaying the visual content, detecting, via the one or more input devices, one or more error conditions pertaining to the environment tracking of the physical environment that surrounds the computer system; in response to detecting the one or more error conditions pertaining to the environment tracking of the physical environment that surrounds the computer system: ceasing display of the visual content; and in accordance with a determination that the one or more error conditions pertain to motion of the computer system, displaying, via the one or more display generation components, a first selectable option that is selectable to re-display the visual content while the one or more error conditions persist; while displaying the first selectable option and not displaying the visual content, receiving, via the one or more input devices, a user input corresponding to selection of the first selectable option; and in response to receiving the user input corresponding to selection of the first selectable option, re-displaying, via the one or more display generation components, the visual content while the one or more error conditions pertaining to motion of the computer system persist.

In accordance with some embodiments, a computer system is described. The computer system is configured to communicate with one or more display generation components and one or more input devices, and comprises: means for displaying, via the one or more display generation components, visual content that utilizes environment tracking of a physical environment that surrounds the computer system; means for, while displaying the visual content, detecting, via the one or more input devices, one or more error conditions pertaining to the environment tracking of the physical environment that surrounds the computer system; means for, in response to detecting the one or more error conditions pertaining to the environment tracking of the physical environment that surrounds the computer system: ceasing display of the visual content; and in accordance with a determination that the one or more error conditions pertain to motion of the computer system, displaying, via the one or more display generation components, a first selectable option that is selectable to re-display the visual content while the one or more error conditions persist; means for, while displaying the first selectable option and not displaying the visual content, receiving, via the one or more input devices, a user input corresponding to selection of the first selectable option; and means for, in response to receiving the user input corresponding to selection of the first selectable option, re-displaying, via the one or more display generation components, the visual content while the one or more error conditions pertaining to motion of the computer system persist.

In accordance with some embodiments, a computer program product is described. The computer program product comprises one or more programs configured to be executed by one or more processors of a computer system that is in communication with one or more display generation components and one or more input devices, the one or more programs including instructions for: displaying, via the one or more display generation components, visual content that utilizes environment tracking of a physical environment that surrounds the computer system; while displaying the visual content, detecting, via the one or more input devices, one or more error conditions pertaining to the environment tracking of the physical environment that surrounds the computer system; in response to detecting the one or more error conditions pertaining to the environment tracking of the physical environment that surrounds the computer system: ceasing display of the visual content; and in accordance with a determination that the one or more error conditions pertain to motion of the computer system, displaying, via the one or more display generation components, a first selectable option that is selectable to re-display the visual content while the one or more error conditions persist; while displaying the first selectable option and not displaying the visual content, receiving, via the one or more input devices, a user input corresponding to selection of the first selectable option; and in response to receiving the user input corresponding to selection of the first selectable option, re-displaying, via the one or more display generation components, the visual content while the one or more error conditions pertaining to motion of the computer system persist.

In accordance with some embodiments, a method is described. The method comprises: at a computer system that is in communication with one or more display generation components and one or more input devices: displaying, via the one or more display generation components, a real-time communication user interface that corresponds to a real-time communication session between a user of the computer system and one or more participants in the real-time communication session different from the user of the computer system, wherein the user of the computer system participates visually in the real-time communication session, including: displaying, via the one or more display generation components and within the real-time communication user interface, a representation of a first participant of the one or more participants in the real-time communication session that moves based on detected movement of the first participant in a physical environment of the first participant; while displaying the real-time communication user interface, detecting, via the one or more input devices, one or more error conditions pertaining to environment tracking of a physical environment that surrounds the computer system; and in response to detecting the one or more error conditions pertaining to the environment tracking of the physical environment that surrounds the computer system, limiting visual participation of the user of the computer system within the real-time communication session.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying, via the one or more display generation components, a real-time communication user interface that corresponds to a real-time communication session between a user of the computer system and one or more participants in the real-time communication session different from the user of the computer system, wherein the user of the computer system participates visually in the real-time communication session, including: displaying, via the one or more display generation components and within the real-time communication user interface, a representation of a first participant of the one or more participants in the real-time communication session that moves based on detected movement of the first participant in a physical environment of the first participant; while displaying the real-time communication user interface, detecting, via the one or more input devices, one or more error conditions pertaining to environment tracking of a physical environment that surrounds the computer system; and in response to detecting the one or more error conditions pertaining to the environment tracking of the physical environment that surrounds the computer system, limiting visual participation of the user of the computer system within the real-time communication session.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying, via the one or more display generation components, a real-time communication user interface that corresponds to a real-time communication session between a user of the computer system and one or more participants in the real-time communication session different from the user of the computer system, wherein the user of the computer system participates visually in the real-time communication session, including: displaying, via the one or more display generation components and within the real-time communication user interface, a representation of a first participant of the one or more participants in the real-time communication session that moves based on detected movement of the first participant in a physical environment of the first participant; while displaying the real-time communication user interface, detecting, via the one or more input devices, one or more error conditions pertaining to environment tracking of a physical environment that surrounds the computer system; and in response to detecting the one or more error conditions pertaining to the environment tracking of the physical environment that surrounds the computer system, limiting visual participation of the user of the computer system within the real-time communication session.

In accordance with some embodiments, a computer system is described. The computer system is configured to communicate with one or more display generation components and one or more input devices, and comprises: one or more processors; and memory storing one or more programs configured to be executed by the one or more processors, the one or more programs including instructions for: displaying, via the one or more display generation components, a real-time communication user interface that corresponds to a real-time communication session between a user of the computer system and one or more participants in the real-time communication session different from the user of the computer system, wherein the user of the computer system participates visually in the real-time communication session, including: displaying, via the one or more display generation components and within the real-time communication user interface, a representation of a first participant of the one or more participants in the real-time communication session that moves based on detected movement of the first participant in a physical environment of the first participant; while displaying the real-time communication user interface, detecting, via the one or more input devices, one or more error conditions pertaining to environment tracking of a physical environment that surrounds the computer system; and in response to detecting the one or more error conditions pertaining to the environment tracking of the physical environment that surrounds the computer system, limiting visual participation of the user of the computer system within the real-time communication session.

In accordance with some embodiments, a computer system is described. The computer system is configured to communicate with one or more display generation components and one or more input devices, and comprises: means for displaying, via the one or more display generation components, a real-time communication user interface that corresponds to a real-time communication session between a user of the computer system and one or more participants in the real-time communication session different from the user of the computer system, wherein the user of the computer system participates visually in the real-time communication session, including: displaying, via the one or more display generation components and within the real-time communication user interface, a representation of a first participant of the one or more participants in the real-time communication session that moves based on detected movement of the first participant in a physical environment of the first participant; means for, while displaying the real-time communication user interface, detecting, via the one or more input devices, one or more error conditions pertaining to environment tracking of a physical environment that surrounds the computer system; and means for, in response to detecting the one or more error conditions pertaining to the environment tracking of the physical environment that surrounds the computer system, limiting visual participation of the user of the computer system within the real-time communication session.

In accordance with some embodiments, a computer program product is described. The computer program product comprises one or more programs configured to be executed by one or more processors of a computer system that is in communication with one or more display generation components and one or more input devices, the one or more programs including instructions for: displaying, via the one or more display generation components, a real-time communication user interface that corresponds to a real-time communication session between a user of the computer system and one or more participants in the real-time communication session different from the user of the computer system, wherein the user of the computer system participates visually in the real-time communication session, including: displaying, via the one or more display generation components and within the real-time communication user interface, a representation of a first participant of the one or more participants in the real-time communication session that moves based on detected movement of the first participant in a physical environment of the first participant; while displaying the real-time communication user interface, detecting, via the one or more input devices, one or more error conditions pertaining to environment tracking of a physical environment that surrounds the computer system; and in response to detecting the one or more error conditions pertaining to the environment tracking of the physical environment that surrounds the computer system, limiting visual participation of the user of the computer system within the real-time communication session.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7K illustrate example techniques for providing content that utilizes environment tracking, in some embodiments.

FIGS. 9A-9J illustrate example techniques for providing real-time communication content that utilizes environment tracking, in some embodiments.

FIG. 10 is a flow diagram of methods of providing real-time communication content that utilizes environment tracking, in some embodiments.

DESCRIPTION OF EMBODIMENTS

Figure 1A:
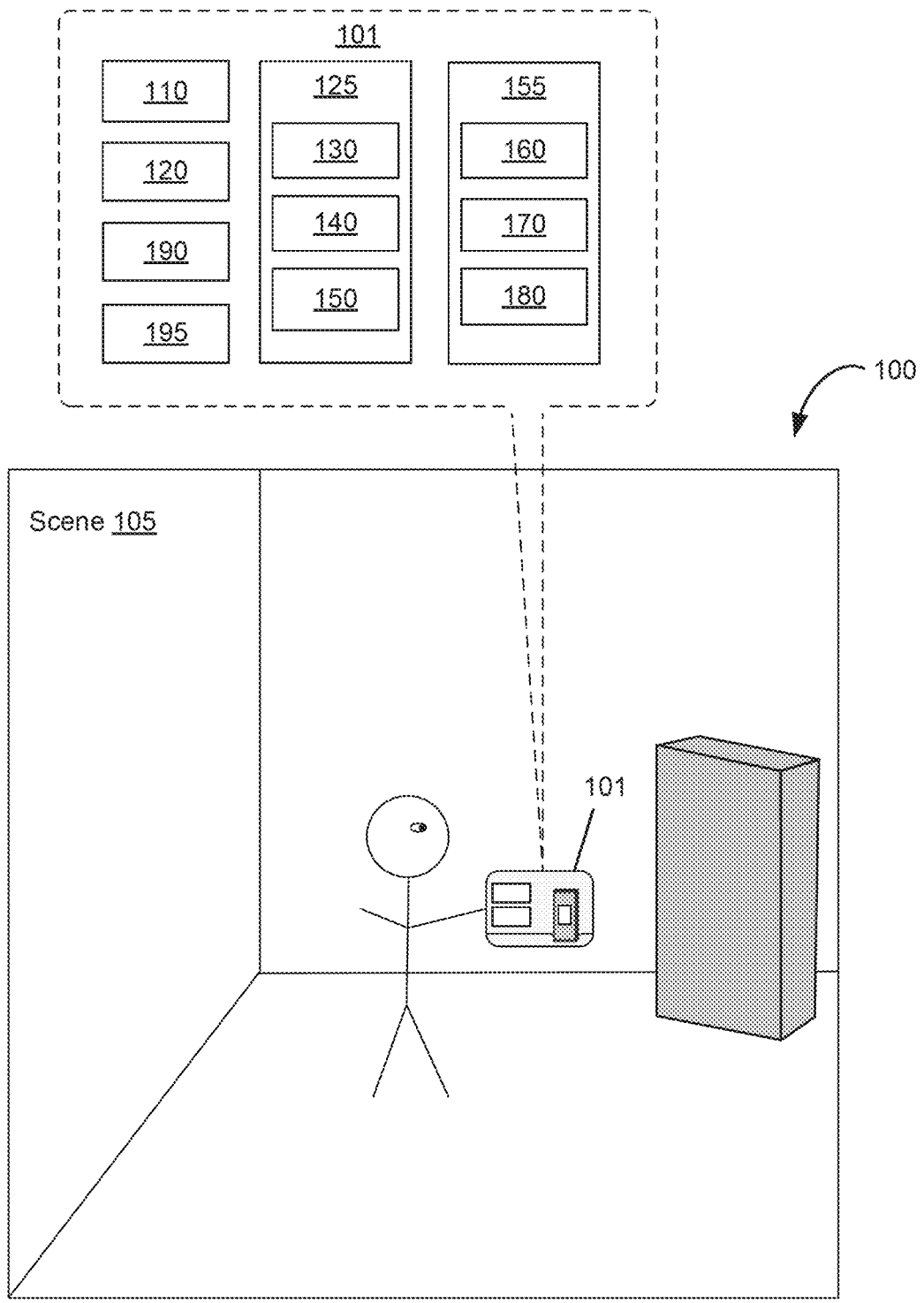
FIG. 1A is a block diagram illustrating an operating environment of a computer system for providing XR experiences in some embodiments.

The present disclosure relates to user interfaces for providing an extended reality (XR) experience to a user, in some embodiments.

The systems, methods, and GUIs described herein improve user interface interactions with virtual/augmented reality environments in multiple ways.

In some embodiments, a computer system displays visual content that utilizes environment tracking of a physical environment, such as a physical environment that surrounds and/or partially surrounds the computer system. While displaying the visual content, the computer system detects one or more error conditions pertaining to the environment tracking of the physical environment. For example, in some embodiments, the computer system is unable to track the environment due to poor lighting or other problematic conditions. In some embodiments, the computer system receives certain data indicating that the computer system is moving (e.g., accelerometer data, GPS data, and/or gyroscope data) within the physical environment, but receives other data that indicates that the computer is not moving within the physical environment (e.g., camera data, radar data, and/or lidar data indicating that the physical environment around the computer system is not changing and/or remains consistent). This may occur, for example, when the computer system is in a moving vehicle. In some embodiments, such inconsistent data satisfies the one or more error conditions. When the one or more error conditions pertain to environment tracking of the physical environment (e.g., poor lighting conditions or inability to track one or more objects in the physical environment), the computer system ceases display of the visual content. When the one or more error conditions pertain to motion of the computer system (e.g., certain data sensors indicating the computer system is in motion, and other data sensors indicating that the computer system is not in motion), the computer system allows for display of the visual content while the one or more error conditions persist.

In some embodiments, a computer system displays a real-time communication user interface that corresponds to a real-time communication session between a user of the computer system and one or more other participants. The user of the computer system participates visually in the real-time communication session, which, in some embodiments, includes the computer system displaying visual representations of one or more other participants in the real-time communication session that move based on detected movement of the other participants, and/or having a visual representation of the user of the computer system that moves based on detected movement by the user be displayed to the other participants. While displaying the real-time communication user interface, the computer system detects one or more error conditions pertaining to environment tracking of a physical environment (e.g., a physical environment that surrounds and/or partially surrounds the computer system). In response to detecting the one or more error conditions pertaining to environment tracking of the physical environment, the computer system limits visual participation of the user in the real-time communication session. In some embodiments, this includes, for example, ceasing to display the visual representations of the other participants in the real-time communication session on the computer system, ceasing display of movement of the visual representations of the other participants on the computer system, causing the other devices participating in the real-time communication session to cease display of the visual representation of the user, and/or causing the other devices participating in the real-time communication session to cease display of movement of the visual representation of the user.

In some embodiments, a computer system displays content in a first region of a user interface. In some embodiments, while the computer system is displaying the content and while a first set of controls are not displayed in a first state, the computer system detects a first input from a first portion of a user. In some embodiments, in response to detecting the first input, and in accordance with a determination that a gaze of the user is directed to a second region of the user interface when the first input is detected, the computer system displays, in the user interface, the first set of one or more controls in the first state, and in accordance with a determination that the gaze of the user is not directed to the second region of the user interface when the first input is detected, the computer system forgoes displaying the first set of one or more controls in the first state.

In some embodiments, a computer system displays content in a user interface. In some embodiments, while displaying the content, the computer system detects a first input based on movement of a first portion of a user of the computer system. In some embodiments, in response to detecting the first input, the computer system displays, in the user interface, a first set of one or more controls, where the first set of one or more controls are displayed in a first state and are displayed within a first region of the user interface. In some embodiments, while displaying the first set of one or more controls in the first state: in accordance with a determination that one or more first criteria are satisfied, including a criterion that is satisfied when attention of the user is directed to the first region of the user interface based on a movement of a second portion of the user that is different from the first portion of the user, the computer system transitions from displaying the first set of one or more controls in the first state to displaying a second set of one or more controls in a second state, where the second state is different from the first state.

FIGS. 1A-6 provide a description of example computer systems for providing XR experiences to users. FIGS. 7A-7K illustrate example techniques for providing content that utilizes environment tracking, in some embodiments. FIG. 8 is a flow diagram of methods of providing content that utilizes environment tracking, in some embodiments. The user interfaces in FIGS. 7A-7K are used to illustrate the processes in FIG. 8. FIGS. 9A-9J illustrate example techniques for providing real-time communication content that utilizes environment tracking, in some embodiments. FIG. 10 is a flow diagram of methods of providing real-time communication content that utilizes environment tracking, in some embodiments. The user interfaces in FIGS. 9A-9J are used to illustrate the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media) (e.g., a spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos. In some embodiments, spatial audio experiences in headphones are produced by manipulating sounds in the headphone's two audio channels (e.g., left and right) so that they resemble directional sounds arriving in the ear-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human ear, head, and torso filter sounds. When the geometry of the ears of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced-one filter per ear-so that each ear of the listener has a corresponding personalized filter (e.g., personalized HRTF filter), as the ears of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
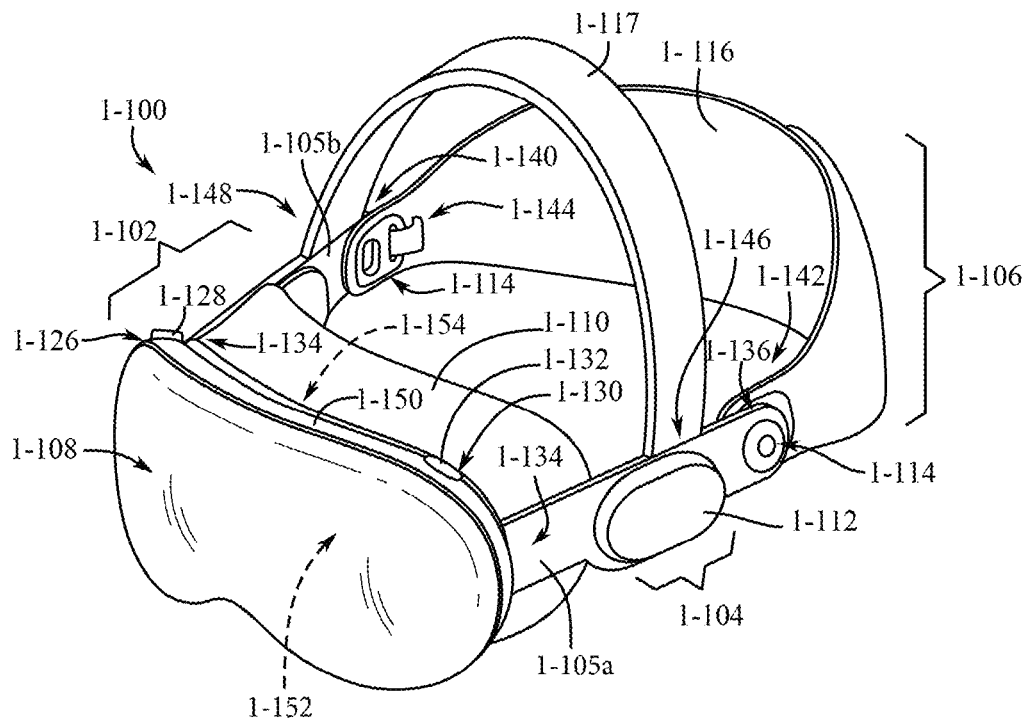
FIGS. 1B-1P are examples of a computer system for providing XR experiences in the operating environment of FIG. 1A.
Figure 1C:
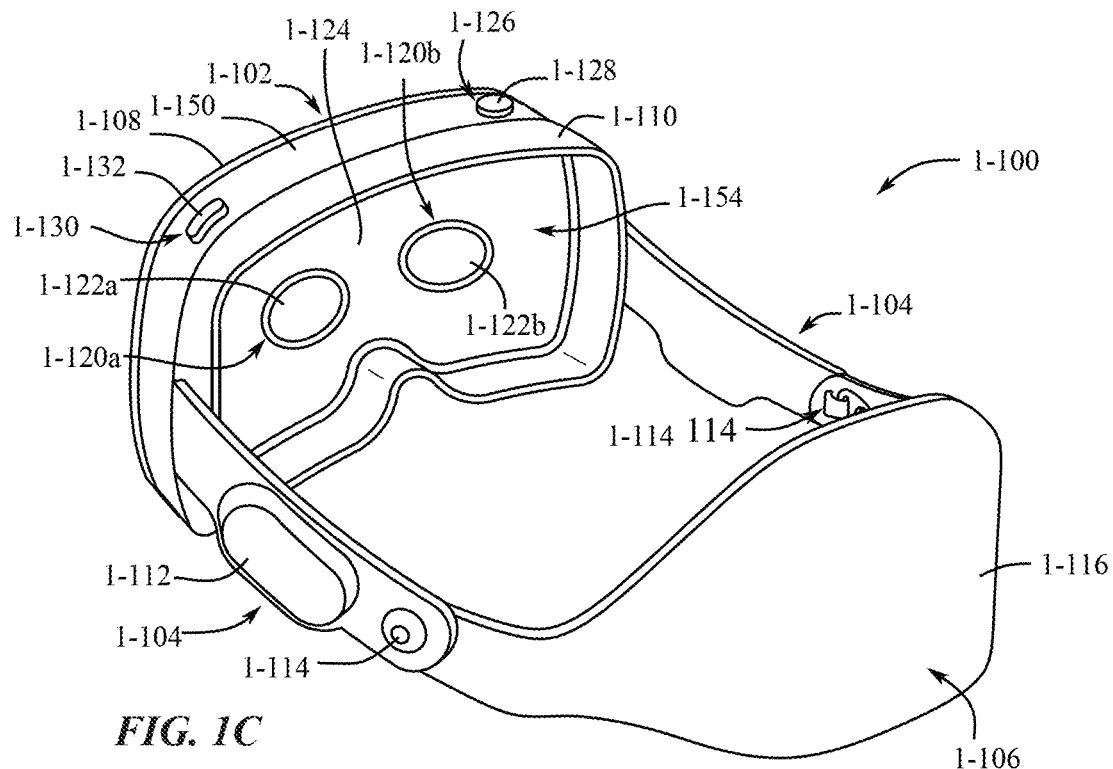
Figure 1D:
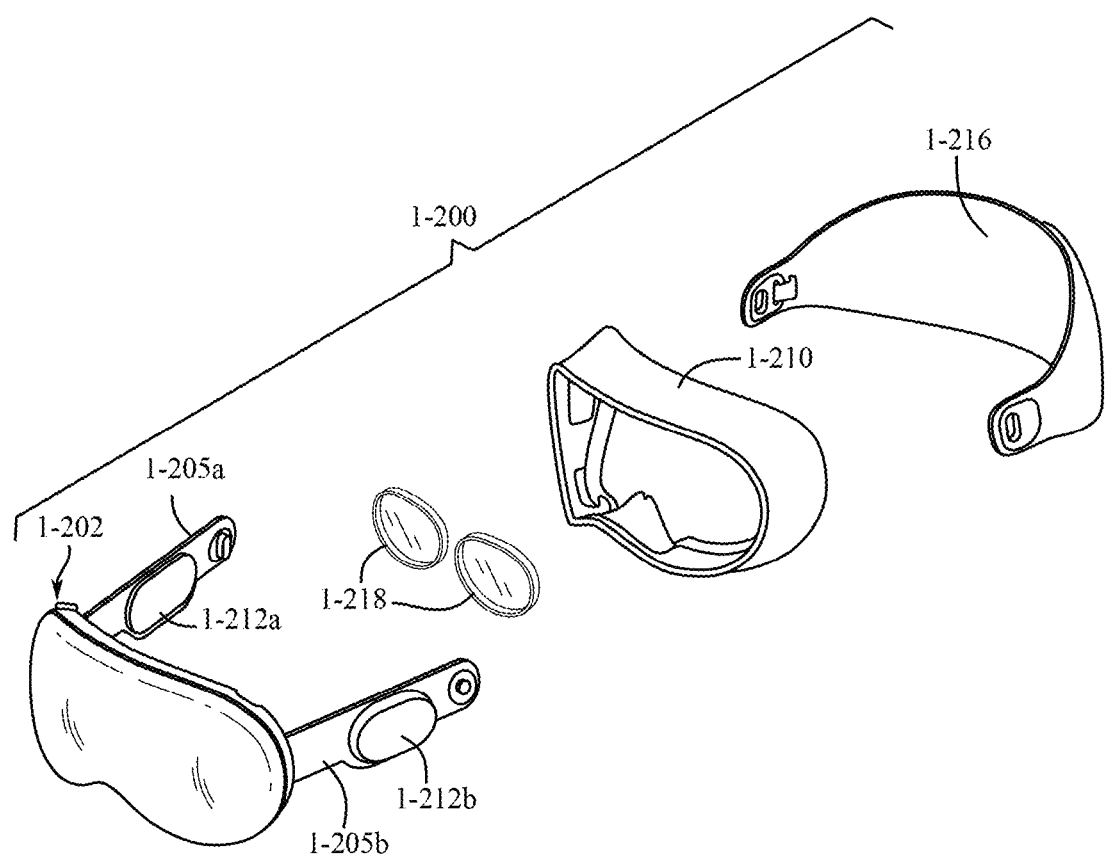
Figure 1E:
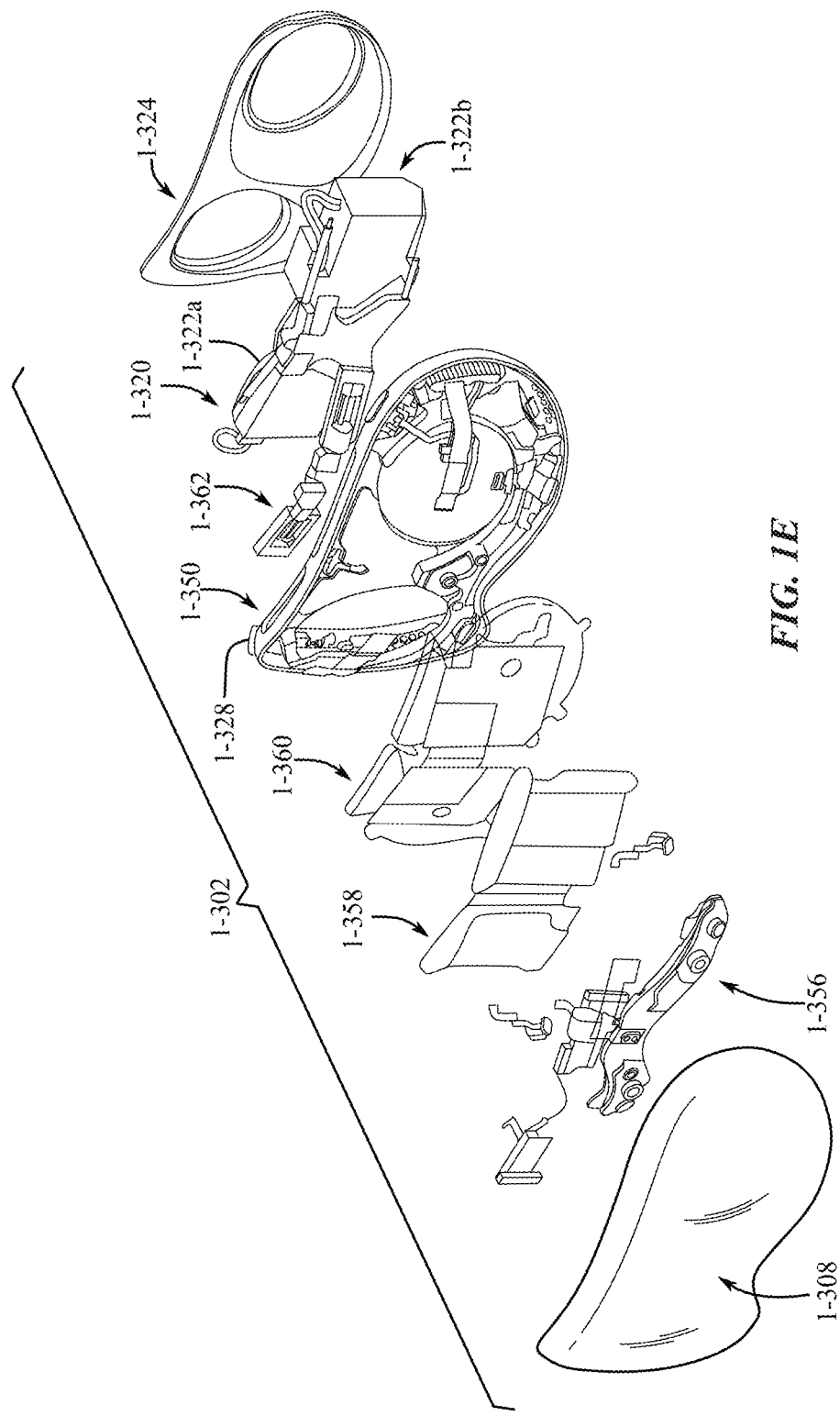
Figure 1F:
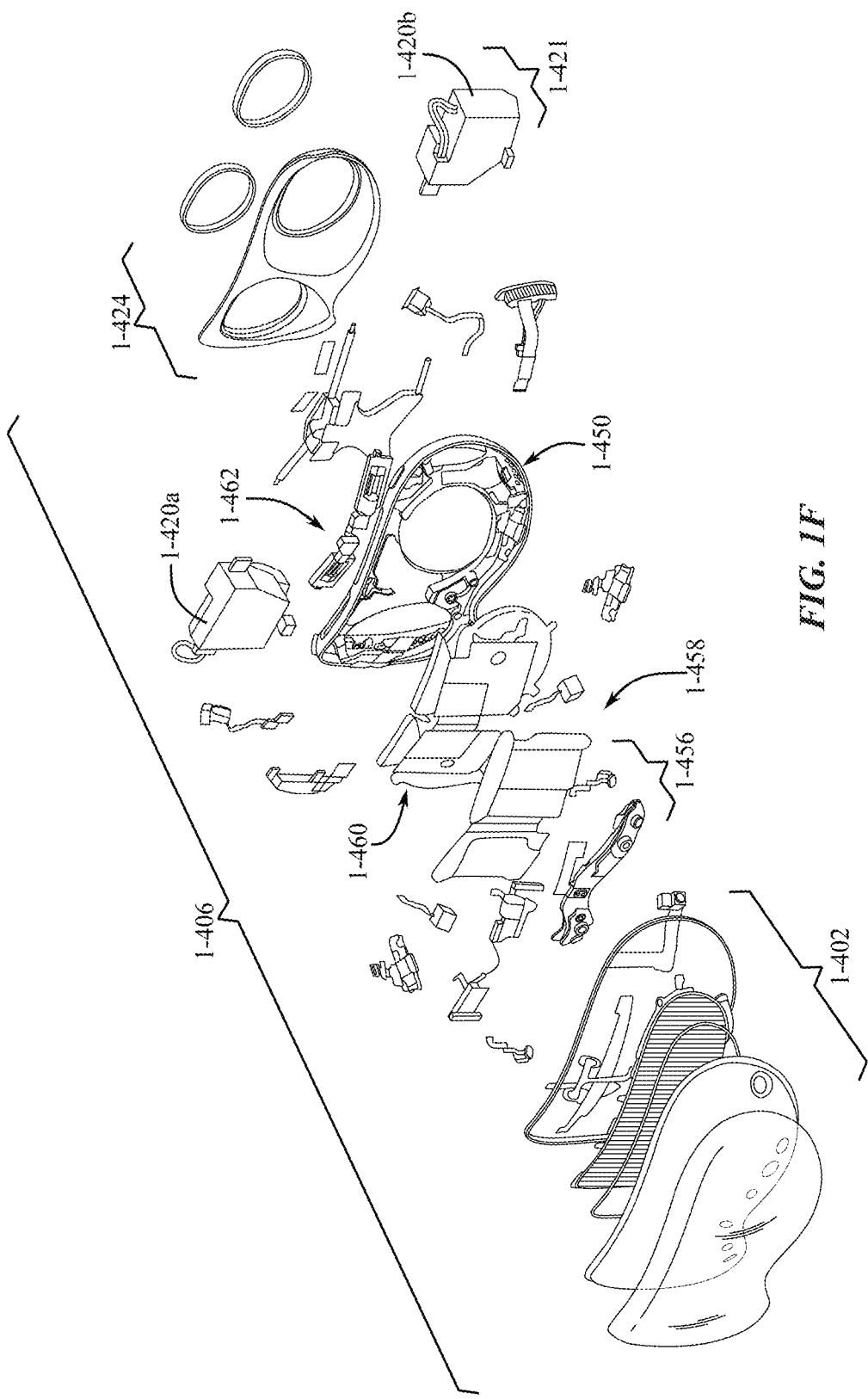
Figure 1G:
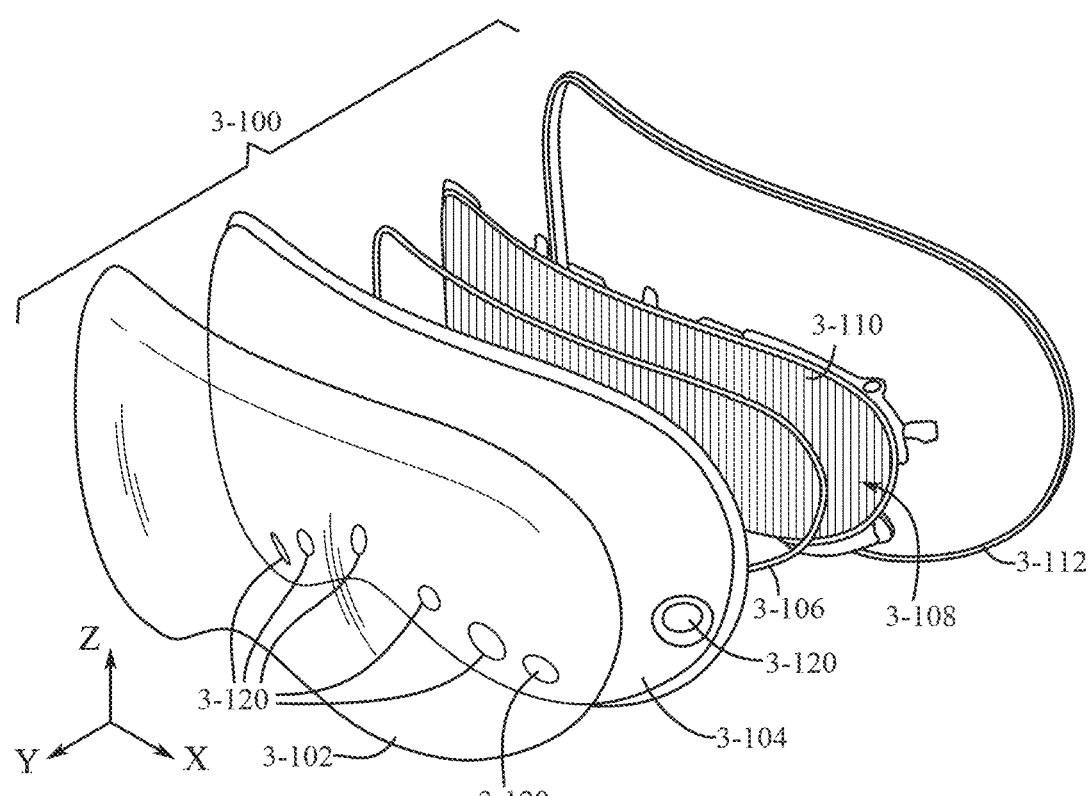
Figure 1H:
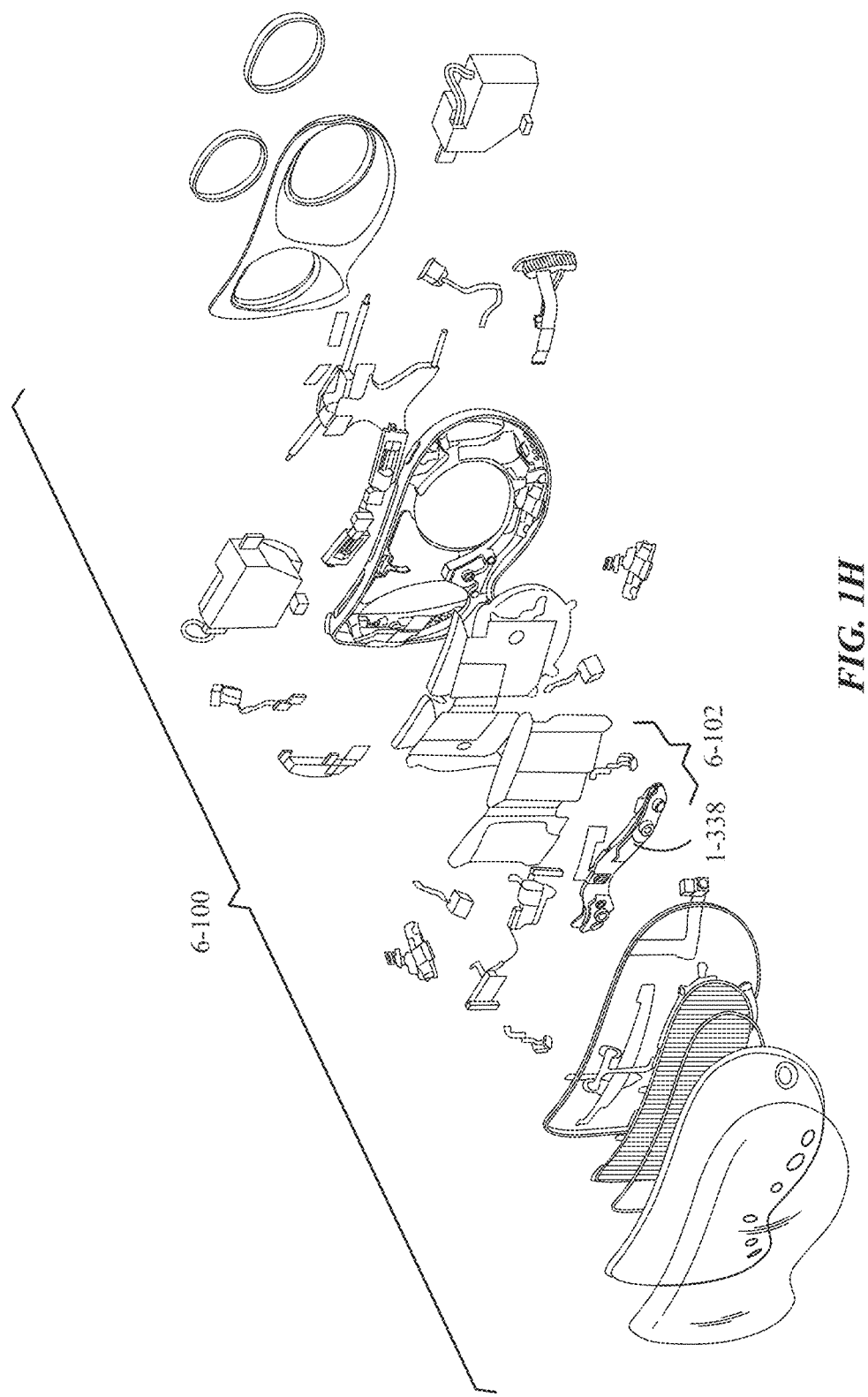
Figure 1I:
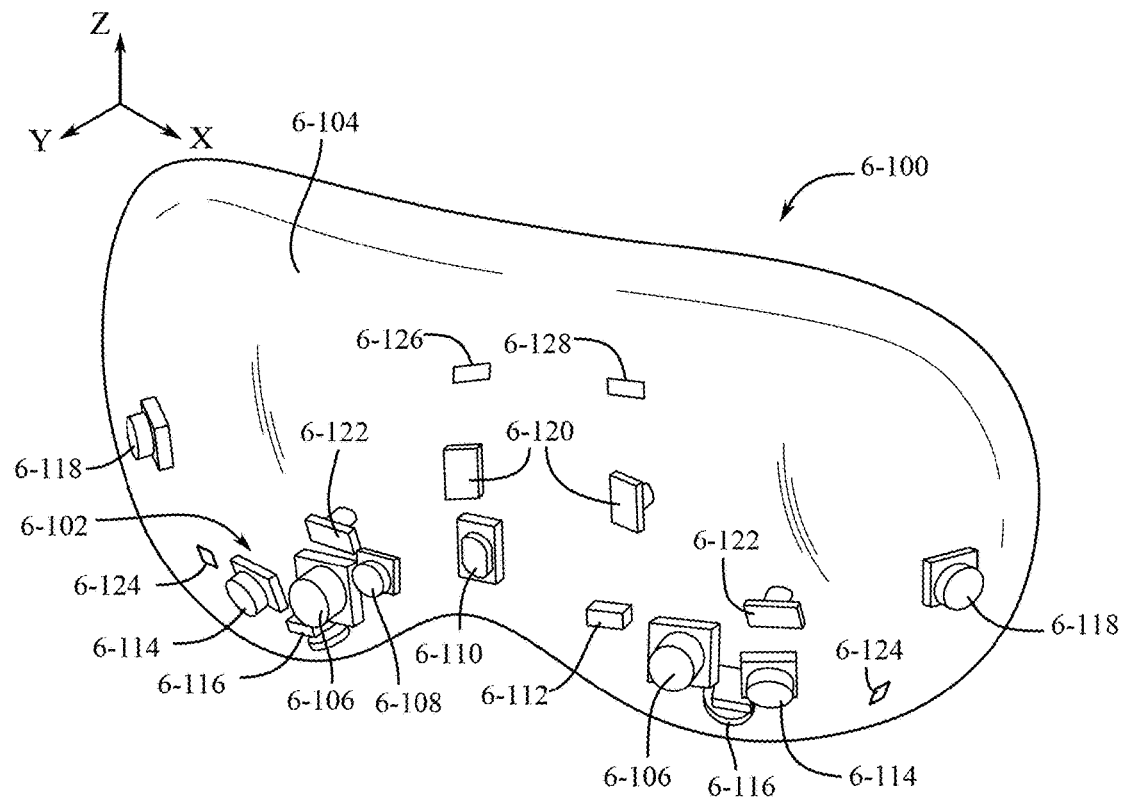
Figure 1J:
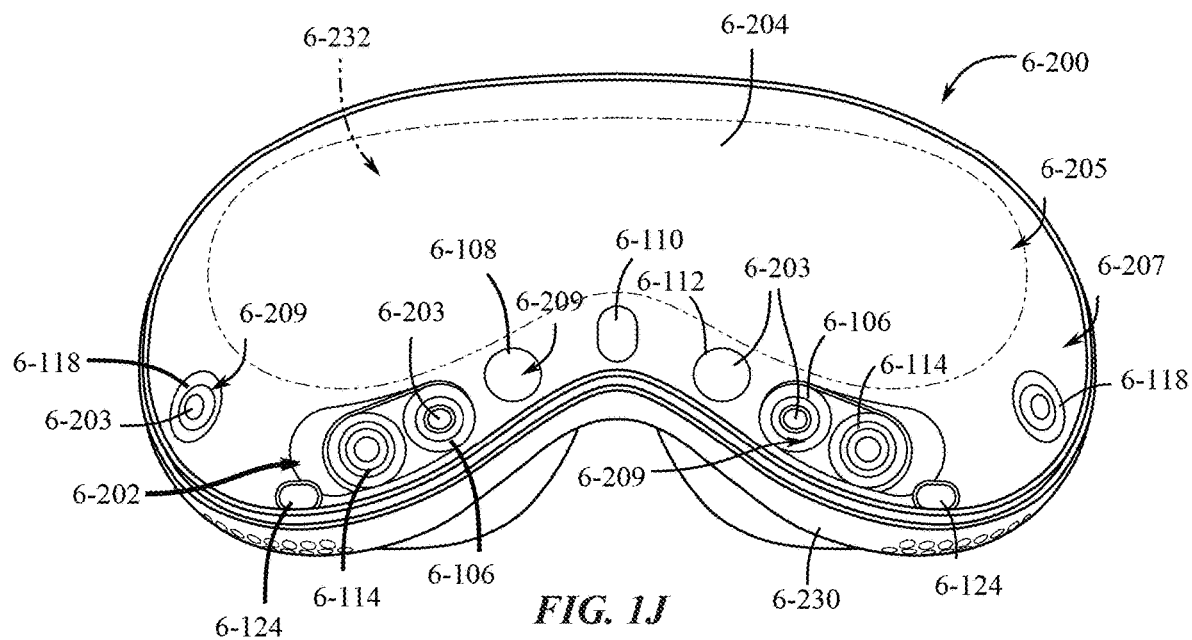
Figure 1K:
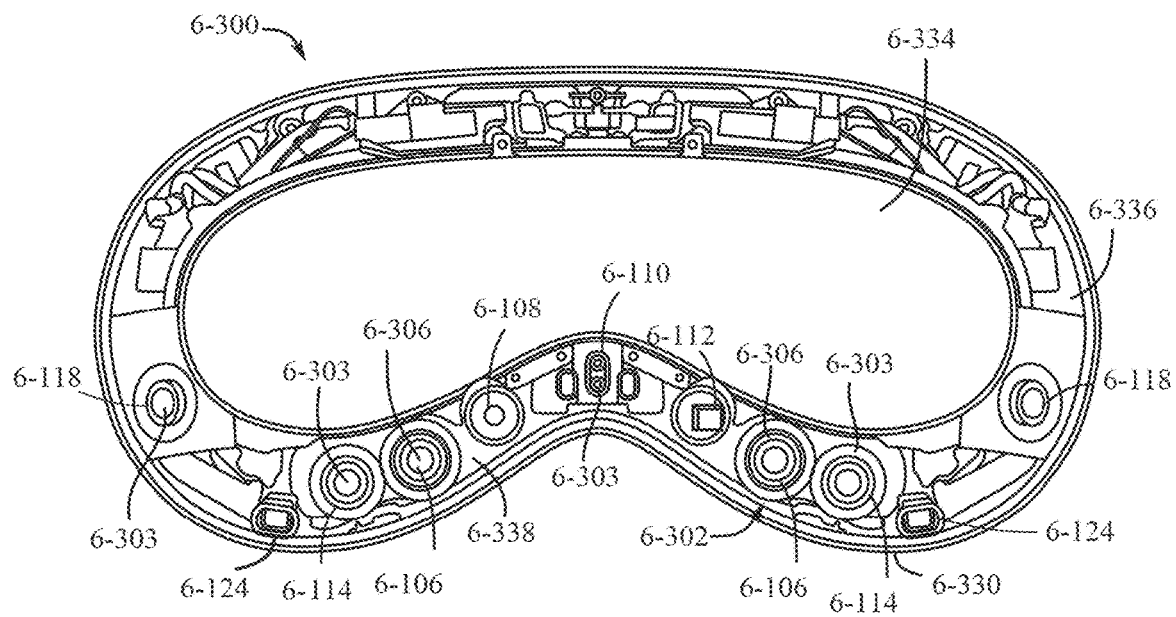
Figure 1L:
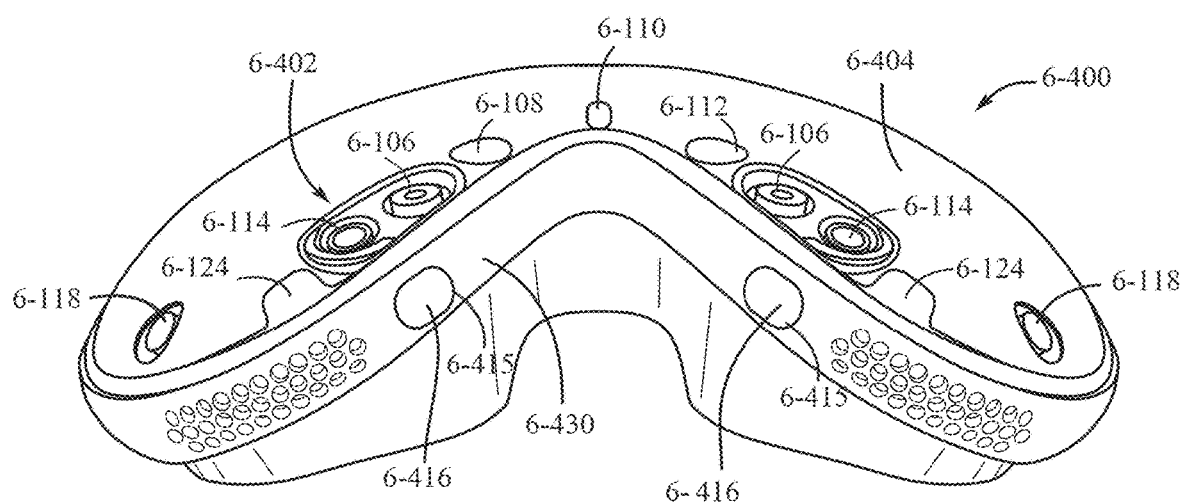
Figure 1M:
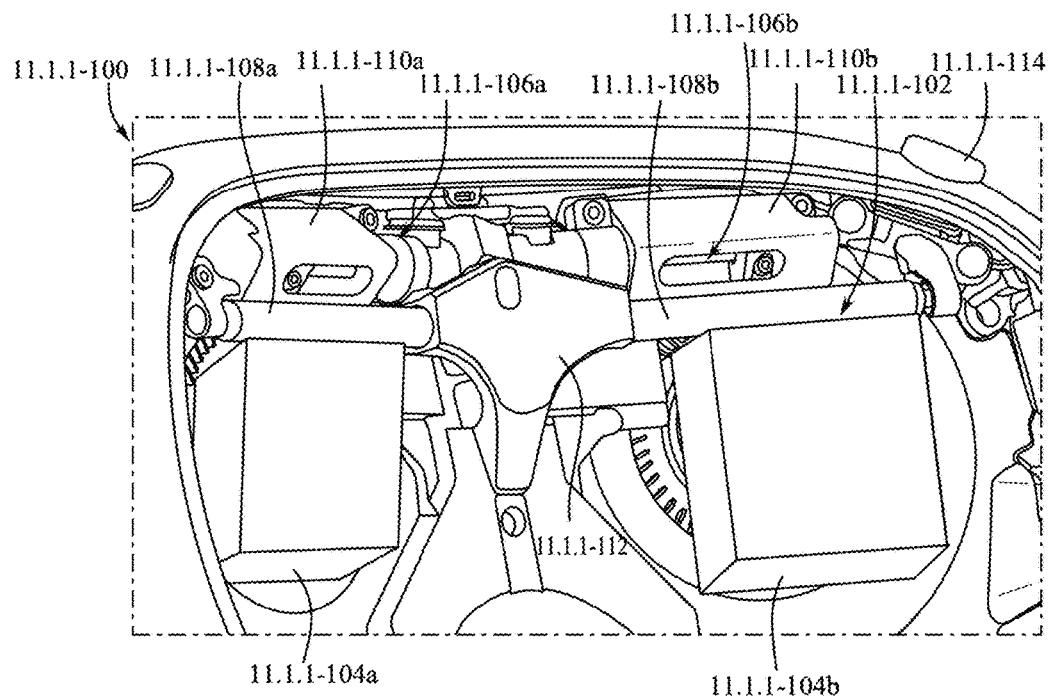
Figure 1N:
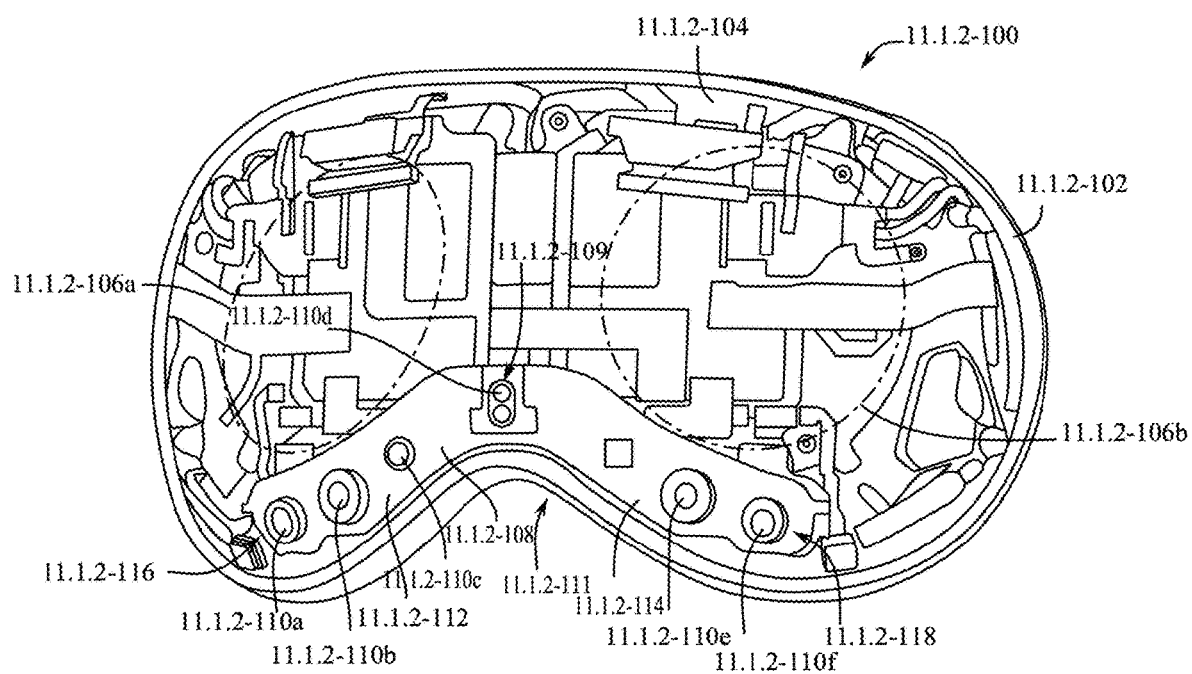
Figure 1O:
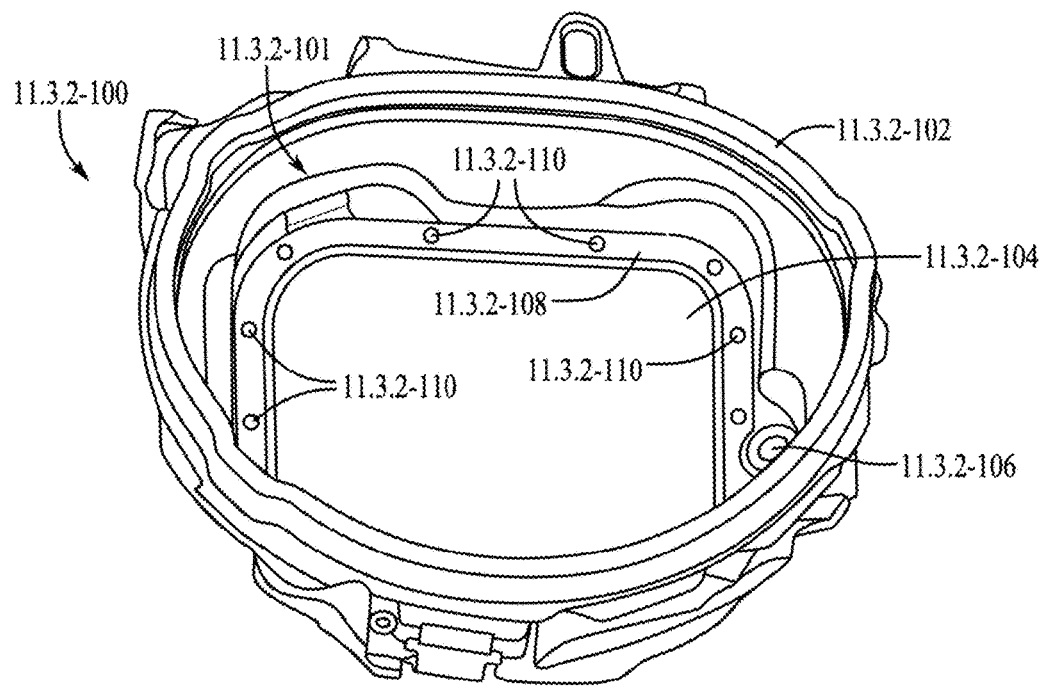
Figure 1P:
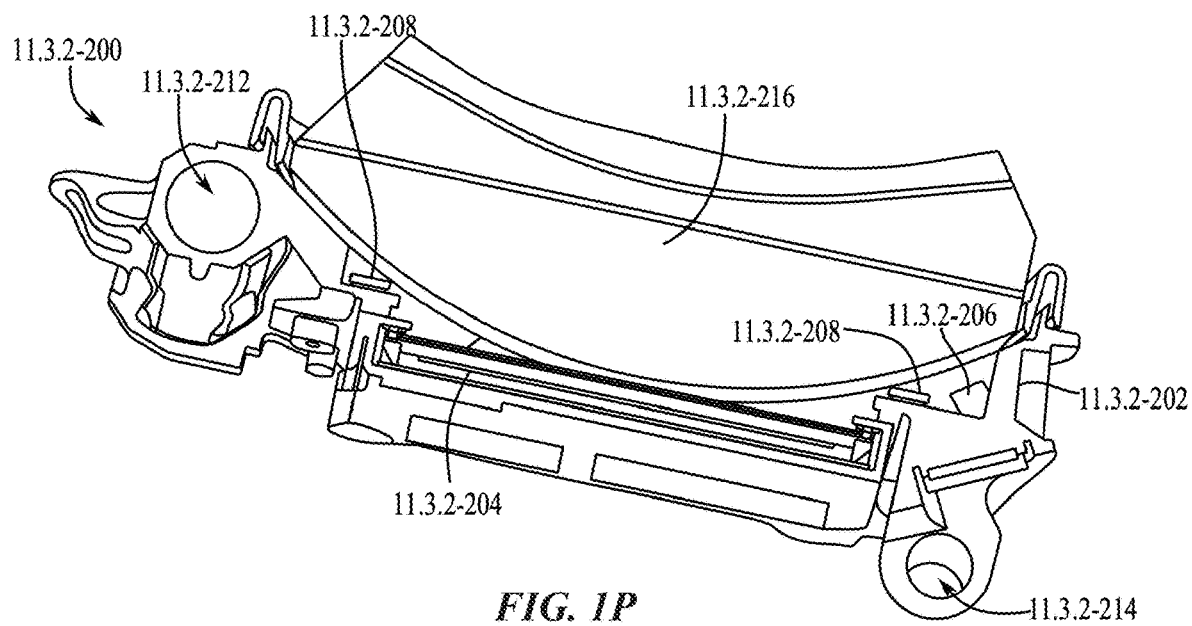

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104a-b slidably engaging/coupled to respective guide-rods 11.1.1-108a-b and motors 11.1.1-110a-b of left and right adjustment subsystems 11.1.1-106a-b. The IPD adjustment system 11.1.1-102 can be coupled to a bracket 11.1.1-112 and include a button 11.1.1-114 in electrical communication with the motors 11.1.1-110a-b. In at least one example, the button 11.1.1-114 can electrically communicate with the first and second motors 11.1.1-110a-b via a processor or other circuitry components to cause the first and second motors 11.1.1-110a-b to activate and cause the first and second optical modules 11.1.1-104a-b, respectively, to change position relative to one another.

In at least one example, the first and second optical modules 11.1.1-104a-b can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104a-b to match the inter-pupillary distance of the user's eyes. The optical modules 11.1.1-104a-b can also include one or more cameras or other sensors/sensor systems for imaging and measuring the IPD of the user such that the optical modules 11.1.1-104a-b can be adjusted to match the IPD.

In one example, the user can manipulate the button 11.1.1-114 to cause an automatic positional adjustment of the first and second optical modules 11.1.1-104a-b. In one example, the user can manipulate the button 11.1.1-114 to cause a manual adjustment such that the optical modules 11.1.1-104a-b move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104a-b via the motors 11.1.1-110a-b is provided by an electrical power source. In one example, the adjustment and movement of the optical modules 11.1.1-104a-b via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned.

The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
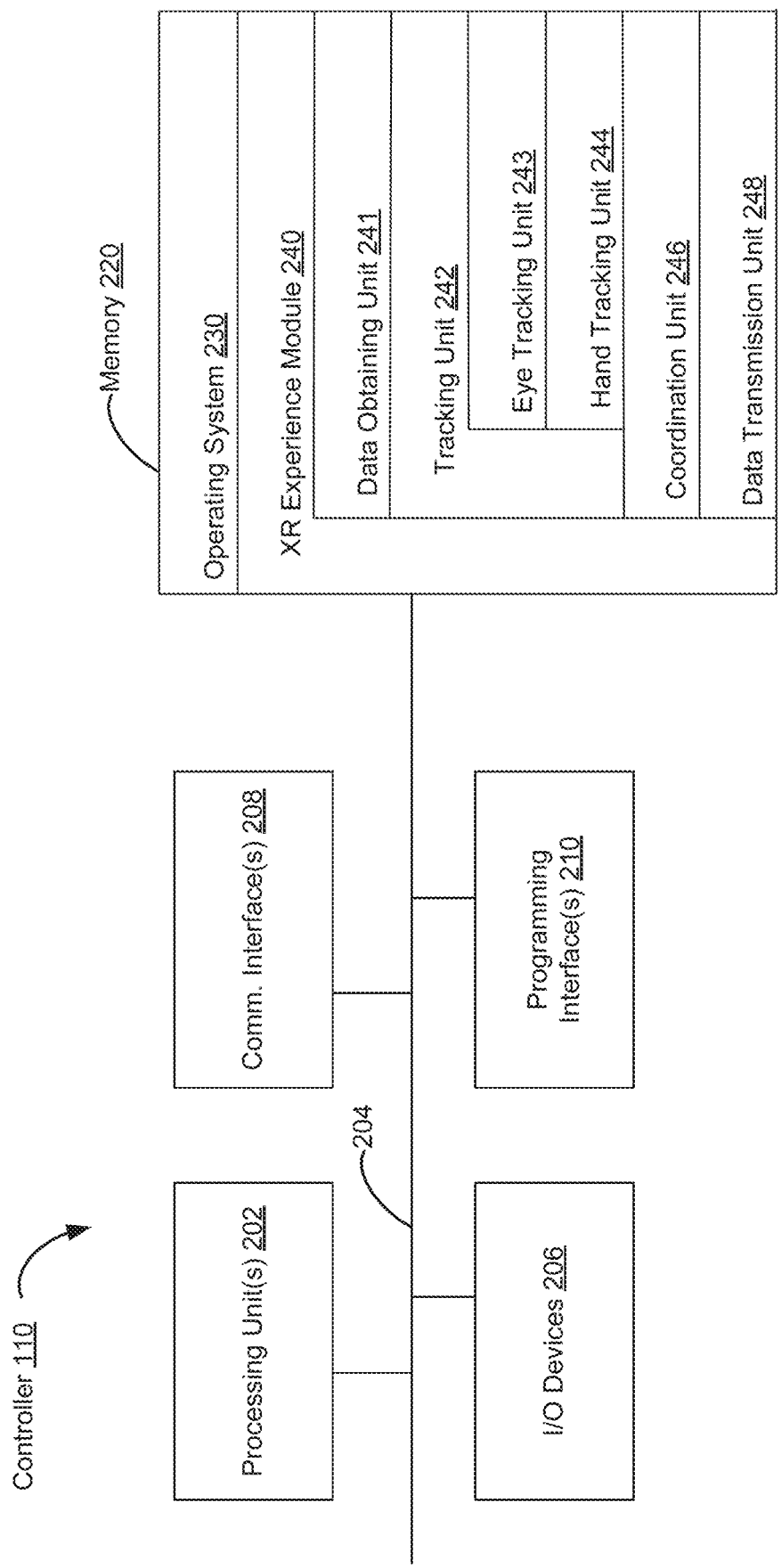
FIG. 2 is a block diagram illustrating a controller of a computer system that is configured to manage and coordinate a XR experience for the user in some embodiments.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
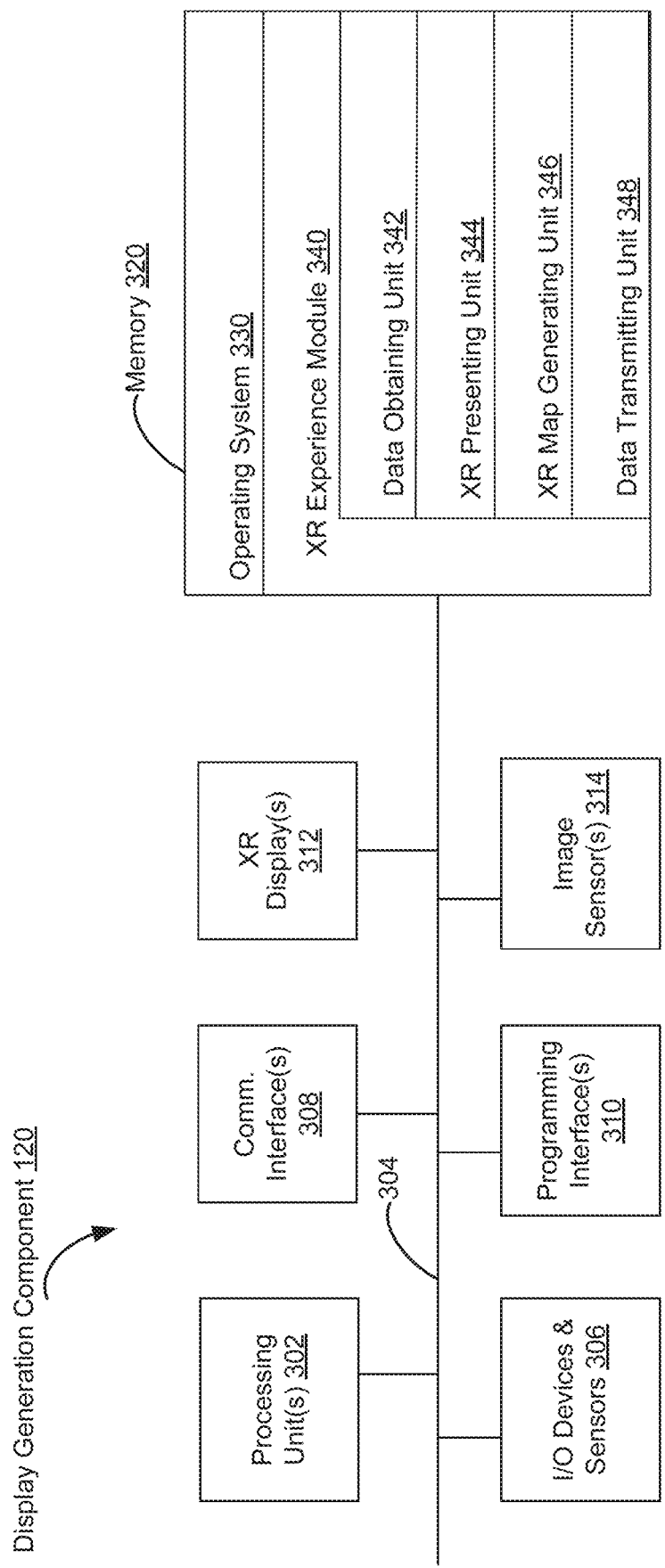
FIG. 3 is a block diagram illustrating a display generation component of a computer system that is configured to provide a visual component of the XR experience to the user in some embodiments.

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICS, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
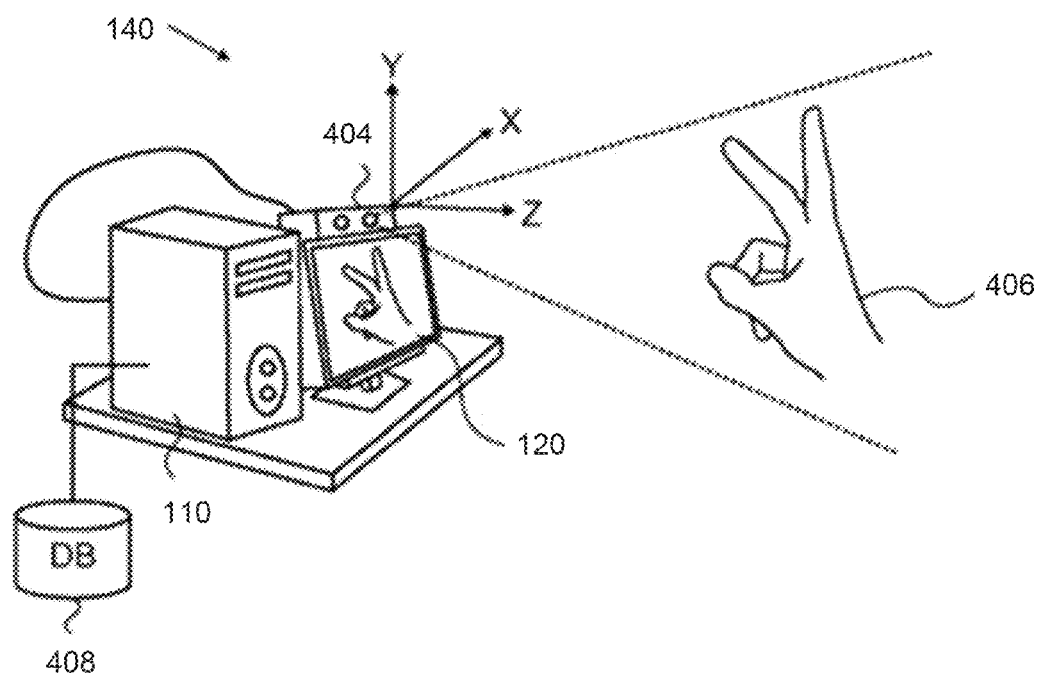
FIG. 4 is a block diagram illustrating a hand tracking unit of a computer system that is configured to capture gesture inputs of the user in some embodiments.
Figure 4:
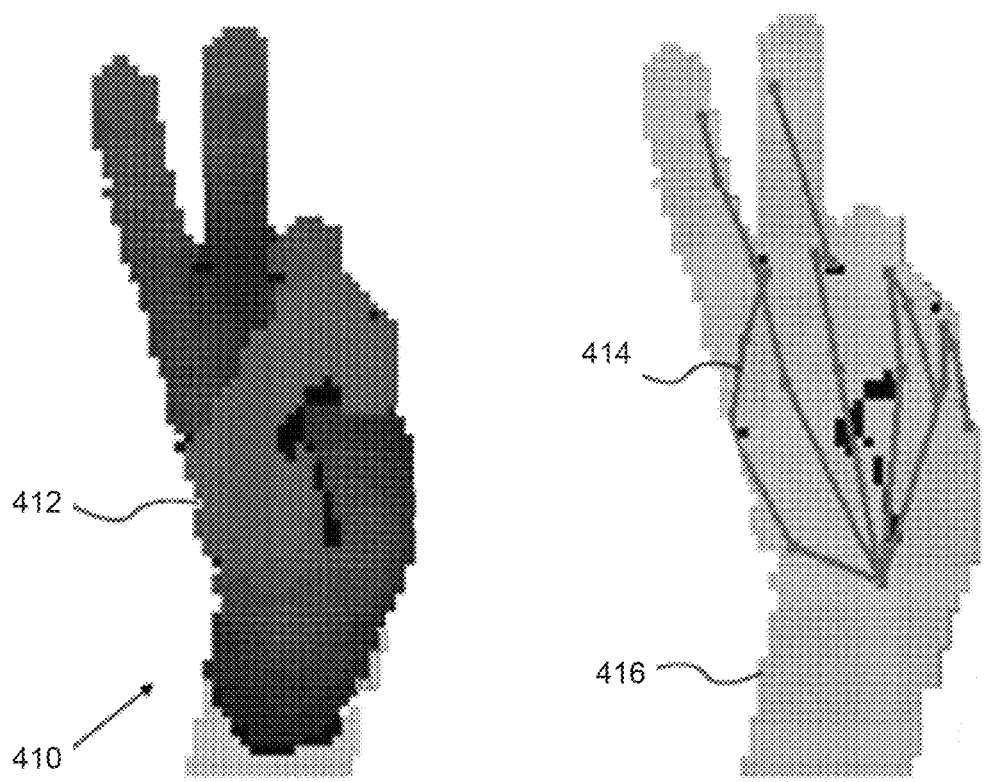

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
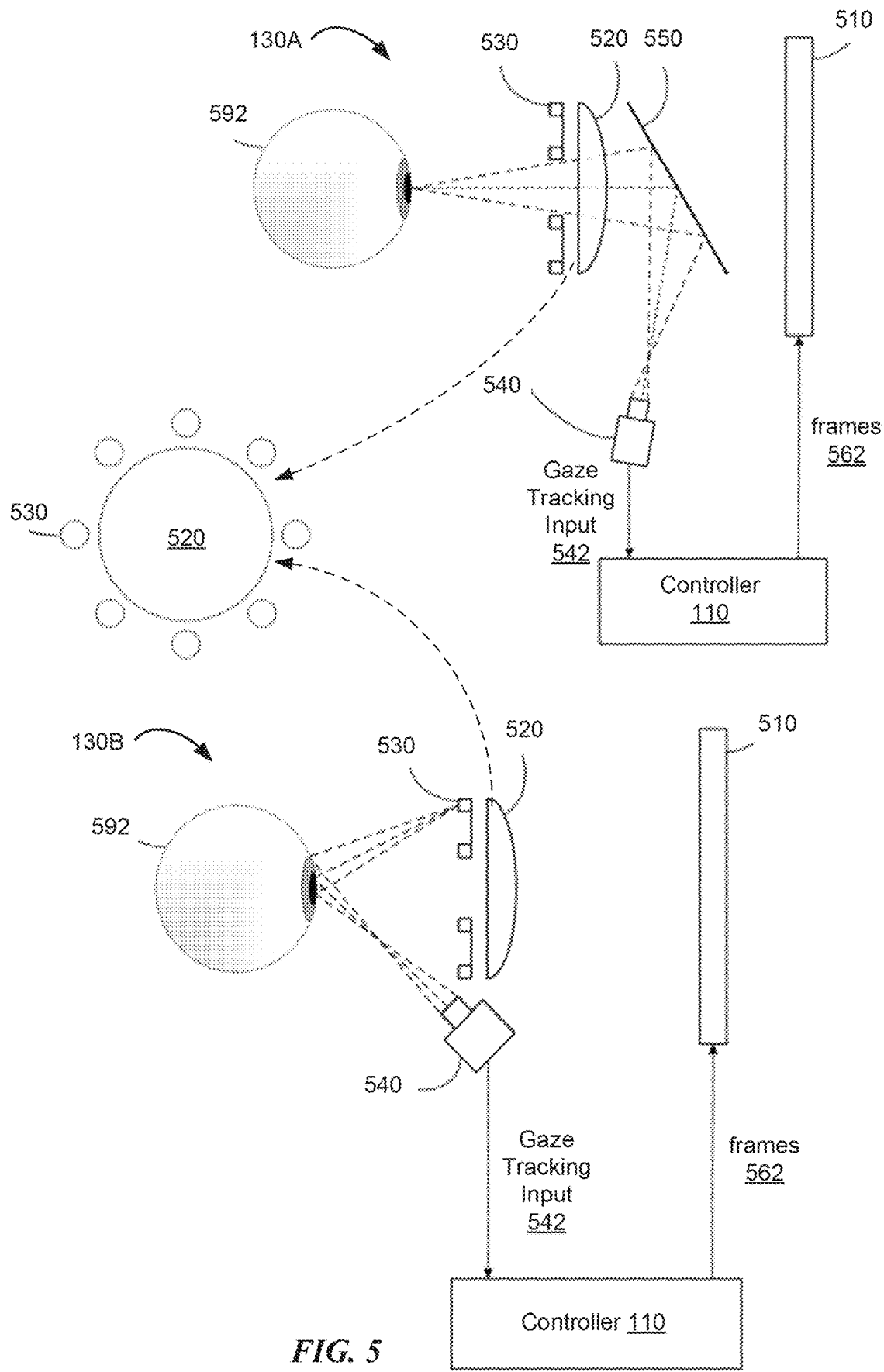
FIG. 5 is a block diagram illustrating an eye tracking unit of a computer system that is configured to capture gaze inputs of the user in some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and illumination sources (e.g., light sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
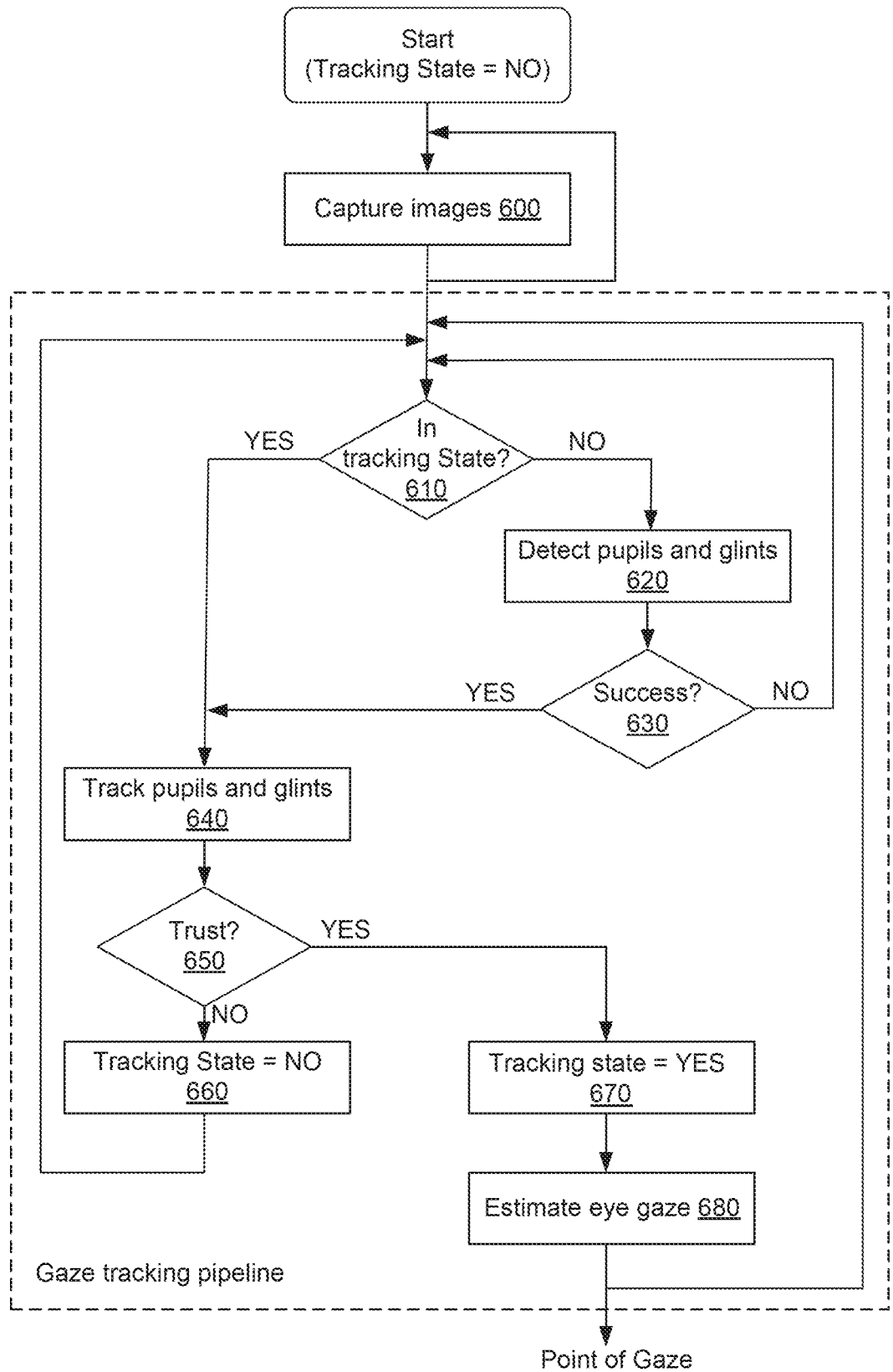
FIG. 6 is a flow diagram illustrating a glint-assisted gaze tracking pipeline in some embodiments.

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in some embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with one or more display generation components and one or more input devices.

FIGS. 7A-7K illustrate examples of providing content that utilizes environment tracking. FIG. 8 is a flow diagram of an exemplary method 800 for providing content that utilizes environment tracking. The user interfaces in FIGS. 7A-7K are used to illustrate the processes described below, including the processes in FIG. 8.

Figure 7A:
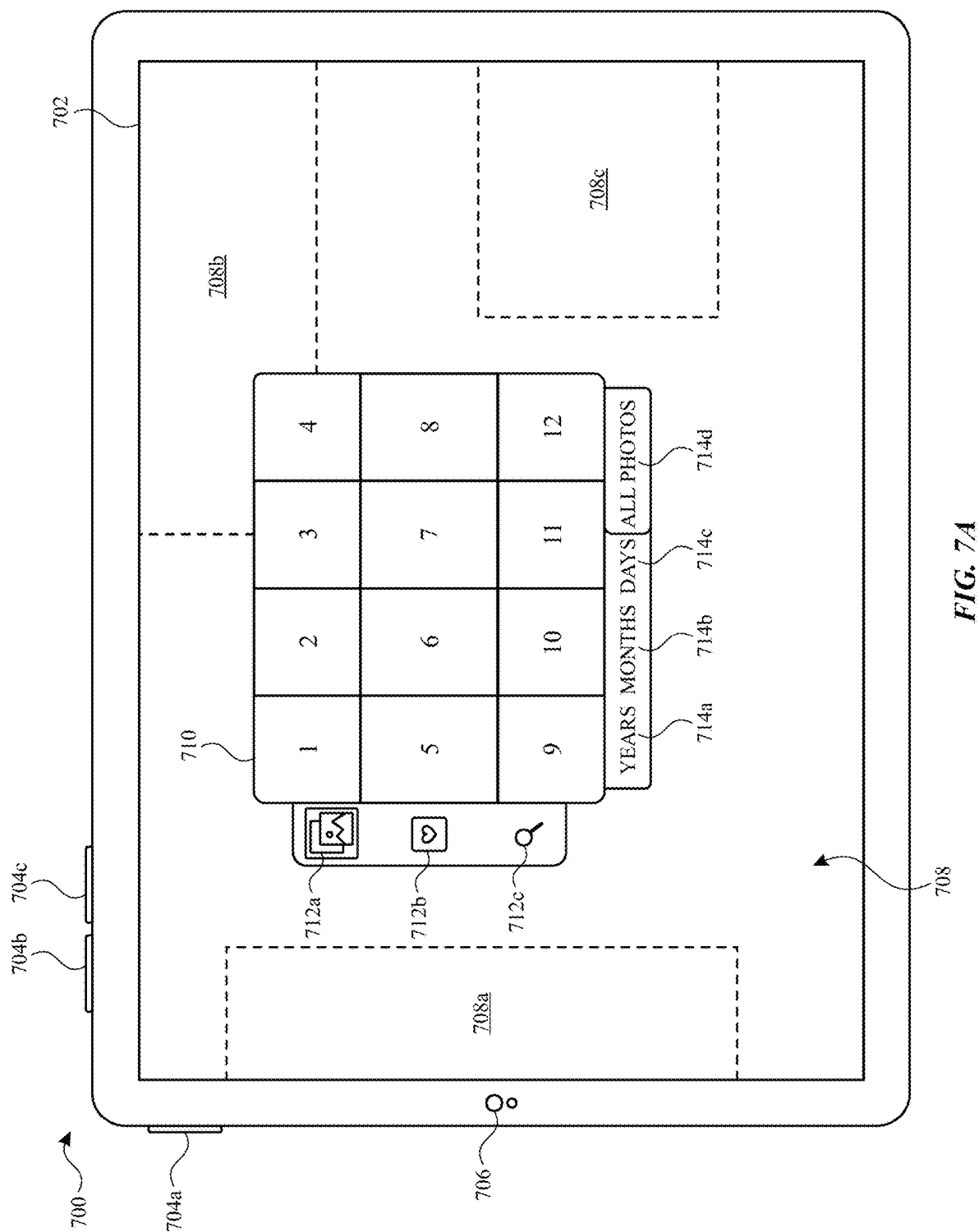
Figure 8:
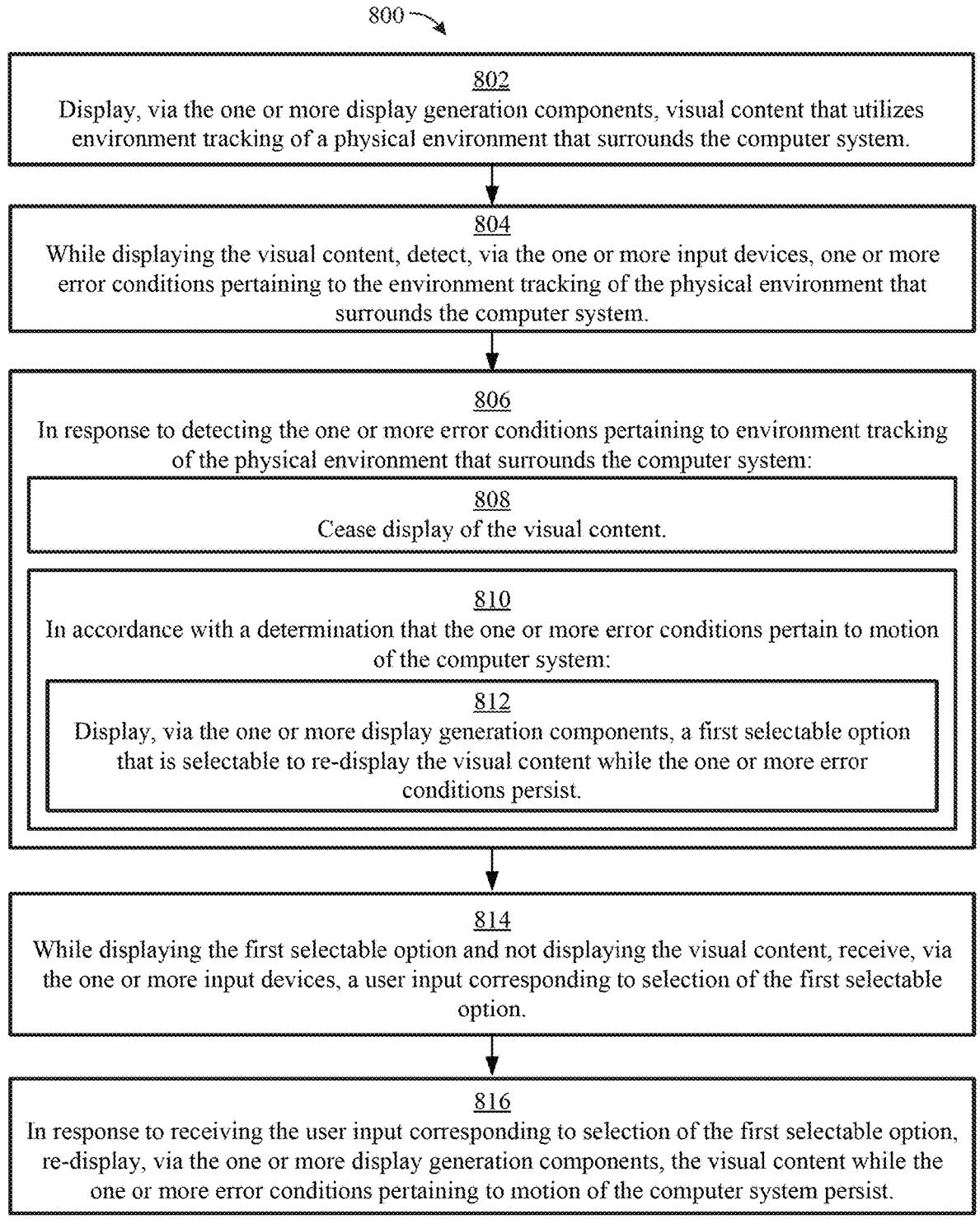
FIG. 8 is a flow diagram of methods of providing content that utilizes environment tracking, in some embodiments.

FIG. 7A depicts electronic device 700, which is a tablet that includes touch-sensitive display 702, buttons 704a-704c, and one or more input sensors 706 (e.g., one or more cameras, eye gaze trackers, hand movement trackers, and/or head movement trackers). In some embodiments described below, electronic device 700 is a tablet. In some embodiments, electronic device 700 is a smartphone, a wearable device, a wearable smartwatch device, a head-mounted system (e.g., headset), or other computer system that includes and/or is in communication with one or more display devices (e.g., display screens and/or projection devices). In some embodiments in which electronic device 700 is a head-mounted system, electronic device 700 optionally includes two displays (e.g., one for each eye of a user), with each display displaying respective various content, to enable a user of electronic device 700 to perceive the various depths of the various content (e.g., physical objects and/or virtual objects) of three-dimensional environments. Electronic device 700 is a computer system (e.g., computer system 101 in FIG. 1A).

At FIG. 7A, electronic device 700 displays user interface 710 overlaid on three-dimensional environment 708. In the depicted scenario, three-dimensional environment 708 includes objects 708a-708c. In some embodiments, three-dimensional environment 708 is displayed by a display (e.g., display 702, as depicted in FIG. 7A). In some embodiments, three-dimensional environment 708 includes a virtual environment or an image (or video) of a physical environment captured by one or more cameras (e.g., one or more cameras that are part of input sensors 706 and/or one or more external cameras). For example, in some embodiments, object 708a is a virtual object that is representative of a physical object that has been captured by one or more cameras and/or detected by one or more sensors; and object 708b is a virtual object that is representative of a second physical object that has been captured by one or more cameras and/or detected by one or more sensors, and so forth. In some embodiments, three-dimensional environment 708 is visible to a user behind user interface 710 but is not displayed by a display. For example, in some embodiments, three-dimensional environment 708 is a physical environment (and, for example, objects 708a-708c are physical objects) that is visible to a user (e.g., through one or more transparent displays) behind user interface 710 without being displayed by a display. In some embodiments, user interface 710 and/or three-dimensional environment 708 are part of an extended reality experience.

In FIG. 7A, user interface 710 is a media library user interface that displays a plurality of media items (labeled items 1-12). User interface 710 includes options 712a-712c and options 714a-714d. Option 712a is selectable to display user interface 710, and is currently selected in FIG. 7A. Option 712b is selectable to display a set of selected and/or favorited media items. Option 712c is selectable to display a search user interface for a user to search through a set of media items (e.g., via text search and/or voice search). Option 714a is selectable to group the set of media items based on years (e.g., display a plurality of selectable folders, with each selectable folder corresponding to a respective year). Option 714b is selectable to group the set of media items based on months (e.g., display a plurality of selectable folders, with each selectable folder corresponding to a respective month). Option 714c is selectable to group the set of media items based on days (e.g., display a plurality of selectable folders, with each selectable folder corresponding to a respective day). Option 714d is selectable to display user interface 710 in which all media items in the set of media items are displayed (e.g., in chronological order or some other order) without grouping the set of media items into distinct folders or groups.

In some embodiments, user interface 710 utilizes environment tracking of a physical environment that surrounds computer system 700. For example, in some embodiments, three-dimensional environment 708 is representative of a physical environment that surrounds computer system 700 (e.g., three-dimensional environment 708 is a virtual pass-through environment that is displayed based on a detected physical environment that surrounds computer system 700; or three-dimensional environment 708 is an optical pass-through environment in which the physical environment that surrounds computer system 700 is visible). In some embodiments, user interface 710 utilizes environment tracking of the physical environment that surrounds computer system 700 in that user interface 710 is an environment-locked virtual object that is displayed at a particular position within three-dimensional environment 708, and maintaining user interface 710 at the particular position within three-dimensional environment 708 involves tracking one or more objects within three-dimensional environment 708 (e.g., objects 708a-708c).

Figure 7B:
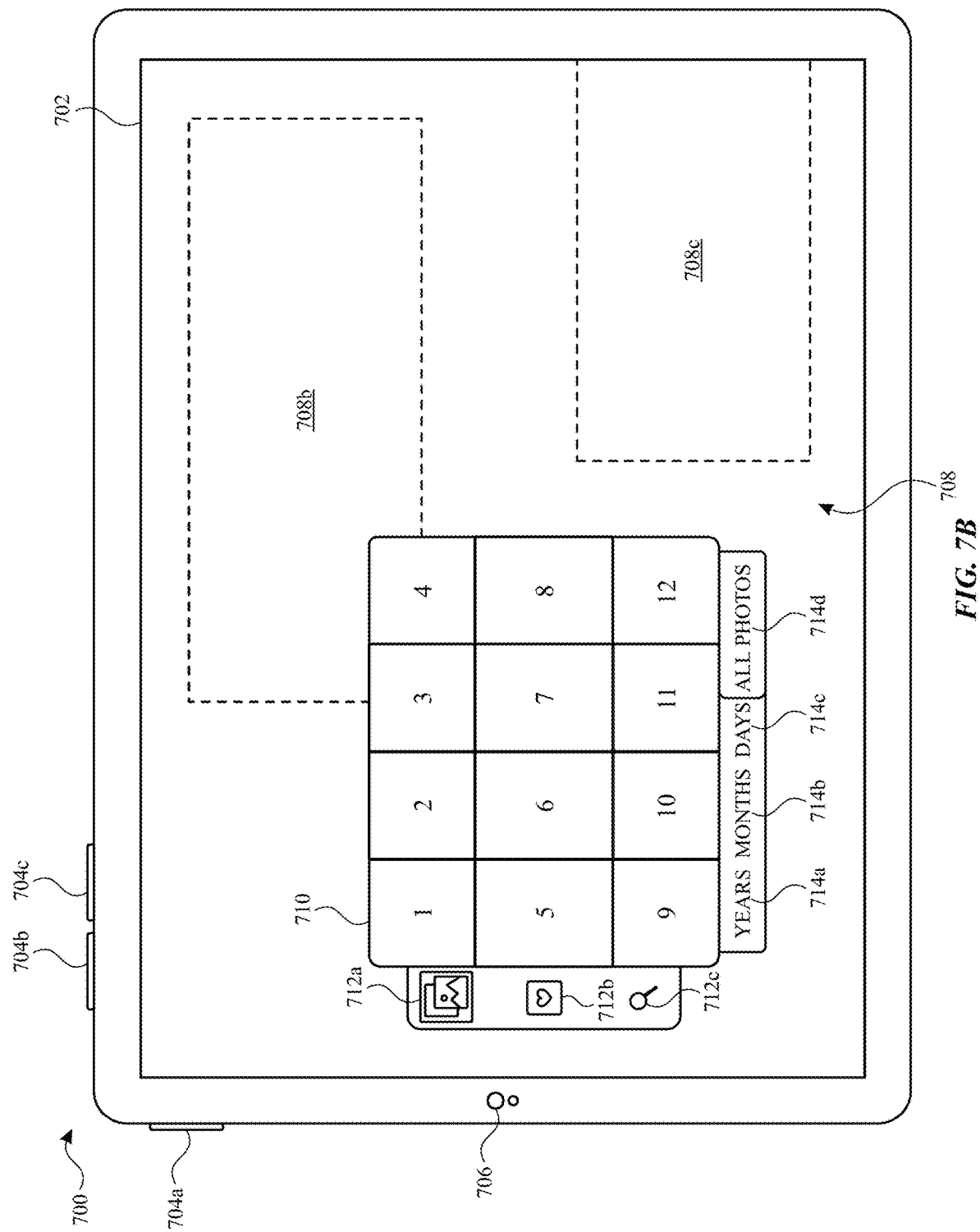

At FIG. 7B, the viewpoint of electronic device 700 has changed, as demonstrated by movement of objects 708a-708c of three-dimensional environment 708. In the depicted embodiments, user interface 710 is an environment-locked virtual object. Accordingly, in FIG. 7B, electronic device 700 maintains display of user interface 710 at its respective position within three-dimensional environment 708 (e.g., relative to objects 708a-708c) even as the viewpoint of electronic device 700 moves. In some embodiments, electronic device 700 is a head-mounted system that is worn on the head of a user. In some embodiments, changing of the viewpoint of electronic device 700 (as demonstrated in FIGS. 7A-7B) occurs based on movement of the user's head while the user wears electronic device 700 on his or her head.

Figure 7C:
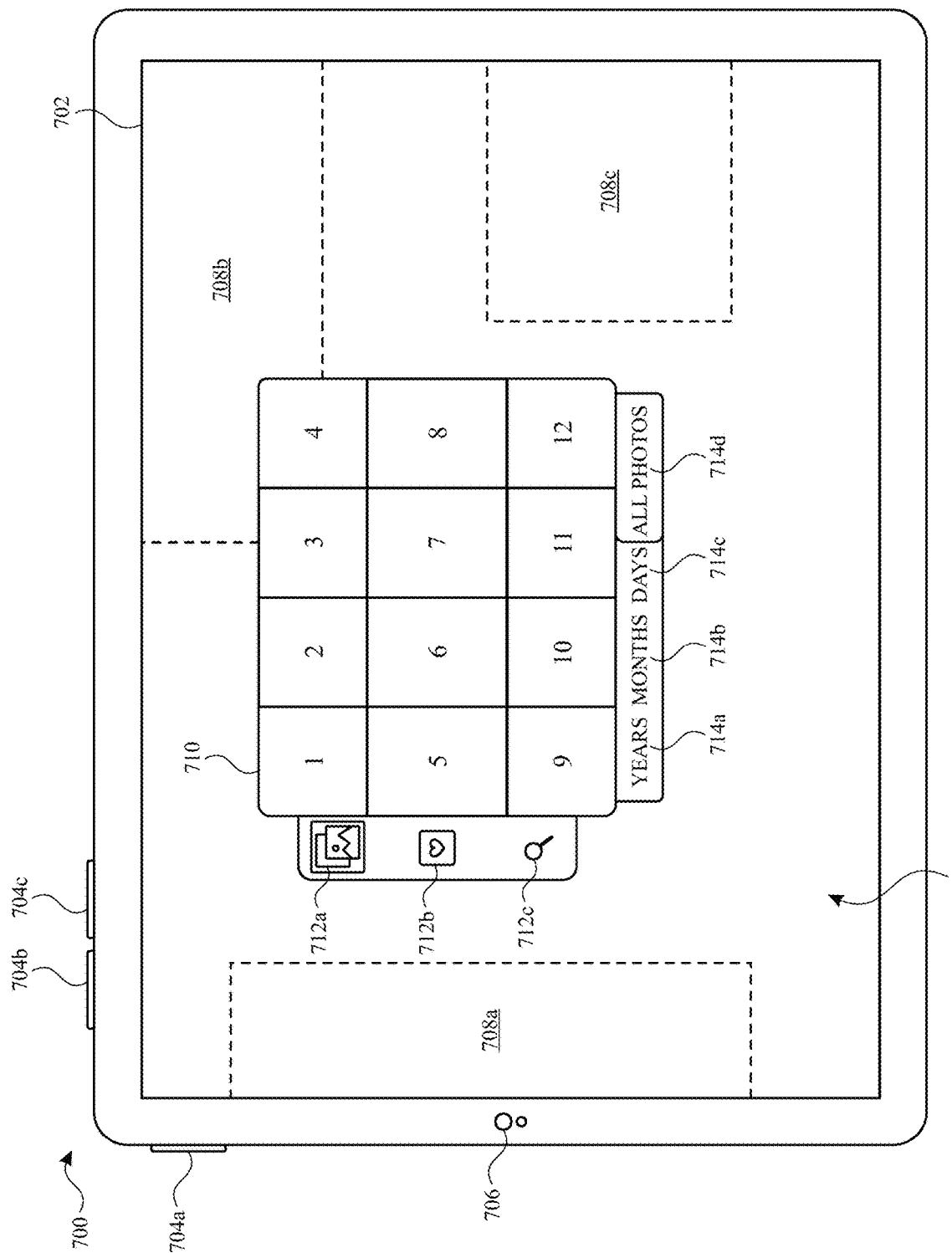

At FIG. 7C, the viewpoint of electronic device 700 has once again changed, as demonstrated by movement of objects 708a-708c of three-dimensional environment 708. Once again, in the depicted embodiments, user interface 710 is an environment-locked virtual object. Accordingly, in FIG. 7C, electronic device 700 maintains display of user interface 710 at its respective position within three-dimensional environment 708 (e.g., relative to objects 708a-708c) even as the viewpoint of electronic device 700 moves. In some embodiments, electronic device 700 is a head-mounted system that is worn on the head of a user. In some embodiments, changing of the viewpoint of electronic device 700 (as demonstrated in FIGS. 7A-7B) occurs based on movement of the user's head while the user wears electronic device 700 on his or her head.

Figure 7D:
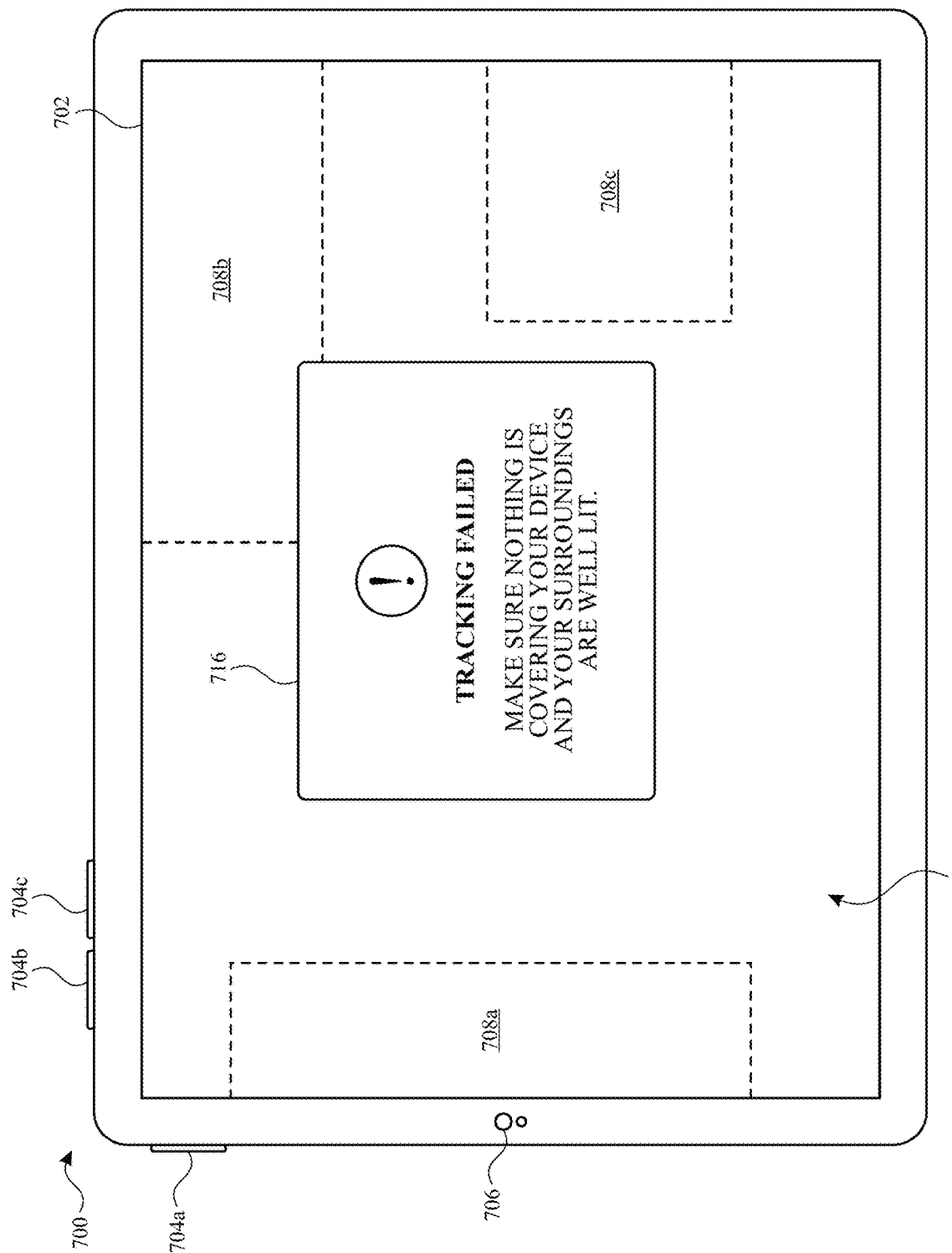

FIGS. 7D and 7E1 depict two example scenarios in which electronic device 700 detects one or more error conditions pertaining to tracking of the physical environment that surrounds electronic device 700 (e.g., a physical environment that is represented by three-dimensional environment 708). In some embodiments, the one or more error conditions pertaining to tracking of the physical environment include motion-related errors and non-motion-related errors. In some embodiments, motion-related errors include errors that pertain to movement and/or motion of electronic device 700 (e.g., within a physical and/or three-dimensional environment), whereas non-motion-related errors include errors that do not pertain to movement and/or motion of electronic device 700. For example, in some embodiments, motion-related errors include a first type of error in which a first set of data indicates that electronic device 700 is in motion, whereas a second set of data indicates that electronic device 700 is not motion. For example, a first set of data, such as GPS data, accelerometer data, and/or gyroscope data indicates that electronic device 700 is moving (e.g., from one geographic location to another), but a second set of data, such as camera data, radar data, and/or lidar data indicate that electronic device 700 is not moving (e.g., because physical objects surrounding electronic device 700 are staying substantially still and/or are staying relatively constant). This can occur, for example, when electronic device 700 is in a moving vehicle, and the vehicle is moving from one geographic location to another (e.g., which can be detected by GPS data, accelerometer data, and/or gyroscope data), but camera, radar, and/or lidar data indicate that electronic device 700 is maintaining its position within the same physical space (e.g., the interior of the vehicle). Such mismatched motion data is an example of one type of motion-related error. In some embodiments, non-motion-related errors include lighting condition errors and/or other visibility condition errors in which electronic device 700 detects that it has lost tracking of one or more physical objects and/or has failed to track one or more physical objects (e.g., based on poor lighting conditions and/or visibility conditions).

In some embodiments, electronic device 700 reacts differently to environment-tracking errors based on whether the environment-tracking error is a motion-related error or a non-motion-related error. FIG. 7D depicts an example scenario of a non-motion-related error, and FIG. 7E1 depicts an example scenario of a motion-related error.

At FIG. 7D, electronic device 700 detects a non-motion-related error pertaining to tracking of a physical environment that surrounds electronic device 700 (e.g., low light and/or poor visibility). At FIG. 7D, in response to detecting the non-motion-related error pertaining to tracking of the physical environment, electronic device 700 ceases display of user interface 710, and displays notification 716. Notification 716 indicates that tracking of the physical environment that surrounds electronic device 700 has failed.

At FIG. 7E1, electronic device 700 detects a motion-related error pertaining to tracking of a physical environment that surrounds electronic device 700 (e.g., a data mismatch error pertaining to movement and/or motion of electronic device 700 within the physical environment). At FIG. 7E1, in response to detecting the motion-related error pertaining to tracking of the physical environment, electronic device 700 ceases display of user interface 710, and displays notification 718. Notification 718 asks the user if electronic device 700 is in motion (e.g., within a vehicle), and instructs the user that if electronic device 700 is in motion, the user should enable a "motion mode" of operation. Notification 718 includes option 720a, which is selectable to enable the motion mode of operation, and option 720b, which is selectable to cease display of notification 718 without enabling the motion mode of operation. In some embodiments, enabling the motion mode of operation permits display of content that utilizes environment tracking (e.g., user interface 710) even as the one or more environment-tracking errors persist. However, if the motion mode of operation is not enabled, content that utilizes environment tracking (e.g., user interface 710) is not displayed when environment-tracking errors are detected. Accordingly, selection of option 720a allows for re-display of user interface 710 even as the motion-related environment-tracking errors persist, whereas selection of option 720b would result in user interface 710 not being displayed while the motion-related environment-tracking errors continue to be detected. At FIG. 7E1, electronic device 700 detects user input 722 corresponding to selection of option 720a. In FIG. 7E1, user input 722 is a tap input on touch-sensitive display 702. However, in some embodiments, user input 722 is a different type of user input, such as a gesture or other action taken by a user. For example, in some embodiments, electronic device 700 is a head-mounted system, and detecting user input 722 includes, for example, detecting a user performing a gesture (e.g., an air gesture (e.g., an air tap gesture; and/or an air pinch gesture)) while electronic device 700 is worn, detecting a button press while electronic device 700 is worn, detecting rotation of a rotatable input mechanism while electronic device 700 is worn, detecting a gaze-based gesture (e.g., detecting the user looking at an object and/or moving his or her gaze in a particular manner), and/or any combination of the foregoing (e.g., detecting a gaze at option 720a in conjunction with an air pinch gesture).

In some embodiments, the techniques and user interface(s) described in FIGS. 7A-7K are provided by one or more of the devices described in FIGS. 1A-1P. For example, FIG. 7E2 illustrates an embodiment in which notification 718 (e.g., as described in FIG. 7E1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

FIG. 7E2 depicts an example scenario in which HMD X700 detects one or more error conditions pertaining to tracking of the physical environment that surrounds HMD X700 (e.g., a physical environment that is represented by three-dimensional environment 708). In some embodiments, the one or more error conditions pertaining to tracking of the physical environment include motion-related errors and non-motion-related errors. In some embodiments, motion-related errors include errors that pertain to movement and/or motion of HMD X700 (e.g., within a physical and/or three-dimensional environment), whereas non-motion-related errors include errors that do not pertain to movement and/or motion of HMD X700. For example, in some embodiments, motion-related errors include a first type of error in which a first set of data indicates that HMD X700 is in motion, whereas a second set of data indicates that HMD X700 is not motion. For example, a first set of data, such as GPS data, accelerometer data, and/or gyroscope data indicates that HMD X700 is moving (e.g., from one geographic location to another), but a second set of data, such as camera data, radar data, and/or lidar data indicate that HMD X700 is not moving (e.g., because physical objects surrounding HMD X700 are staying substantially still and/or are staying relatively constant). This can occur, for example, when HMD X700 is in a moving vehicle, and the vehicle is moving from one geographic location to another (e.g., which can be detected by GPS data, accelerometer data, and/or gyroscope data), but camera, radar, and/or lidar data indicate that HMD X700 is maintaining its position within the same physical space (e.g., the interior of the vehicle). Such mismatched motion data is an example of one type of motion-related error. In some embodiments, non-motion-related errors include lighting condition errors and/or other visibility condition errors in which HMD X700 detects that it has lost tracking of one or more physical objects and/or has failed to track one or more physical objects (e.g., based on poor lighting conditions and/or visibility conditions).

In some embodiments, HMD X700 reacts differently to environment-tracking errors based on whether the environment-tracking error is a motion-related error or a non-motion-related error. FIG. 7E2 depicts an example scenario of a motion-related error.

At FIG. 7E2, HMD X700 detects a motion-related error pertaining to tracking of a physical environment that surrounds HMD X700 (e.g., a data mismatch error pertaining to movement and/or motion of HMD X700 within the physical environment). At FIG. 7E2, in response to detecting the motion-related error pertaining to tracking of the physical environment, HMD X700 ceases display of user interface 710, and displays notification 718. Notification 718 asks the user if HMD X700 is in motion (e.g., within a vehicle), and instructs the user that if HMD X700 is in motion, the user should enable a "motion mode" of operation. Notification 718 includes option 720a, which is selectable to enable the motion mode of operation, and option 720b, which is selectable to cease display of notification 718 without enabling the motion mode of operation. In some embodiments, enabling the motion mode of operation permits display of content that utilizes environment tracking (e.g., user interface 710) even as the one or more environment-tracking errors persist. However, if the motion mode of operation is not enabled, content that utilizes environment tracking (e.g., user interface 710) is not displayed when environment-tracking errors are detected. Accordingly, selection of option 720a allows for re-display of user interface 710 even as the motion-related environment-tracking errors persist, whereas selection of option 720b would result in user interface 710 not being displayed while the motion-related environment-tracking errors continue to be detected. At FIG. 7E2, HMD X700 detects user input X722 corresponding to selection of option 720a. In some embodiments, HMD X700 detects selection of option 720a (e.g., user input X722) based on an air gesture performed by a user of HMD X700. In some embodiments, HMD X700 detects hands X750A and/or X750B of the user of HMD X700 and determines whether motion of hands X750A and/or X750B perform a predetermined air gesture corresponding to selection of option 720a. In some embodiments, the predetermined air gesture selecting option 720a includes a pinch gesture. In some embodiments, the pinch gesture includes detecting movement of finger X750C and thumb X750D toward one another. In some embodiments, HMD X700 detects selection of option 720a (e.g., user input X722) based on a gaze and air gesture input performed by the user of HMD X700. In some embodiments, the gaze and air gesture input includes detecting that the user of HMD X700 is looking at option 720a (e.g., for more than a predetermined amount of time) and hands X750A and/or X750B of the user of HMD X700 perform a pinch gesture.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 7F:
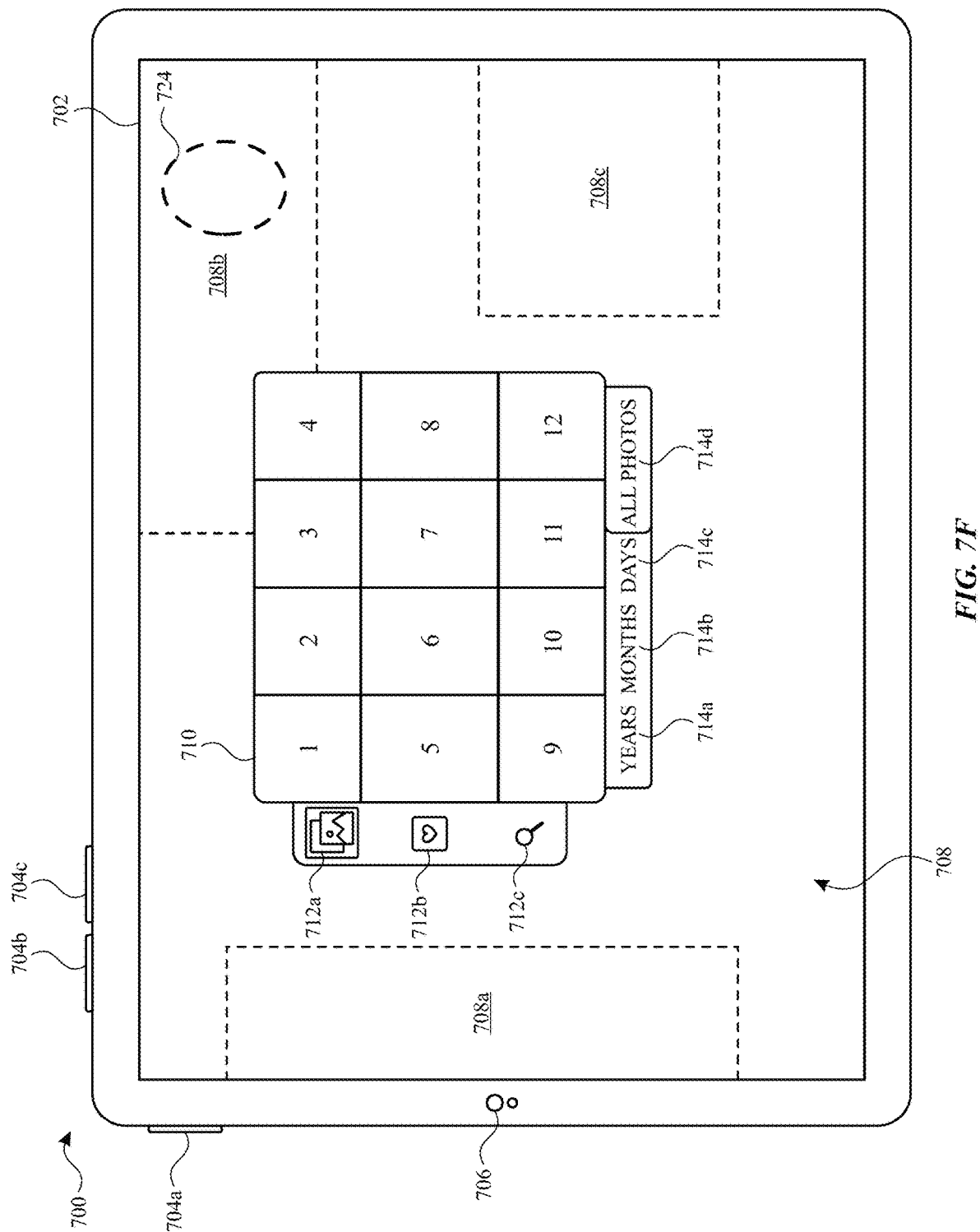

At FIG. 7F, in response to detecting user input 722, electronic device 700 enables the motion mode of operation, and re-displays user interface 710 even as the motion-related environment-tracking error continue to be detected. In some embodiments, prior to detecting the environment-tracking errors (e.g., while environment-tracking errors are not detected), electronic device 700 displays user interface 710 at a particular position within three-dimensional environment 708 based on detection of one or more physical objects within the physical environment that surrounds electronic device 700 and/or based on detection of a ground plane of the physical environment that surrounds electronic device 700. However, in some embodiments, while the motion mode of operation is enabled and/or while one or more environment-tracking errors are detected, electronic device 700 displays user interface 710 at a particular position within three-dimensional environment 708 based on a simulated surface plane that does not require and/or does not utilize detection of a physical ground plane in the physical environment that surrounds electronic device 700. At FIG. 7F, electronic device 700 detects user input 724. User input 724 is detected at a predefined location (e.g., within three-dimensional environment 708, within a viewpoint of electronic device 700, and/or within display 702 (e.g., a top-right corner of display 702 and/or the top-right corner of the viewpoint of electronic device 700)) that corresponds to a system user interface. In FIG. 7F, user input 724 is a touch input on touch-sensitive display 702. However, in some embodiments, user input 724 is a different type of user input, such as a gesture or other action taken by a user. For example, in some embodiments, electronic device 700 is a head-mounted system, and detecting user input 724 includes, for example, detecting a user performing a gesture (e.g., an air gesture (e.g., an air tap gesture; and/or an air pinch gesture)) while electronic device 700 is worn, detecting a button press while electronic device 700 is worn, detecting rotation of a rotatable input mechanism while electronic device 700 is worn, detecting a gaze-based gesture (e.g., detecting the user looking at the predefined location), and/or any combination of the foregoing (e.g., detecting a gaze at the predefined location in conjunction with an air pinch gesture).

Figure 7G:
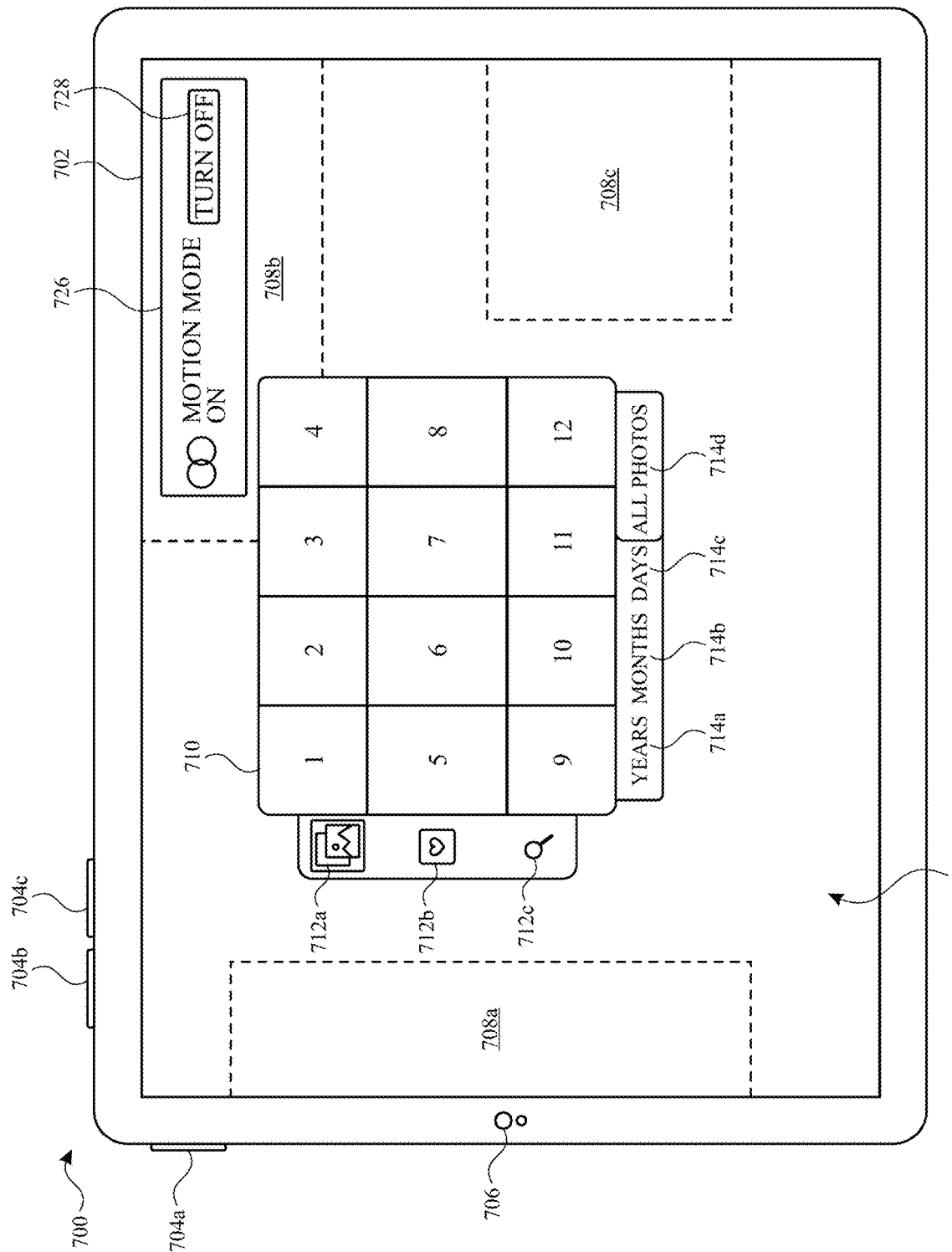

At FIG. 7G, in response to detecting user input 724, electronic device 700 displays user interface 726, which indicates that the motion mode of operation is currently enabled. User interface 726 also includes option 728 that is selectable to disable the motion mode of operation.

Figure 7H:
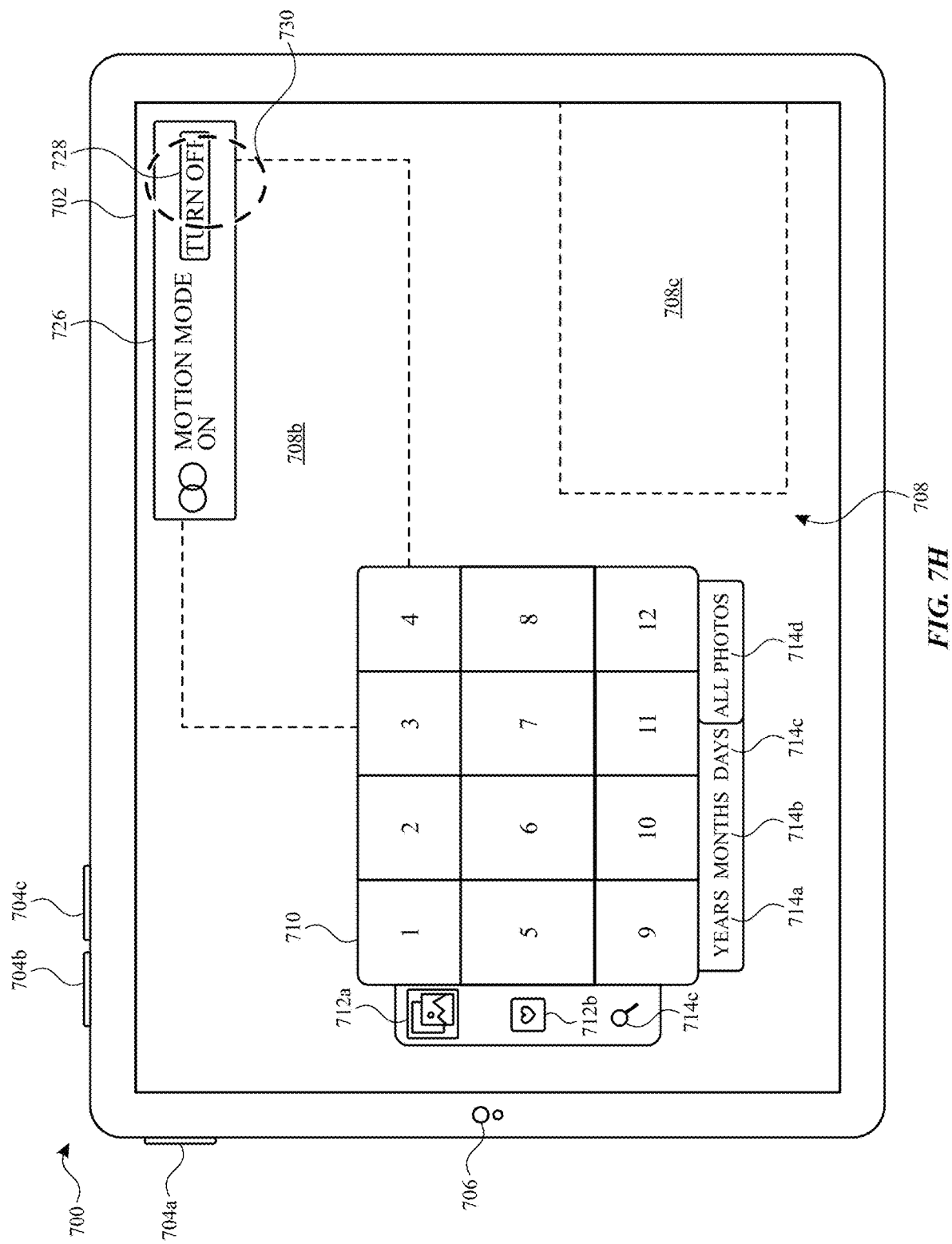

At FIG. 7H, the viewpoint of electronic device 700 has changed, as demonstrated by movement of objects 708a-708c of three-dimensional environment 708. In the depicted embodiments, user interface 710 is an environment-locked virtual object, while user interface 726 is a viewpoint-locked virtual object. Accordingly, user interface 710 moves as the viewpoint of electronic device 700 moves (e.g., such that user interface 710 maintains a substantially constant location within three-dimensional environment 708), whereas user interface 726 does not move as the viewpoint of electronic device 700 moves. In some embodiments, electronic device 700 is a head-mounted system that is worn on the head of a user. In some embodiments, changing of the viewpoint of electronic device 700 occurs based on movement of the user's head while the user wears electronic device 700 on his or her head. At FIG. 7H, electronic device 700 detects user input 730 corresponding to selection of option 728. In FIG. 7H, user input 730 is a tap input on touch-sensitive display 702. However, in some embodiments, user input 730 is a different type of user input, such as a gesture or other action taken by a user. For example, in some embodiments, electronic device 700 is a head-mounted system, and detecting user input 730 includes, for example, detecting a user performing a gesture (e.g., an air gesture (e.g., an air tap gesture; and/or an air pinch gesture)) while electronic device 700 is worn, detecting a button press while electronic device 700 is worn, detecting rotation of a rotatable input mechanism while electronic device 700 is worn, detecting a gaze-based gesture (e.g., detecting the user looking at an object and/or moving his or her gaze in a particular manner), and/or any combination of the foregoing (e.g., detecting a gaze at option 728 in conjunction with an air pinch gesture).

Figure 7I:
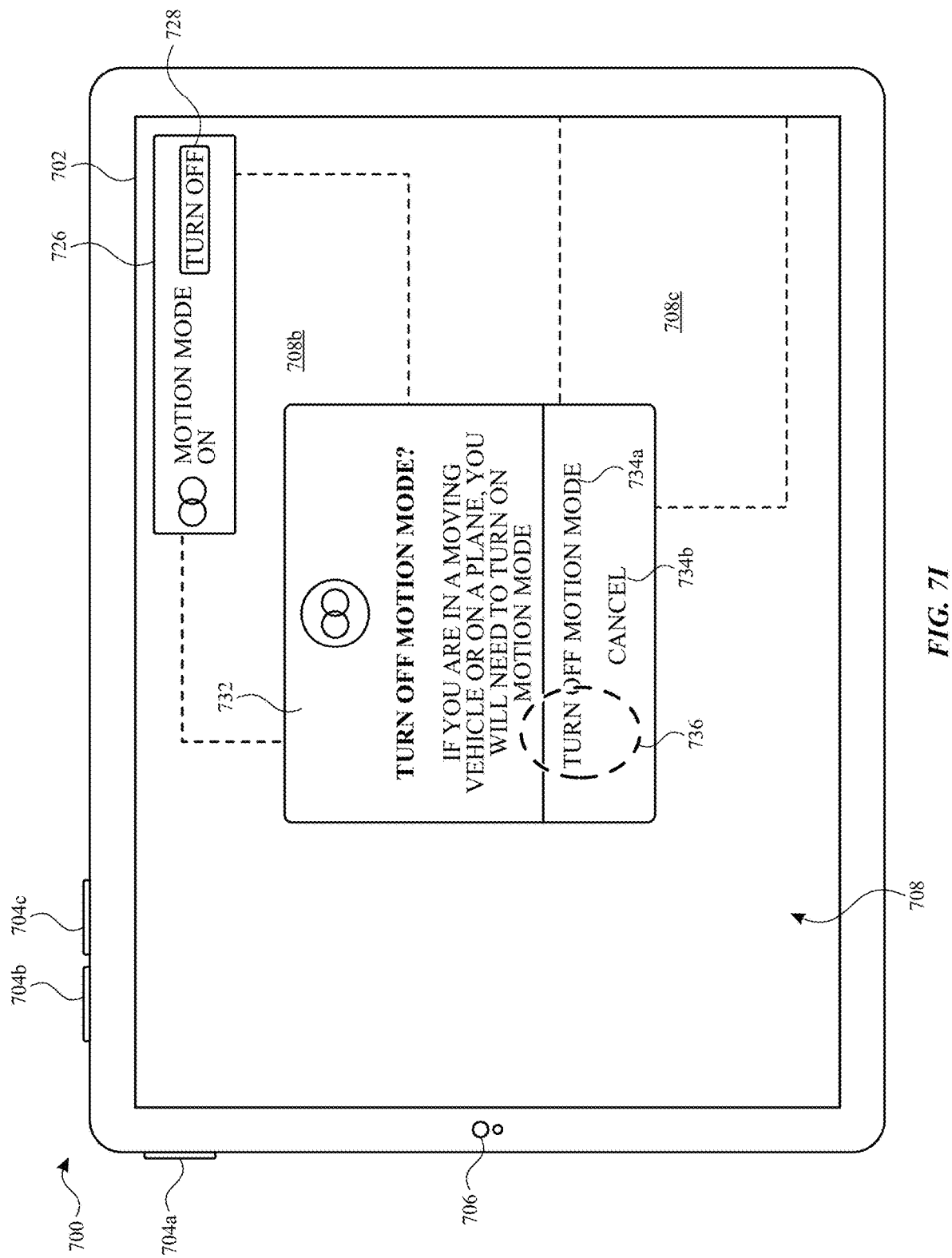

At FIG. 7I, in response to detecting user input 730, electronic device 700 ceases display of user interface 710, and displays user interface 732. User interface 732 includes option 734a that is selectable to disable the motion mode of operation. User interface 732 also includes option 734b that is selectable to cease display of user interface 732 while maintaining the motion mode of operation in the enabled state (and, in some embodiments, re-display user interface 710 with the motion mode of operation enabled). At FIG. 7I, electronic device 700 detects user input 736 corresponding to selection of option 734a. In FIG. 7I, user input 736 is a tap input on touch-sensitive display 702. However, in some embodiments, user input 736 is a different type of user input, such as a gesture or other action taken by a user. For example, in some embodiments, electronic device 700 is a head-mounted system, and detecting user input 736 includes, for example, detecting a user performing a gesture (e.g., an air gesture (e.g., an air tap gesture; and/or an air pinch gesture)) while electronic device 700 is worn, detecting a button press while electronic device 700 is worn, detecting rotation of a rotatable input mechanism while electronic device 700 is worn, detecting a gaze-based gesture (e.g., detecting the user looking at an object and/or moving his or her gaze in a particular manner), and/or any combination of the foregoing (e.g., detecting a gaze at option 734a in conjunction with an air pinch gesture).

Figure 7J:
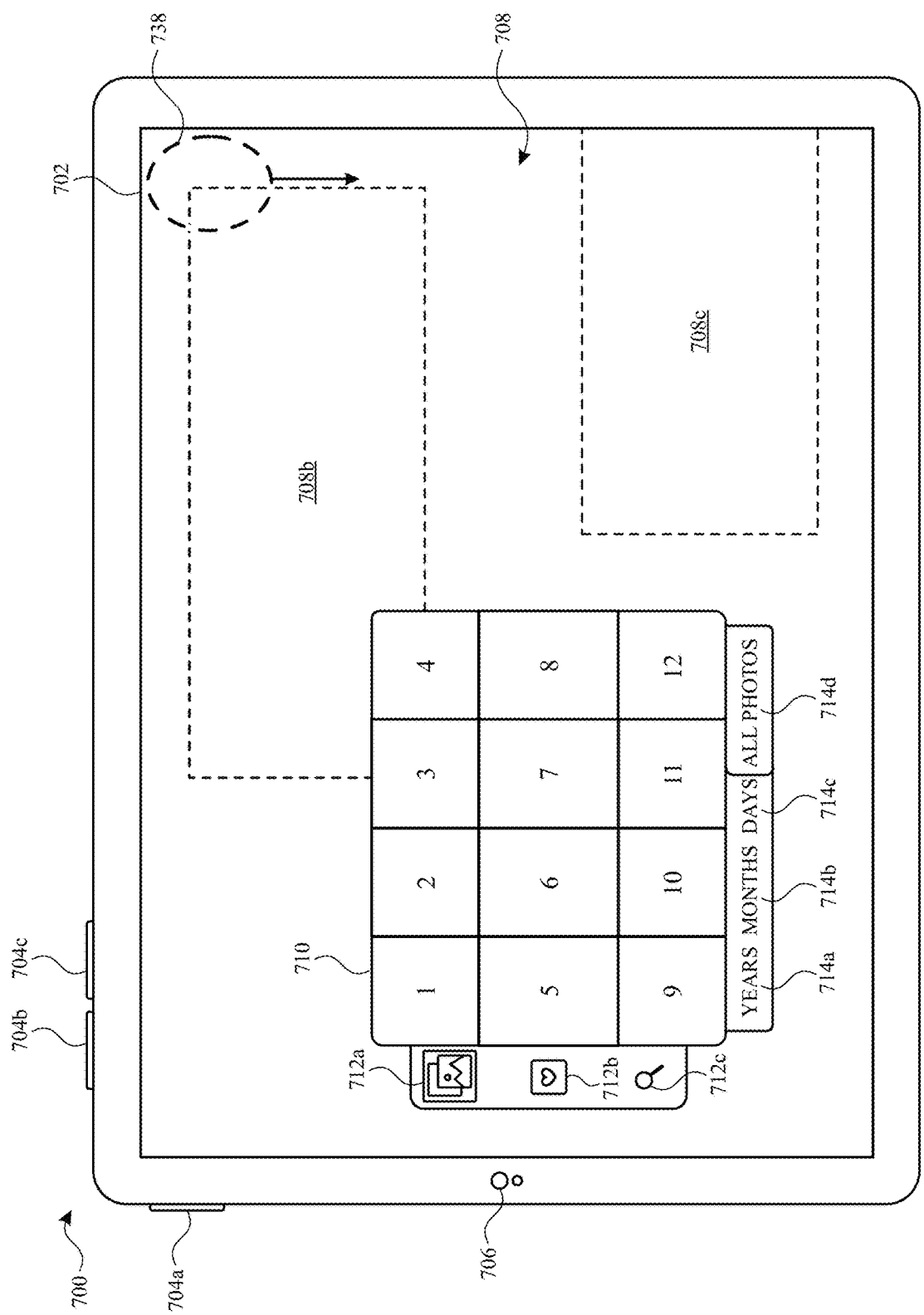

At FIG. 7J, in response to detecting user input 736, electronic device 700 disables the motion mode of operation. The depicted embodiments show an example scenario in which a user manually disables the motion mode of operation. In some embodiments, electronic device 700 automatically disables the motion mode of operation when one or more criteria are satisfied. For example, in some embodiments, electronic device 700 automatically disables the motion mode of operation when a threshold duration of time has elapsed since the motion mode of operation was enabled. In some embodiments, electronic device 700 automatically disables the motion mode of operation based on device context information. For example, in some embodiments, electronic device 700 uses calendar information, digital wallet information, digital boarding pass information, or other available information to determine that the user was traveling, but has now completed scheduled travel (e.g., a flight, a bus ride, a train ride, and/or a boat ride has completed), and automatically disables the motion mode of operation based on a determination that the user has completed scheduled travel.

In FIG. 7J, the motion mode of operation is disabled, but electronic device 700 no longer detects one or more errors (e.g., one or more motion-related errors and/or one or more non-motion-related errors) pertaining to tracking of the physical environment that surrounds electronic device 700. This can occur, for example, if electronic device 700 is no longer in a moving vehicle (e.g., the user has completed travel and/or is no longer traveling). In accordance with a determination that electronic device 700 no longer detects any environment-tracking errors, electronic device 700 displays user interface 710 even with the motion mode of operation disabled. At FIG. 7J, electronic device 700 detects user input 738, which is a swipe down input in the top right corner of touch-sensitive display 702. In FIG. 7J, user input 738 is a touch-based input on touch-sensitive display 702. However, in some embodiments, user input 738 is a different type of user input, such as a gesture or other action taken by a user. For example, in some embodiments, electronic device 700 is a head-mounted system, and detecting user input 738 includes, for example, detecting a user performing a gesture (e.g., an air gesture (e.g., an air tap gesture; and/or an air pinch gesture)) while electronic device 700 is worn, detecting a button press while electronic device 700 is worn, detecting rotation of a rotatable input mechanism while electronic device 700 is worn, detecting a gaze-based gesture (e.g., detecting the user looking at an object and/or a predetermined location (e.g., a predetermined location within the viewpoint of the user and/or electronic device 700), and/or moving his or her gaze in a particular manner), and/or any combination of the foregoing (e.g., detecting a gaze at a predetermined location (e.g., a predetermined location within the viewpoint of the user and/or electronic device 700) in conjunction with an air pinch gesture).

Figure 7K:
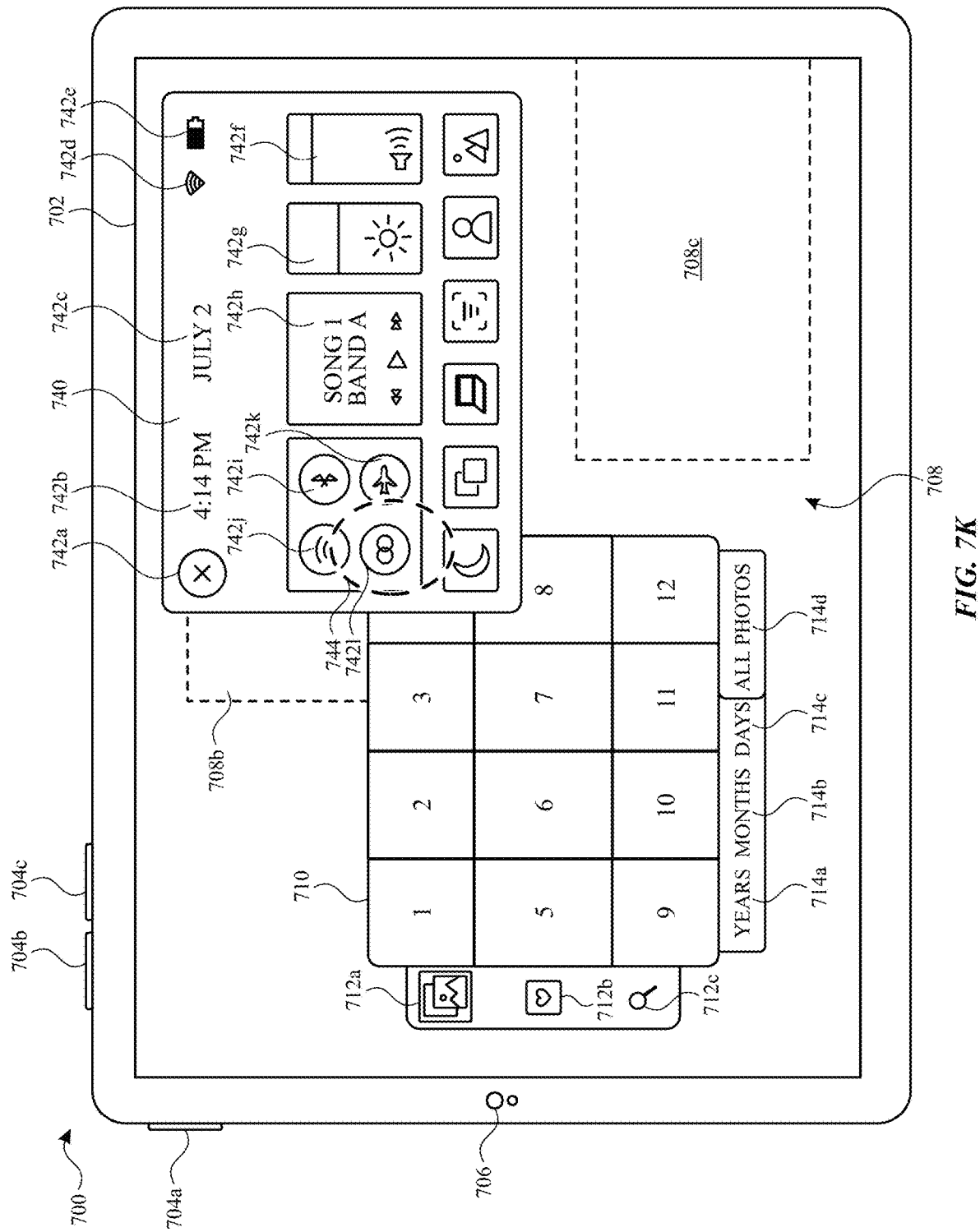

At FIG. 7K, in response to detecting user input 738, electronic device 700 displays control center user interface 740. Control center user interface 740 includes option 742a that is selectable to cease display of control center user interface 740, current time information 742b, current date information 742c, wifi signal information 742d, and battery level information 742c. Control center user interface 740 also includes audio output controls 742*h*, display brightness control 742*g*, and volume control 742*f*. Control center user interface 740 also includes wifi control 742*j* that is selectable to selectively enable or disable wifi, Bluetooth control 742*i* that is selectable to selectively enable or disable Bluetooth, airplane mode option 742*k* that is selectable to selectively enable or disable an airplane mode of operation, and motion mode option 742*l* that is selectable to selectively enable or disable the motion mode of operation. In some embodiments, option 742*l* is displayed in a first manner (e.g., a first color) when the motion mode of operation is enabled, and in a second manner (e.g., a second color) when the motion mode of operation is disabled.

Additional descriptions regarding FIGS. 7A-7K are provided below in reference to method 800 described with respect to FIG. 8.

FIG. 8 is a flow diagram of an exemplary method 800 for providing content that utilizes environment tracking, in some embodiments. In some embodiments, method 800 is performed at a computer system (e.g., computer system 101 in FIG. 1A) (e.g., 700 and/or X700) (e.g., a smart phone, a smart watch, a tablet, a laptop, a desktop, a wearable device, and/or head-mounted device) that is in communication with one or more display generation components (e.g., 702 and/or X702) (e.g., display generation component 120 in FIGS. 1A, 3, and 4) (e.g., a heads-up display, a display, a touchscreen, a projector, etc.) (e.g., a visual output device, a 3D display, a display having at least a portion that is transparent or translucent on which images can be projected (e.g., a see-through display), a projector, a heads-up display, and/or a display controller) and one or more input devices (e.g., 702, 704*a*-704*c*, and/or 706) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an environment scanning device (e.g., radar, lidar, and/or one or more cameras); a motion sensor (e.g., gyroscope, accelerometer, and/or GPS sensor); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

In some embodiments, the computer system (e.g., 700 and/or X700) displays (802), via the one or more display generation components (e.g., 702 and/or X702), visual content (e.g., 710) that utilizes environment tracking of a physical environment (e.g., represented by 708) that surrounds the computer system (e.g., keeping track of the position(s) of one or more objects in the physical environment (e.g., relative to the computer system) and/or keeping track of the position of the computer system within the physical environment) (e.g., visual content that includes one or more environment-locked objects; and/or visual content that is configured to be displayed in a fixed position within a three-dimensional environment (e.g., 708) (e.g., a three-dimensional environment that is displayed by the one or more display generation components (e.g., 702 and/or X702) based on the physical environment that surrounds the computer system (e.g., a virtual passthrough environment) and/or a physical three-dimensional environment (e.g., 708) that is visible via the one or more display generation components (e.g., an optical passthrough environment))). In some embodiments, the visual content (e.g., 710) that utilizes environment tracking of a physical environment is and/or includes AR and/or VR content. In some embodiments, the visual content that utilizes environment tracking of a physical environment is and/or includes environment-locked content that is displayed at a position within a physical environment (e.g., 708), and that is updated to remain visually fixed relative to one or more physical objects and/or landmarks in the physical environment.

While displaying the visual content (e.g., 710) (804), the computer system (e.g., 700 and/or X700) detects, via the one or more input devices (e.g., 706), one or more error conditions pertaining to the environment tracking of the physical environment that surrounds the computer system (e.g., FIGS. 7D-7E2) (e.g., the physical environment is no longer visible and/or detectable by the computer system; lighting conditions that make the physical environment no longer visible and/or detectable by the computer system; and/or inconsistent sensor readings pertaining to the physical environment by two or more sensors of the computer system (e.g., environment scanning readings (e.g., camera, radar, and/or lidar) that indicate that the computer system is not moving (e.g., not moving relative to the physical environment) that are inconsistent with movement sensor readings (e.g., accelerometer, gyroscope, and/or GPS) that indicate that the computer system is moving)). In response to detecting the one or more error conditions pertaining to the environment tracking of the physical environment that surrounds the computer system (806), the computer system ceases (808) display of the visual content (e.g., 710) (e.g., FIGS. 7D-7E2, electronic device 700 and/or HMD X700 ceases display of user interface 710) (e.g., in some embodiments, the computer system ceases display of the visual content and displays other content different from the visual content). In some embodiments, the computer system ceases display of the visual content (e.g., 710) that utilizes environment tracking of a physical environment (e.g., environment-locked and/or world-locked content), while maintaining display of other content that does not utilize environment tracking of the physical environment (e.g., head-locked and/or viewpoint-locked content)). In accordance with a determination that the one or more error conditions pertain to motion of the computer system (810) (e.g., FIGS. 7E1 and/or 7E2) (e.g., the one or more error conditions include one or more determinations about movement and/or motion of the computer system; the one or more error conditions include one or more determinations made based on data provided by one or more motion sensors of the computer system (e.g., gyroscope, accelerometer, and/or GPS); and/or inconsistent sensor readings pertaining to the physical environment by two or more sensors of the computer system (e.g., environment scanning readings (e.g., camera, radar, and/or lidar) that indicate that the computer system is not moving (e.g., not moving relative to the physical environment) that are inconsistent with movement sensor readings (e.g., accelerometer, gyroscope, and/or GPS) that indicate that the computer system is moving)), the computer system displays (812), via the one or more display generation components (e.g., 702 and/or X702), a first selectable option (e.g., 720*a*) that is selectable to re-display the visual content (e.g., 710) while the one or more error conditions persist.

While displaying the first selectable option (e.g., 720*a*) and not displaying the visual content (e.g., 710) (e.g., FIGS.

7E1 and/or 7E2) (814), the computer system receives, via the one or more input devices, a user input (e.g., 722 and/or X722) corresponding to selection of the first selectable option. In response to receiving the user input (e.g., 722 and/or X722) corresponding to selection of the first selectable option (e.g., 720*a*) (816), the computer system re-displays, via the one or more display generation components, the visual content (e.g., 710 in FIG. 7F) while the one or more error conditions pertaining to motion of the computer system persist (e.g., while the computer system is compensating for or ignoring the one or more error conditions pertaining to motion of the computer system). In some embodiments, in response to detecting the one or more error conditions pertaining to the environment tracking of the physical environment that surrounds the computer system, and in accordance with a determination that the one or more error conditions do not pertain to motion of the computer system (e.g., pertain to lighting conditions and/or non-motion-based errors), the computer system forgoes display of the first selectable option (e.g., FIG. 7D).

Ceasing display of visual content that utilizes environment tracking when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking). Displaying an option that is selectable to re-display the visual content while the one or more error conditions persist based on a determination that the one or more error conditions pertain to motion of the computer system also enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has determined that the one or more error conditions pertain to movement of the device).

In some embodiments, ceasing display of the visual content (e.g., 710) includes (e.g., causes and/or results in) revealing at least a portion of representation of a three-dimensional environment (e.g., 708) (e.g., in FIGS. 7E1 and/or 7E2, portions of three-dimensional environment 708 that were not visible in FIG. 7C become visible) (e.g., a three-dimensional environment that at least partially surrounds the visual content, an optical passthrough three-dimensional environment and/or a virtual passthrough three-dimensional environment) (e.g., a portion of the three-dimensional environment that was masked, was visually obscured, was not visible, and/or was not displayed while the visual content was displayed). In some embodiments, based on (e.g., as a result of and/or in response to) the computer system ceasing display of the visual content, at least a portion of the three-dimensional environment ceases to be masked and/or visually obscured. In some embodiments, based on (e.g., as a result of and/or in response to) the computer system ceasing display of the visual content, at least a portion of the three-dimensional environment is displayed by the computer system (e.g., via the one or more display generation components). Ceasing display of visual content that utilizes environment tracking when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, in response to detecting the one or more error conditions pertaining to the environment tracking of the physical environment that surrounds the computer system: in accordance with a determination that the one or more error conditions do not pertain to motion of the computer system (e.g., FIG. 7D) (e.g., pertain to lighting conditions, visibility conditions, and/or non-motion-based errors), the computer system forgoes display of the first selectable option (e.g., 720*a*) (e.g., FIG. 7D does not include option 720*a*) (e.g., ceases display of the visual content (e.g., 710) without providing an option to re-display the visual content while the one or more error conditions pertaining to the environment tracking of the physical environment persist). Forgoing display of the first selectable option based on a determination that the one or more error conditions do not pertain to motion of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has determined that the one or more error conditions do not pertain to movement of the device).

In some embodiments, in response to detecting the one or more error conditions pertaining to the environment tracking of the physical environment that surrounds the computer system: in accordance with a determination that the one or more error conditions pertain to lighting in the physical environment (e.g., FIG. 7D) (e.g., an inadequate amount of light in the physical environment; an inadequate amount of light in the physical environment to identify and/or track one or more objects in the physical environment; and/or less than a threshold amount of light (e.g., less than 1000 lumens, less than 500 lumens, less than 250 lumens, less than 100 lumens, less than 50 lumens, less than 25 lumens, and/or less than 10 lumens)), the computer system forgoes display of the first selectable option (e.g., FIG. 7D does not include option 720*a*) (e.g., ceases display of the visual content without providing an option to re-display the visual content while the one or more error conditions pertaining to the environment tracking of the physical environment persist). Forgoing display of the first selectable option based on a determination that the one or more error conditions pertain to lighting in the physical environment enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has determined that the one or more error conditions do not pertain to movement of the device).

In some embodiments, subsequent to ceasing display of the visual content (e.g., 710) and while not displaying the visual content, the computer system ceases to detect the one or more error conditions pertaining to the environment tracking of the physical environment (e.g., detects that the one or more error conditions pertaining to the environment tracking of the physical environment have been resolved; detects that the one or more error conditions pertaining to the environment tracking of the physical environment are no longer active; and/or detects that the one or more error conditions pertaining to the environment tracking of the physical environment are no longer satisfied). In response to ceasing to detecting the one or more error conditions pertaining to the environment tracking of the physical environment, the computer system (e.g., 700 and/or X700) displays (e.g., re-displaying and/or resuming display of), via the one or more display generation components, the visual content (e.g., 710) (e.g., in FIG. 7J, computer system 700 and/or HMD X700 re-displays user interface 710 based on a determination that environment-tracking errors are not detected). Automatically re-displaying the visual content when the one or more error conditions cease to be detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has determined that the one or more error conditions are no longer detected).

In some embodiments, displaying the visual content (e.g., 710) that utilizes environment tracking of the physical environment (e.g., FIG. 7C) comprises: displaying the visual content (e.g., 710) at a first position within a three-dimensional environment (e.g., 708) (e.g., a virtual environment, an optical passthrough environment, and/or a virtual passthrough environment) based on a detected ground plane (e.g., a detected floor and/or a detected ground surface) (e.g., a ground plane detected using one or more of: object recognition, accelerometer data, and/or gyroscope data) in the physical environment (e.g., displaying the visual content at a first position relative to a first object and/or a first surface in the three-dimensional environment, wherein the first object and/of the first surface corresponds to the detected surface plane in the physical environment). In some embodiments, re-displaying the visual content (e.g., 710) while the one or more error conditions pertaining to motion of the computer system persist (e.g., FIG. 7F) comprises: displaying the visual content (e.g., 710) at a second position within the three-dimensional environment (e.g., 708) based on a simulated surface plane that does not rely on detection of a ground plane in the physical environment (e.g., displaying the visual content at the second position within the three-dimensional environment based on the simulated surface plane without detecting the ground plane in the physical environment). Automatically displaying visual content based on a detected ground plane when the one or more error conditions are not detected, and displaying visual content based on a simulated ground plane when the one or more error conditions are detected, allows for performance of these operations with fewer and/or no user inputs. Furthermore, doing so enhances the operability of the system and makes the user-System interface more efficient (e.g., by helping the user to provide proper inputs and reducing errors) which, additionally, reduces power usage and improves battery life of the device by enabling the user to use the system more quickly and efficiently.

In some embodiments, in response to receiving the user input (e.g., 722 and/or X722) corresponding to selection of the first selectable option (e.g., 720a), the computer system transitions the computer system from operating in a first mode (e.g., a default mode and/or a non-motion mode) to operating in a second mode (e.g., a motion mode and/or a mode indicating the user and/or the computer system are in motion (e.g., in a vehicle)), wherein: in the first mode, the visual content (e.g., 710) is not permitted to be displayed while the one or more error conditions pertaining to motion of the computer system persist; and in the second mode, the visual content (e.g., 710) is permitted to be displayed while the one or more error conditions pertaining to motion of the computer system persist (e.g., as is the case in FIG. 7F). While operating the computer system in the second mode, the computer system displays, via the one or more display generation components, an indication (e.g., 726 and/or 742*l*) that the computer system is operating in the second mode (e.g., and is not operating in the first mode). Displaying an indication that the computer system is operating in the second mode enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device is operating in the second mode).

In some embodiments, the computer system displays, via the one or more display generation components (e.g., 702 and/or X702) and concurrently with the indication (e.g., 726 and/or 742*l*) that the computer system is operating in the second mode, a mode selection option (e.g., 728 and/or 742*l*) (e.g., a mode selection option that is selectable to transition the computer system from operating in the second state to operating in the first state; and/or a mode selection option that is selectable by a user to indicate a user request to transition the computer system from operating in the second state to operating in the first state). While displaying the mode selection option (e.g., 728 and/or 742*l*), the computer system receives, via the one or more input devices, one or more user inputs (e.g., 730 and/or 736) (e.g., one or more hardware inputs (e.g., pushing a button and/or rotation of a rotatable input mechanism), one or more touch inputs, one or more gesture inputs, one or more air gesture inputs, and/or one or more gaze inputs) that correspond to selection of the mode selection option (e.g., 728 and/or 742*l*). In response to receiving the one or more user inputs (e.g., 730 and/or 736) that correspond to selection of the mode selection option, the computer system transitions the computer system from operating in the second mode to operating in the first mode. Providing a mode selection option that is selectable to switch the computer system from operating in the second mode to operating in the first mode enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the one or more user inputs that correspond to selection of the mode selection option includes: a first user input (e.g., 730) (e.g., one or more hardware inputs (e.g., pushing a button and/or rotation of a rotatable input mechanism), one or more touch inputs, one or more gesture inputs, one or more air gesture inputs, and/or one or more gaze inputs) corresponding to selection of the mode selection option (e.g., 728); and a second user input (e.g., 736) (e.g., one or more hardware inputs (e.g., pushing a button and/or rotation of a rotatable input mechanism), one or more touch inputs, one or more gesture inputs, one or more air gesture inputs, and/or one or more gaze inputs) subsequent to the first user input that is indicative of user confirmation of a user request to transition the computer system from operating in the second mode to operating in the first mode. Requiring a confirmation user input to switch the computer system from operating in the second mode to operating in the first mode enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the user input (e.g., 722 and/or X722) corresponding to selection of the first selectable option (e.g., 720*a*), the computer system transitions the computer system from operating in a first mode of operation (e.g., a default mode and/or a non-motion mode) to operating in a second mode of operation (e.g., a motion mode and/or a mode indicating the user and/or the computer system are in motion (e.g., in a vehicle)), wherein: in the first mode of operation, the visual content (e.g., 710) is not permitted to be displayed while the one or more error conditions pertaining to motion of the computer system persist; and in the second mode of operation, the visual content (e.g., 710) is permitted to be displayed while the one or more error conditions pertaining to motion of the computer system persist (e.g., as in FIG. 7F). In some embodiments, the computer system transitions the computer system from a powered off state to a powered on state. In accordance with a determination that the computer system (e.g., 700 and/or X700) was operating in the first mode of operation (e.g., FIGS. 7A-7C) when the computer system was most recently transitioned from the powered on state to the powered off state, the computer system is operated in the first mode of operation when transitioned from the powered off state to the powered on state; and in accordance with a determination that the computer system (e.g., 700 and/or X700) was operating in the second mode of operation (e.g., FIGS. 7F-7H) when the computer system was most recently transitioned from the powered on state to the powered off state, the computer system is operated in the second mode of operation when transitioned from the powered off state to the powered on state. In some embodiments, the second mode of operation persists through rebooting of the computer system. Maintaining the computer system in the second mode of operation when the computer system is turned off and on and/or when the computer system is rebooted enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the user input (e.g., 722 and/or X722) corresponding to selection of the first selectable option (e.g., 720*a*), the computer system transitions the computer system from operating in a first state (e.g., a default mode and/or a non-motion mode) to operating in a second state (e.g., a motion mode and/or a state indicating the user and/or the computer system are in motion (e.g., in a vehicle)), wherein: in the first state, the visual content (e.g., 710) is not permitted to be displayed while the one or more error conditions pertaining to motion of the computer system persist; and in the second state, the visual content (e.g., 710) is permitted to be displayed while the one or more error conditions pertaining to motion of the computer system persist (e.g., as shown in FIG. 7F). While operating the computer system (e.g., 700 and/or X700) in the second state, the computer system detects that the computer system has been operating in the second state for a threshold duration of time (e.g., continuously and/or without being operated in the first state) (e.g., 30 min., 1 hour, 4 hours, 8 hours, 24 hours, or 48 hours). In response to detecting that the computer system has been operating in the second state for the threshold duration of time, the computer system transitions the computer system from operating in the second state to operating in the first state. Automatically transitioning the computer system from operating in the second state to operating in the first state based on a determination that the computer system has been operating in the second state for greater than a threshold duration of time allows for performance of these operations with fewer and/or no user inputs. Furthermore, doing so enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to receiving the user input (e.g., 722 and/or X722) corresponding to selection of the first selectable option (e.g., 734*a*), the computer system transitions the computer system from operating in a first state of operation (e.g., a default mode and/or a non-motion mode) to operating in a second state of operation (e.g., a motion mode and/or a state of operation indicating the user and/or the computer system are in motion (e.g., in a vehicle)), wherein: in the first state of operation, the visual content (e.g., 710) is not permitted to be displayed while the one or more error conditions pertaining to motion of the computer system persist; and in the second state of operation, the visual content (e.g., 710) is permitted to be displayed while the one or more error conditions pertaining to motion of the computer system persist (e.g., as in FIG. 7F). While operating the computer system (e.g., 700 and/or X700) in the second state of operation, the computer system (e.g., 700 and/or X700) detects that one or more device context criteria are satisfied. In response to detecting that the one or more device context criteria are satisfied, the computer system transitions the computer system from operating in the second state of operation to operating in the first state of operation (e.g., rather than a manual user input to disable the guest mode of operation, as shown in FIGS. 7H-7I, electronic device 700 and/or HMD X700 automatically disables the guest mode of operation based on detecting that the one or more device context criteria are satisfied). Automatically transitioning the computer system from operating in the second state of operation to operating in the first state of operation based on a determination that one or more device context criteria are satisfied allows for performance of these operations with fewer and/or no user inputs. Furthermore, doing so enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the one or more device context criteria include a calendar criterion that is satisfied based on calendar information. In some embodiments, the calendar information includes one or more entries in a calendar and/or one or more scheduled events in a calendar. In some embodiments, the one or more device context criteria includes a first criterion that is satisfied when a first calendar entry in a calendar indicates that the computer system is not currently in motion and/or is not currently in motion in a vehicle. In some embodiments, the one or more device context criteria includes a first criterion that is satisfied when a first calendar entry in a calendar indicates that the computer system is no longer in motion and/or is no longer in motion in a vehicle. In some embodiments, the one or more device context criteria includes a criterion that is satisfied when a calendar entry in a calendar indicates that a user of the computer system has completed scheduled travel (e.g., a calendar entry indicative of a "flight," "train ride," or "bus ride") (e.g., the user was traveling but is now no longer traveling). In some embodiments, the computer system transitions the computer system to operate in the second state of operation when calendar information indicates that the user is traveling (e.g., a "flight," a "train ride," or a "bus ride" calendar entry), and transitions the computer system from operating in the second state of operation to operating in the first state of operation when calendar information indicates that the user has completed traveling and/or is no longer traveling. Automatically transitioning the computer system from operating in the second state of operation to operating in the first state of operation based on calendar information allows for performance of these operations with fewer and/or no user inputs. Furthermore, doing so enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the one or more device context criteria include a vehicle connection criterion that is satisfied when the computer system (e.g., 700 and/or X700) transitions from being connected to one or more systems corresponding to a vehicle (e.g., airplane wifi, vehicle wifi, and/or vehicle Bluetooth) to no longer being connected to one or more systems corresponding to a vehicle (e.g., no longer being connected to airplane wifi, vehicle wifi, and/or vehicle Bluetooth). Automatically transitioning the computer system from operating in the second state of operation to operating in the first state of operation based on the computer system no longer being connected to a vehicle system allows for performance of these operations with fewer and/or no user inputs. Furthermore, doing so enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the one or more device context criteria include a digital wallet criterion that is satisfied when the computer system (e.g., 700 and/or X700) detects digital wallet information (e.g., airplane ticket information, train ticket information, bus ticket information, and/or other travel ticket information) indicating that the computer system has completed scheduled travel (e.g., digital wallet information indicating an arrival time (e.g., corresponding to a travel ticket) for the scheduled travel and/or digital wallet information indicating a departure time and travel duration (e.g., corresponding to a travel ticket) for the scheduled travel). Automatically transitioning the computer system from operating in the second state of operation to operating in the first state of operation based on digital wallet information indicating that the computer system has completed scheduled travel allows for performance of these operations with fewer and/or no user inputs. Furthermore, doing so enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, aspects/operations of methods 800 and/or 1000 may be interchanged, substituted, and/or added between these methods. For example, in some embodiments, the visual content in method 800 includes the real-time communication user interface of method 1000. For brevity, these details are not repeated here.

FIGS. 9A-9J illustrate examples of providing real-time communication content that utilizes environment tracking. FIG. 10 is a flow diagram of an exemplary method 1000 for providing real-time communication content that utilizes environment tracking. The user interfaces in FIGS. 9A-9J are used to illustrate the processes described below, including the processes in FIG. 10.

Figure 9A:
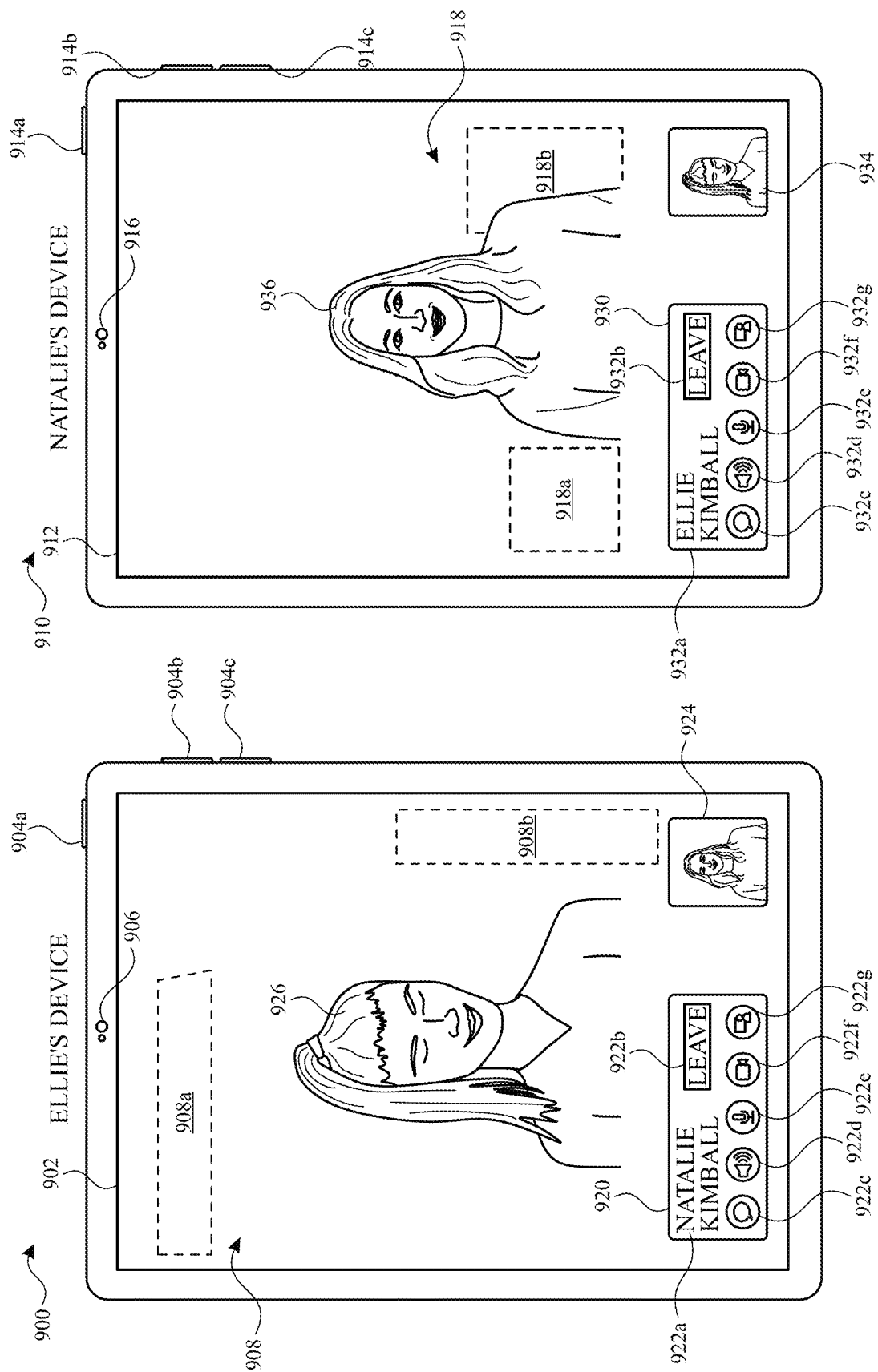

FIG. 9A depicts electronic device 900, which is a tablet that includes touch-sensitive display 902, buttons 904a-904c, and one or more input sensors 906 (e.g., one or more cameras, eye gaze trackers, hand movement trackers, and/or head movement trackers). In some embodiments described below, electronic device 900 is a tablet. In some embodiments, electronic device 900 is a smartphone, a wearable device, a wearable smartwatch device, a head-mounted system (e.g., headset), or other computer system that includes and/or is in communication with one or more display devices (e.g., display screens and/or projection devices). In some embodiments in which electronic device 900 is a head-mounted system, electronic device 900 optionally includes two displays (e.g., one for each eye of a user), with each display displaying respective various content, to enable a user of electronic device 900 to perceive the various depths of the various content (e.g., physical objects and/or virtual objects) of three-dimensional environments. Electronic device 900 is a computer system (e.g., computer system 101 in FIG. 1A).

FIG. 9A also depicts electronic device 910, which is a tablet that includes touch-sensitive display 912, buttons 914a-914c, and one or more input sensors 916 (e.g., one or more cameras, eye gaze trackers, hand movement trackers, and/or head movement trackers). In some embodiments described below, electronic device 910 is a tablet. In some embodiments, electronic device 910 is a smartphone, a wearable device, a wearable smartwatch device, a head-mounted system (e.g., headset), or other computer system that includes and/or is in communication with one or more display devices (e.g., display screens and/or projection devices). In some embodiments in which electronic device 910 is a head-mounted system, electronic device 910 optionally includes two displays (e.g., one for each eye of a user), with each display displaying respective various content, to enable a user of electronic device 910 to perceive the various depths of the various content (e.g., physical objects and/or virtual objects) of three-dimensional environments. Electronic device 910 is a computer system (e.g., computer system 101 in FIG. 1A).

In FIG. 9A, electronic device 900 corresponds to a registered user named Ellie, while electronic device 910 corresponds to a registered user named Natalie. Electronic device 900 displays user interface elements (e.g., 920, 924, 926) overlaid on three-dimensional environment 908, while electronic device 910 displays user interface elements (e.g., 936, 930, 934) overlaid on three-dimensional environment 918. In the depicted scenario, three-dimensional environment 908 includes objects 908a-908b and three-dimensional environment 918 includes objects 918-918b. In some embodiments, objects 908a-908b are three-dimensional objects that are spatially arranged around three-dimensional environment 908, and objects 918a-918b are three-dimensional objects that are spatially arranged around three-dimensional environment 918. For example, in some embodiments, objects 908a-908b are physical objects that are physically positioned around physical environment 908 and, similarly, in some embodiments, objects 918a-918b are physical objects that are physically positioned around physical environment 918. In some embodiments, objects 908a-908b are three-dimensional virtual objects that are positioned in different spatial positions within virtual environment 908 and, similarly, in some embodiments, objects 918a-918b are three-dimensional virtual objects that are positioned in different spatial positions within virtual environment 918. In some embodiments, as the viewpoint of the user of electronic device 900 changes (and/or, as the viewpoint of electronic device 900 changes) (e.g., as the user turns his or her head while electronic device 900 is worn on the user's head), different objects within three-dimensional environment 908 come into view of the user and/or electronic device 900 while certain objects exit the viewpoint of the user and/or electronic device 900. Similarly, as the viewpoint of the user of electronic device 910 changes (and/or, as the viewpoint of electronic device 910 changes) (e.g., as the user turns his or her head while electronic device 910 is worn on the user's head), different objects within three-dimensional environment 918 come into view of the user and/or electronic device 910 while certain objects exit the viewpoint of the user and/or electronic device 910. In some embodiments, three-dimensional environment 908 and/or three-dimensional environment 918 are displayed by a display (e.g., display 902 and/or display 912, as depicted in FIG. 9A). In some embodiments, three-dimensional environment 908 and/or three-dimensional environment 918 include virtual environments or images (or video) of physical environments captured by one or more cameras (e.g., one or more cameras that are part of input sensors 906 and/or one or more external cameras of electronic device 900; and/or one or more cameras that are part of input sensors 916 and/or one or more external cameras or electronic device 910). For example, in some embodiments, object 908a is a virtual object that is representative of a physical object that has been captured by one or more cameras and/or detected by one or more sensors of electronic device 900; object 908b is a virtual object that is representative of a second physical object that has been captured by one or more cameras and/or detected by one or more sensors of electronic device 900; object 918a is a virtual object that is representative of a third physical object that has been captured by one or more cameras and/or detected by one or more sensors of electronic device 910; and/or object 918b is a virtual object that is representative of a fourth physical object that has been captured by one or more cameras and/or detected by one or more sensors of electronic device 910, and so forth. In some embodiments, three-dimensional environment 908 is visible to a user of electronic device 900 (e.g., via display 902) and/or three-dimensional environment 918 is visible to a user of electronic device 910 (e.g., via display 912), but are not displayed by a display. For example, in some embodiments, three-dimensional environment 908 is a physical environment (and, for example, objects 908a-908b are physical objects) that is visible to a user (e.g., through one or more transparent displays 902) without being displayed by a display; and/or, in some embodiments, three-dimensional environment 918 is a physical environment (and, for example, objects 918a-918b are physical objects) that is visible to a user (e.g., through one or more transparent displays 912) without being displayed by a display. In some embodiments, user interface elements 920, 926, 924 and/or three-dimensional environment 908 are part of an extended reality experience; and/or user interface elements 936, 930, 934, and/or three-dimensional environment 918 are part of an extended reality experience.

In FIG. 9A, the user of electronic device 900 (e.g., Ellie) is participating in a real-time communication session with the user of electronic device 910 (e.g., Natalie). In FIG. 9A, electronic device 900 displays representation 926 that is a visual representation of the user of electronic device 910. In some embodiments, representation 926 moves based on detected movement of the user of electronic device 910 (e.g., detected using one or more sensors (e.g., 916) of electronic device 910). In some embodiments, representation 926 is a virtual representation (e.g., a virtual avatar). In some embodiments, representation 926 is a video representation (e.g., a video feed of the user of electronic device 910). Similarly, electronic device 910 displays representation 936 that is a visual representation of the user of electronic device 900. In some embodiments, representation 936 moves based on detected movement of the user of electronic 900 (e.g., detected using one or more sensors (e.g., 906) of electronic device 900). In some embodiments, representation 936 is a virtual representation (e.g., a virtual avatar). In some embodiments, representation 936 is a video representation (e.g., a video feed of the user of electronic device 900).

Electronic device 900 also displays self-view representation 924, which provides the user of electronic device 900 with a preview and/or an indication of how he or she appears and/or is being visually represented in the real-time communication session; and electronic device 910 displays self-view representation 934, which provides the user of electronic device 910 with a preview and/or an indication of how he or she appears and/or is being visually represented in the real-time communication session.

Electronic device 900 also displays user interface 920, which displays indication 922a identifying the other participant in the real-time communication session, and also includes options 922b-922g. Option 922b is selectable to end the real-time communication (and, for example, cease display of representation 926, user interface 920, and self-view representation 924). Option 922c is selectable to open a text messaging user interface on electronic device 900. Option 922d is selectable to selectively enable or disable a speaker and/or speakerphone of electronic device 900. Option 922e is selectable to selectively mute or unmute the user of electronic device 900 (e.g., selectively transmit audio or cease transmitting audio into the real-time communication session). Option 922f is selectable to selectively enable or disable video of the user of electronic device 900 (e.g., selectively transmit data indicative of captured movement of the user of electronic device 900 or cease transmitting this data into the real-time communication session; and/or selectively cause electronic device 910 to display or cease display of representation 936). Option 922g is selectable to screen-share in the real-time communication session.

Similarly, electronic device 910 also displays user interface 930, which displays indication 932a identifying the other participant in the real-time communication session, and also includes options 932b-932g. Option 932b is selectable to end the real-time communication (and, for example, cease display of representation 936, user interface 930, and self-view representation 934). Option 932c is selectable to open a text messaging user interface on electronic device 910. Option 932d is selectable to selectively enable or disable a speaker and/or speakerphone of electronic device 910. Option 9e2e is selectable to selectively mute or unmute the user of electronic device 910 (e.g., selectively transmit audio or cease transmitting audio into the real-time communication session). Option 932f is selectable to selectively enable or disable video of the user of electronic device 910 (e.g., selectively transmit data indicative of captured movement of the user of electronic device 910 or cease transmitting this data into the real-time communication session; and/or selectively cause electronic device 900 to display or cease display of representation 926). Option 932g is selectable to screenshare in the real-time communication session.

In some embodiments, virtual representation 926, user interface 920, and/or self-view representation 924 utilize environment tracking of a physical environment that surrounds computer system 900. For example, in some embodiments, three-dimensional environment 908 is representative of a physical environment that surrounds computer system 900 (e.g., three-dimensional environment 908 is a virtual passthrough environment that is displayed based on a detected physical environment that surrounds computer system 900; or three-dimensional environment 908 is an optical passthrough environment in which the physical environment that surrounds computer system 900 is visible). In some embodiments, virtual representation 926, user interface 920, and/or self-view representation 924 utilize environment tracking of the physical environment that surrounds computer system 900 in that one or more of these elements are environment-locked virtual objects that are displayed at a particular position within three-dimensional environment 908, and maintaining these elements at the particular position within three-dimensional environment 908 involves tracking one or more objects within three-dimensional environment 908 (e.g., objects 908a-908b). Similarly, in some embodiments, virtual representation 936, user interface 930, and/or self-view representation 934 utilize environment tracking of a physical environment that surrounds computer system 910. For example, in some embodiments, three-dimensional environment 918 is representative of a physical environment that surrounds computer system 910 (e.g., three-dimensional environment 918 is a virtual passthrough environment that is displayed based on a detected physical environment that surrounds computer system 910; or three-dimensional environment 918 is an optical passthrough environment in which the physical environment that surrounds computer system 910 is visible). In some embodiments, virtual representation 936, user interface 930, and/or self-view representation 934 utilize environment tracking of the physical environment that surrounds computer system 910 in that one or more of these elements are environment-locked virtual objects that are displayed at a particular position within three-dimensional environment 918, and maintaining these elements at the particular position within three-dimensional environment 918 involves tracking one or more objects within three-dimensional environment 918 (e.g., objects 918a-918b). In the depicted embodiments, representations 926, 936 are environment-locked virtual objects, whereas user interfaces 920, 930 and self-view representations 924, 934 are displayed as viewpoint-locked objects.

Figure 9C:
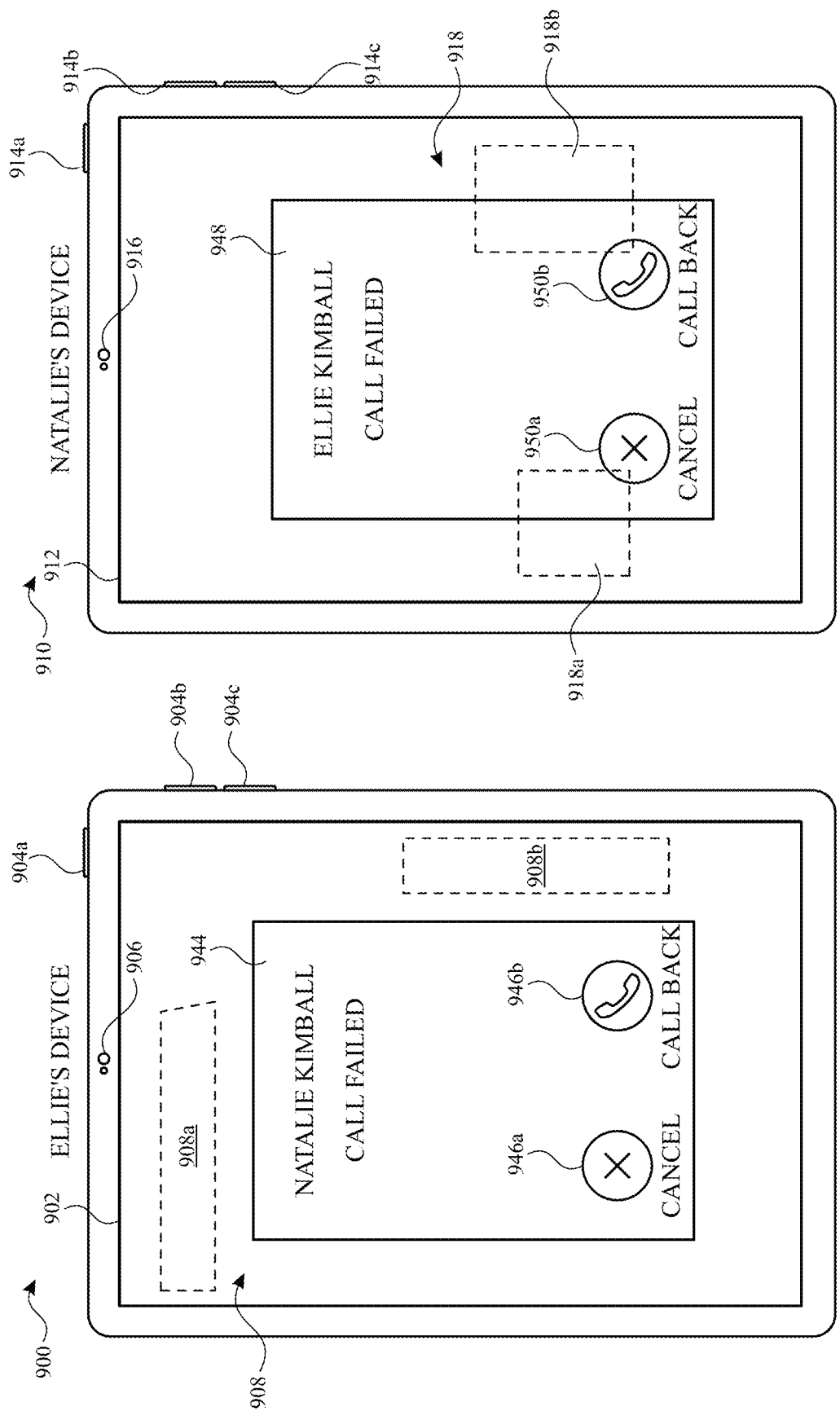
Figure 9D:
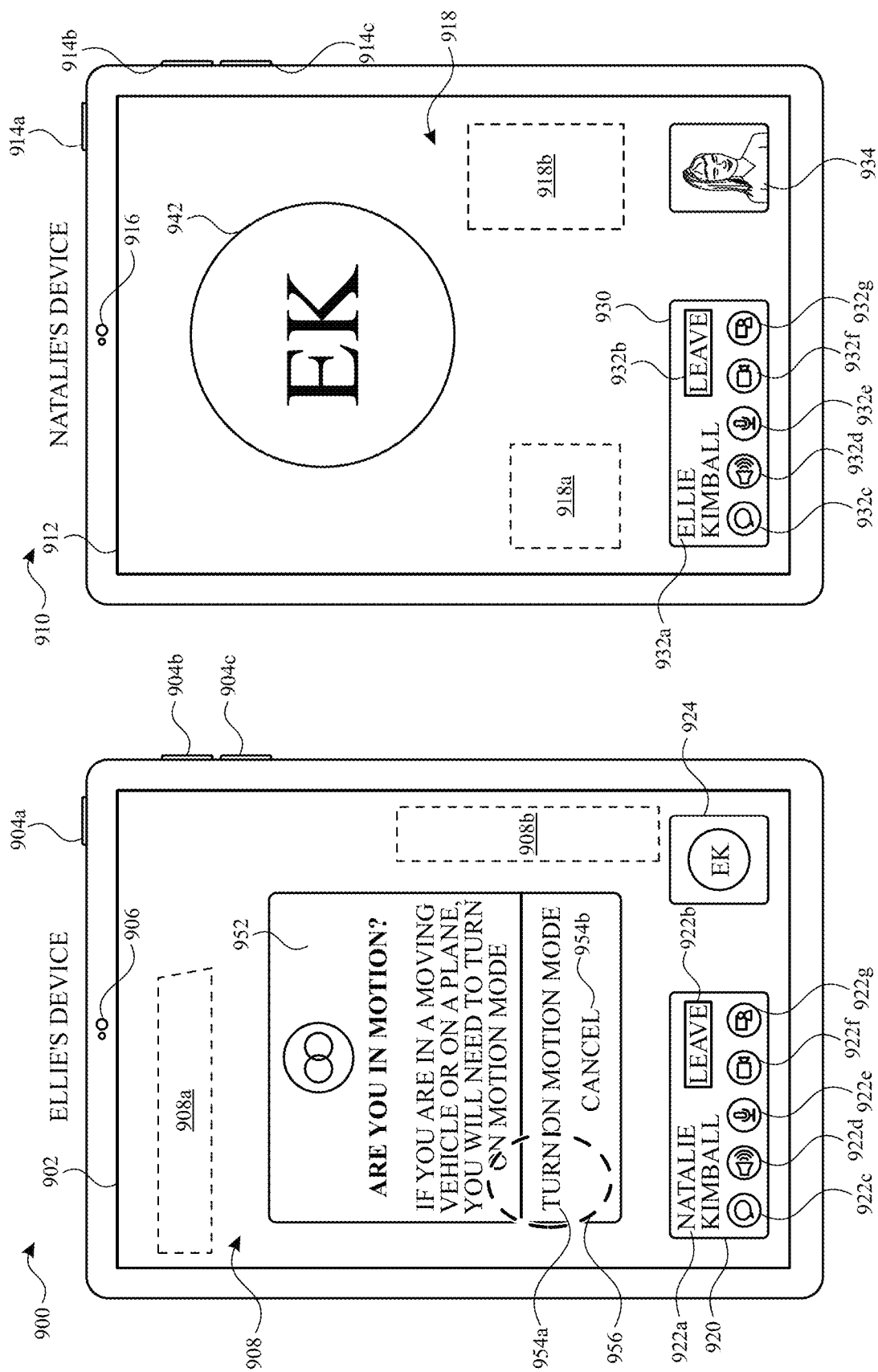

FIGS. 9B1 and 9D depict two example scenarios in which electronic device 900 detects one or more error conditions pertaining to tracking of the physical environment that surrounds electronic device 900 (e.g., a physical environment that is represented by three-dimensional environment 908). In some embodiments, the one or more error conditions pertaining to tracking of the physical environment include motion-related errors and non-motion-related errors. In some embodiments, motion-related errors include errors that pertain to movement and/or motion of electronic device 900 (e.g., within a physical and/or three-dimensional environment), whereas non-motion-related errors include errors that do not pertain to movement and/or motion of electronic device 900. For example, in some embodiments, motion-related errors include a first type of error in which a first set of data indicates that electronic device 900 is in motion, whereas a second set of data indicates that electronic device 900 is not motion. For example, a first set of data, such as GPS data, accelerometer data, and/or gyroscope data indicates that electronic device 900 is moving (e.g., from one geographic location to another), but a second set of data, such as camera data, radar data, and/or lidar data indicate that electronic device 900 is not moving (e.g., because physical objects surrounding electronic device 900 are staying substantially still and/or are staying relatively constant). This can occur, for example, when electronic device 900 is in a moving vehicle, and the vehicle is moving from one geographic location to another (e.g., which can be detected by GPS data, accelerometer data, and/or gyroscope data), but camera, radar, and/or lidar data indicate that electronic device 900 is maintaining its position within the same physical space (e.g., the interior of the vehicle). Such mismatched motion data is an example of one type of motion-related error. In some embodiments, non-motion-related errors include lighting condition errors and/or other visibility condition errors in which electronic device 900 detects that it has lost tracking of one or more physical objects and/or has failed to track one or more physical objects (e.g., based on poor lighting conditions and/or visibility conditions).

In some embodiments, electronic device 900 reacts differently to environment-tracking errors based on whether the environment-tracking error is a motion-related error or a non-motion-related error. FIG. 9B1 depicts an example scenario of a non-motion-related error, and FIG. 9D depicts an example scenario of a motion-related error.

At FIG. 9B1, electronic device 900 detects a non-motion-related error pertaining to tracking of a physical environment that surrounds electronic device 900 (e.g., low light and/or poor visibility). At FIG. 9B1, in response to detecting the non-motion-related error pertaining to tracking of the physical environment, electronic device 900 ceases display of representation 926, and displays notification 940. Notification 940 indicates that tracking of the physical environment that surrounds electronic device 900 has failed. Furthermore, in addition to ceasing display of representation 926, in response to detecting the non-motion-related error pertaining to tracking of the physical environment, electronic device 900 also causes electronic device 910 to cease display of representation 936, and the user of electronic device 900 is now displayed within the real-time communication session with a different visual representation 942 (e.g., a monogram representation). In some embodiments, visual representation 942 does not move based on detected movement of the user of electronic device 900.

In some embodiments, in FIG. 9B1, if electronic device 900 ceases detecting the non-motion-related error pertaining to tracking of the physical environment that surrounds electronic device 900 (e.g., electronic device 900 regains tracking of the physical environment), electronic device 900 and electronic device 910 return to the state shown in FIG. 9A.

In some embodiments, the techniques and user interface(s) described in FIGS. 9A-9J are provided by one or more of the devices described in FIGS. 1A-1P. For example, FIG. 9B2 illustrates an embodiment in which notification 940 (e.g., as described in FIG. 9B1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

FIG. 9B2 depicts an example scenario in which HMD X700 detects one or more error conditions pertaining to tracking of the physical environment that surrounds HMD X700 (e.g., a physical environment that is represented by three-dimensional environment 908). In some embodiments, the one or more error conditions pertaining to tracking of the physical environment include motion-related errors and non-motion-related errors. In some embodiments, motion-related errors include errors that pertain to movement and/or motion of HMD X700 (e.g., within a physical and/or three-dimensional environment), whereas non-motion-related errors include errors that do not pertain to movement and/or motion of HMD X700. For example, in some embodiments, motion-related errors include a first type of error in which a first set of data indicates that HMS X700 is in motion, whereas a second set of data indicates that HMD X700 is not motion. For example, a first set of data, such as GPS data, accelerometer data, and/or gyroscope data indicates that HMD X700 is moving (e.g., from one geographic location to another), but a second set of data, such as camera data, radar data, and/or lidar data indicate that HMD X700 is not moving (e.g., because physical objects surrounding HMD X700 are staying substantially still and/or are staying relatively constant). This can occur, for example, when HMD X700 is in a moving vehicle, and the vehicle is moving from one geographic location to another (e.g., which can be detected by GPS data, accelerometer data, and/or gyroscope data), but camera, radar, and/or lidar data indicate that HMD X700 is maintaining its position within the same physical space (e.g., the interior of the vehicle). Such mismatched motion data is an example of one type of motion-related error. In some embodiments, non-motion-related errors include lighting condition errors and/or other visibility condition errors in which HMD X700 detects that it has lost tracking of one or more physical objects and/or has failed to track one or more physical objects (e.g., based on poor lighting conditions and/or visibility conditions).

In some embodiments, HMD X700 reacts differently to environment-tracking errors based on whether the environment-tracking error is a motion-related error or a non-motion-related error. FIG. 9B2 depicts an example scenario of a non-motion-related error.

At FIG. 9B2, HMD X700 detects a non-motion-related error pertaining to tracking of a physical environment that surrounds HMD X700 (e.g., low light and/or poor visibility). At FIG. 9B2, in response to detecting the non-motion-related error pertaining to tracking of the physical environment, HMD X700 ceases display of representation 926, and displays notification 940. Notification 940 indicates that tracking of the physical environment that surrounds HMD X700 has failed. Furthermore, in addition to ceasing display of representation 926, in response to detecting the non-motion-related error pertaining to tracking of the physical environment, HMD X700 also causes HMD X910 to cease display of representation 936, and the user of HMD X700 is now displayed within the real-time communication session with a different visual representation 942 (e.g., a monogram representation). In some embodiments, visual representation 942 does not move based on detected movement of the user of HMD X700.

In some embodiments, in FIG. 9B2, if HMD X700 ceases detecting the non-motion-related error pertaining to tracking of the physical environment that surrounds HMD X700 (e.g., HMD X700 regains tracking of the physical environment), HMD X700 and HMD X910 return to the state shown in FIG. 9A.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

At FIG. 9C, electronic device 900 detects that the non-motion-related error has been detected for greater than a threshold duration of time (e.g., electronic device 900 has lost tracking of the physical environment surrounding electronic device 900 for a threshold duration of time). In response to this determination, electronic device 900 causes termination of the real-time communication session, and electronic device 900 displays user interface 944 indicating that the real-time communication session has ended. User interface 944 includes option 946*a* that is selectable to cease display of user interface 944, and option 946*b* that is selectable to initiate a new real-time communication session with the user of electronic device 910. Similarly, based on electronic device 900 causing termination of the real-time communication session and/or based on electronic device 900 having detected the non-motion-related error for greater than the threshold duration of time, electronic device 910 displays user interface 948 indicating that the real-time communication session has ended. User interface 948 includes option 950a that is selectable to cease display of user interface 948, and option 950b that is selectable to initiate a new real-time communication session with the user of electronic device 900.

At FIG. 9D, electronic device 900 detects a motion-related error pertaining to tracking of a physical environment that surrounds electronic device 900 (e.g., a data mismatch error pertaining to movement and/or motion of electronic device 900 within the physical environment). At FIG. 9D, in response to detecting the motion-related error pertaining to tracking of the physical environment, electronic device 900 ceases display of representation 926, and displays notification 952. Notification 952 asks the user if electronic device 900 is in motion (e.g., within a vehicle), and instructs the user that if electronic device 900 is in motion, the user should enable a "motion mode" of operation. Notification 952 includes option 954a, which is selectable to enable the motion mode of operation, and option 954b, which is selectable to cease display of notification 952 without enabling the motion mode of operation. Furthermore, in addition to ceasing display of representation 926, in response to detecting the motion-related error pertaining to tracking of the physical environment, electronic device 900 also causes electronic device 910 to cease display of representation 936, and the user of electronic device 900 is now displayed within the real-time communication session with a different visual representation 942 (e.g., a monogram representation). In some embodiments, visual representation 942 does not move based on detected movement of the user of electronic device 900.

At FIG. 9D, electronic device 900 detects user input 956 corresponding to selection of option 954a. In FIG. 9D, user input 956 is a tap input on touch-sensitive display 902. However, in some embodiments, user input 956 is a different type of user input, such as a gesture or other action taken by a user. For example, in some embodiments, electronic device 900 is a head-mounted system, and detecting user input 956 includes, for example, detecting a user performing a gesture (e.g., an air gesture (e.g., an air tap gesture; and/or an air pinch gesture)) while electronic device 900 is worn, detecting a button press while electronic device 900 is worn, detecting rotation of a rotatable input mechanism while electronic device 900 is worn, detecting a gaze-based gesture (e.g., detecting the user looking at an object and/or moving his or her gaze in a particular manner), and/or any combination of the foregoing (e.g., detecting a gaze at option 954a in conjunction with an air pinch gesture).

Figure 9F:
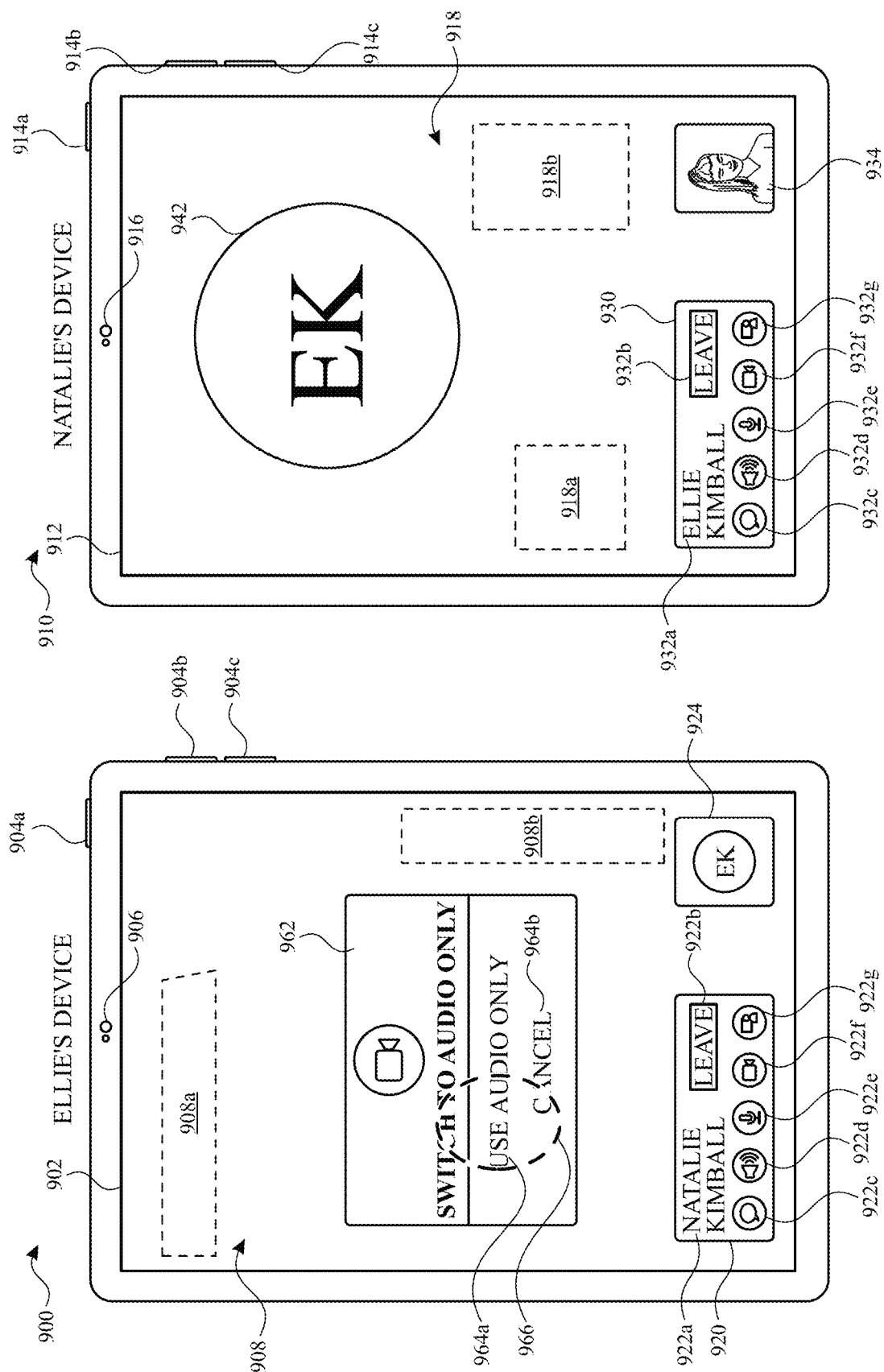

FIGS. 9E and 9F depict different example scenarios. FIG. 9E depicts a first example scenario in which enabling the motion mode of operation causes the real-time communication session to end. Accordingly, in FIG. 9E, in response to detecting user input 956, electronic device 900 displays user interface 958, which informs the user that enabling the motion mode of operation will end the real-time communication session. User interface 958 includes option 960a that is selectable to enable the motion mode of operation and terminate the real-time communication session, and option 960b that is selectable to cease display of user interface 958, maintain the motion mode of operation in the disabled state, and maintain the real-time communication session (e.g., with the user of electronic device 900 remaining unable to view representation 926, and being represented by representation 942 instead of representation 936 in the real-time communication session for as long as the one or more environment-tracking error conditions are detected).

FIG. 9F depicts a second example scenario in which enabling the motion mode of operation causes the real-time communication session to switch to an audio-only real-time communication session (rather than an avatar-based real-time communication session and/or a video real-time communication session). In FIG. 9F, in response to detecting user input 956 in FIG. 9D, electronic device 900 displays user interface 962. User interface 962 includes option 956a that is selectable to switch the real-time communication session to an audio-only real-time communication session (and enable the motion mode of operation), and option 964b that is selectable to cease display of user interface 962, maintain the motion mode of operation in the disabled state, and maintain the real-time communication session (e.g., with the user of electronic device 900 remaining unable to view representation 926, and being represented by representation 942 instead of representation 936 in the real-time communication session for as long as the one or more environment-tracking error conditions are detected). At FIG. 9F, electronic device 900 detects user input 966 corresponding to selection of option 964a. In FIG. 9F, user input 966 is a tap input on touch-sensitive display 902. However, in some embodiments, user input 966 is a different type of user input, such as a gesture or other action taken by a user. For example, in some embodiments, electronic device 900 is a head-mounted system, and detecting user input 966 includes, for example, detecting a user performing a gesture (e.g., an air gesture (e.g., an air tap gesture; and/or an air pinch gesture)) while electronic device 900 is worn, detecting a button press while electronic device 900 is worn, detecting rotation of a rotatable input mechanism while electronic device 900 is worn, detecting a gaze-based gesture (e.g., detecting the user looking at an object and/or moving his or her gaze in a particular manner), and/or any combination of the foregoing (e.g., detecting a gaze at option 964a in conjunction with an air pinch gesture).

Figure 9G:
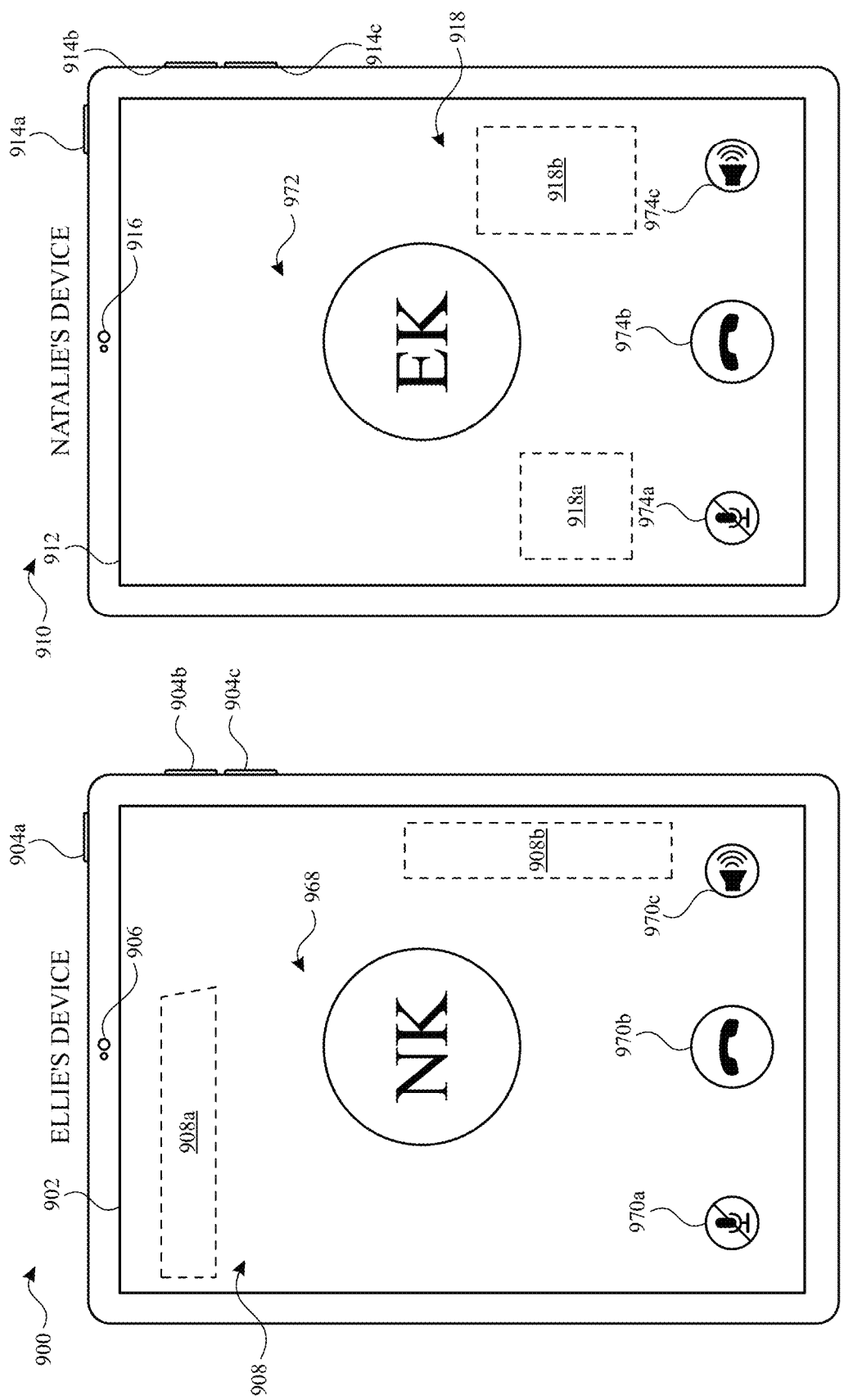

At FIG. 9G, in response to detecting user input 966, electronic device 900 causes the real-time communication session to switch to an audio-only real-time communication session, and displays user interface 968 corresponding to an audio-only real-time communication session. User interface 968 includes option 970a that is selectable to mute the user of electronic device 900 (e.g., stop transmitting audio data into the real-time communication session), option 970b that is selectable to end the audio-only real-time communication session, and option 970c that is selectable to enable a speakerphone of electronic device 900. Similarly, in response to user input 966 on electronic device 900, electronic device 910 displays user interface 972 corresponding to an audio-only real-time communication session. User interface 972 includes option 974a that is selectable to mute the user of electronic device 910 (e.g., stop transmitting audio data into the real-time communication session), option 974b that is selectable to end the audio-only real-time communication session, and option 974c that is selectable to enable a speakerphone of electronic device 910.

In some embodiments, one or more virtual user representations (e.g., virtual avatars) are not available and/or are not accessible while the motion mode of operation is enabled and/or while one or more environment-tracking errors are detected. This can be the case, for example, due to the virtual user representations being environment-locked virtual objects and/or virtual objects that utilize environment tracking of a physical environment that surrounds the computer system. In FIG. 9H, electronic device 900 displays a settings user interface 976 that includes a plurality of selectable options 978*a*-978*e*. Option 978*e* is selectable to display an avatar editing user interface for a user to modify one or more visual characteristics of a virtual avatar and/or a virtual representation. At FIG. 9H, electronic device 900 detects user input 980 corresponding to selection of option 978*c*. In FIG. 9H, user input 980 is a tap input on touch-sensitive display 902. However, in some embodiments, user input 980 is a different type of user input, such as a gesture or other action taken by a user. For example, in some embodiments, electronic device 900 is a head-mounted system, and detecting user input 980 includes, for example, detecting a user performing a gesture (e.g., an air gesture (e.g., an air tap gesture; and/or an air pinch gesture)) while electronic device 900 is worn, detecting a button press while electronic device 900 is worn, detecting rotation of a rotatable input mechanism while electronic device 900 is worn, detecting a gaze-based gesture (e.g., detecting the user looking at an object and/or moving his or her gaze in a particular manner), and/or any combination of the foregoing (e.g., detecting a gaze at option 978*e* in conjunction with an air pinch gesture).

FIG. 9I depicts a first example scenario in which the motion mode of operation is not enabled and/or in which one or more environment-tracking errors are not detected. In FIG. 9I, in response to detecting user input 980, electronic device 900 displays avatar editing user interface 982. Avatar editing user interface 928 includes various selectable options 986*a*-986*c* and 988*a*-988*d* for modifying one or more visual characteristics of virtual representation 936. For example, options 988*a*-988*g* are selectable to change a hair color of avatar representation 936. Option 986*a* is selectable to display options for different skin tones for virtual representation 936, and option 936*c* is selectable to display options for different hair styles for virtual representation 936. User interface 982 also includes option 984*a* that is selectable to save one or more changes to virtual representation 936, and option 984*b* that is selectable to cease display of user interface 982 without changing one or more changes to virtual representation 936.

Figure 9J:
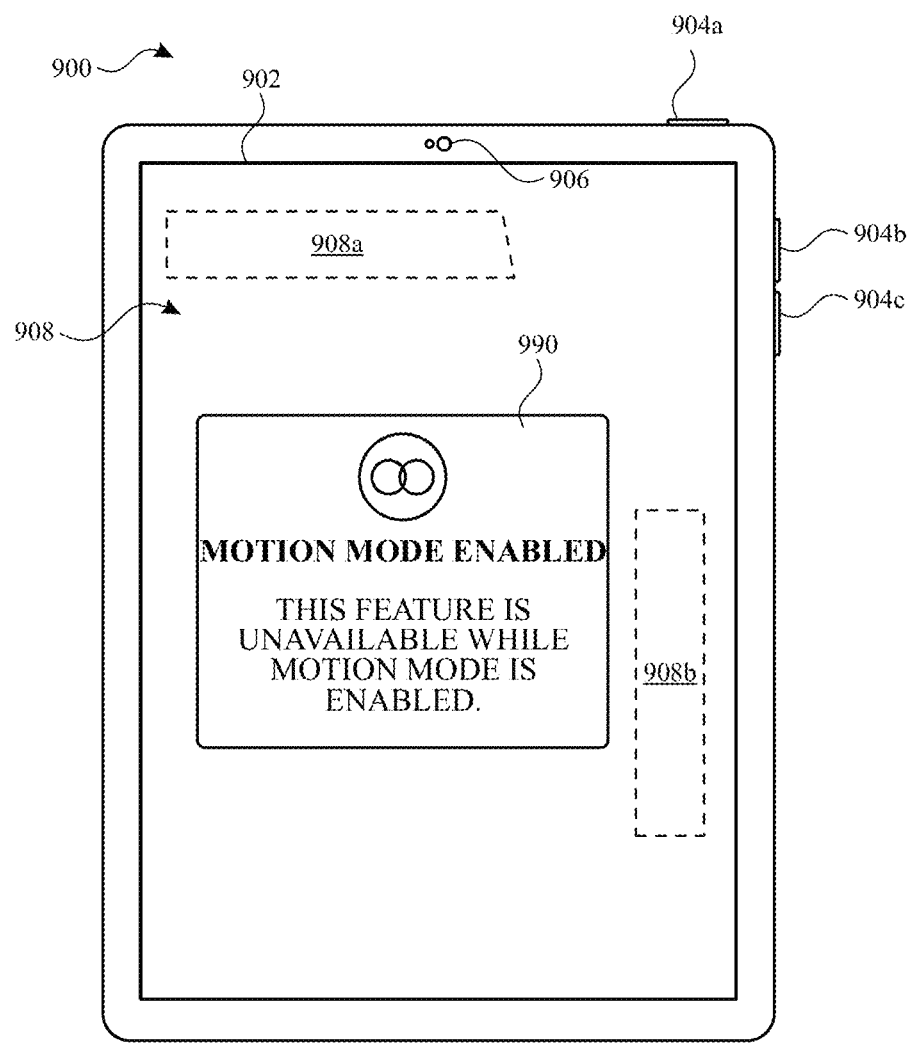

FIG. 9J depicts a second example scenario in which the motion mode of operation is enabled and/or in which one or more environment-tracking errors are detected. In FIG. 9J, in response to detecting user input 980, electronic device 900 displays notice 990, which indicates that virtual representation 936 and/or avatar editing user interface 982 are not available while the motion mode of operation is enabled (and/or, in some embodiments, while one or more environment-tracking errors are detected).

Additional descriptions regarding FIGS. 9A-9J are provided below in reference to method 1000 described with respect to FIG. 10.

FIG. 10 is a flow diagram of an exemplary method 1000 for providing real-time communication content that utilizes environment tracking, in some embodiments. In some embodiments, method 1000 is performed at a computer system (e.g., 700, X700, 900, 910, and/or X910) (e.g., computer system 101 in FIG. 1A) (e.g., a smart phone, a smart watch, a tablet, a laptop, a desktop, a wearable device, and/or head-mounted device) that is in communication with one or more display generation components (e.g., 702, X702, 902, and/or 912, and/or X912) (e.g., display generation component 120 in FIGS. 1A, 3, and 4) (e.g., a heads-up display, a display, a touchscreen, a projector, etc.) (e.g., a visual output device, a 3D display, a display having at least a portion that is transparent or translucent on which images can be projected (e.g., a see-through display), a projector, a heads-up display, and/or a display controller) and one or more input devices (e.g., 702, 902, 912, 704*a*-704*c*, 904*a*-904*c*, 914-914*c*, 706, 906, and/or 916) (e.g., a touch-sensitive surface (e.g., a touch-sensitive display); a mouse; a keyboard; remote control; a visual input device (e.g., one or more cameras (e.g., an infrared camera, a depth camera, a visible light camera, and/or a gaze tracking camera)); an environment scanning device (e.g., radar, lidar, and/or one or more cameras); a motion sensor (e.g., gyroscope, accelerometer, and/or GPS sensor); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, method 1000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1000 are, optionally, combined and/or the order of some operations is, optionally, changed.

In some embodiments, the computer system (e.g., 700, X700, 900, 910, and/or X910) displays (1002), via the one or more display generation components (e.g., 702, X702, 902, 912, and/or X912), a real-time communication user interface (e.g., 926, 920, 924, 936, 930, and/or 934) that corresponds to (e.g., displays elements of and/or facilitates) a real-time communication session (e.g., audio communication, video communication, text-based communication, graphics-based communication, and/or virtual communication) between a user of the computer system (e.g., X700, 900, 910, and/or X910) and one or more participants in the real-time communication session different from the user of the computer system (e.g., X700, 900, 910, and/or X910) (e.g., one or more users of one or more external computer system different from (e.g., separate from and/or remote from) the computer system), wherein the user of the computer system (e.g., X700, 900, 910, and/or X910) participates visually in the real-time communication session, including: displaying (1004), via the one or more display generation components (e.g., X702, 902, 912, and/or X912) and within the real-time communication user interface (e.g., 926, 920, 924, 936, 930, and/or 934), a representation (e.g., 926 and/or 936) of a first participant of the one or more participants in the real-time communication session (in some embodiments, the representation of the first participant is also displayed by one or more external computer systems associated with at least some of the one or more other participants in the real-time communication session) that moves based on detected movement (e.g., detected by an external computer system associated with the first participant) of the first participant in a physical environment of the first participant. While displaying (1006) the real-time communication user interface (e.g., 926, 920, 924, 936, 930, and/or 934), the computer system detects (1008), via the one or more input devices, one or more error conditions pertaining to environment tracking of a physical environment (e.g., FIG. 9B1, 9B2, and/or 9D) (e.g., keeping track of the position(s) of one or more objects in the physical environment (e.g., relative to the computer system) and/or keeping track of the position of the computer system within the physical environment) (e.g., the physical environment is no longer visible and/or detectable by the computer system; lighting conditions that make the physical environment no longer visible and/or detectable by the computer system; and/or inconsistent sensor readings pertaining to the physical environment by two or more sensors of the computer system (e.g., environment scanning readings (e.g., camera, radar, and/or lidar) that indicate that the computer system is not moving (e.g., not moving relative to the physical environment) that are inconsistent with movement sensor readings (e.g., accelerometer, gyroscope, and/or GPS) that indicate that the computer system is moving)) that surrounds the computer system (e.g., X700, 900, 910, and/or X910). In response to detecting the one or more error conditions pertaining to the environment tracking of the physical environment that surrounds the computer system (1010) (e.g., FIG. 9B1, 9B2, and/or 9D), the computer system limits (1012) visual participation of the user of the computer system within the real-time communication session (e.g., in FIG. 9B1, 9B2, and/or 9D, electronic device 900 and/or HMD X700 ceases display of representation 926, and causes electronic device 910 and/or HMD X910 to represent the user of electronic device 900 and/or HMD X700 with representation 942 instead of representation 936).

In some embodiments, limiting visual participation of the user of the computer system within the real-time communication session includes one or more of: causing a representation (e.g., 936) of the user of the computer system to no longer be visible to the other participants in the real-time communication session (e.g., in FIGS. 9B1, 9B2, and 9D, based on detection of one or more environment-tracking errors at HMD X700 and/or electronic device 900, electronic device 910 and/or HMD X910 ceases display of representation 936); causing the one or more external computer systems participating in the real-time communication session to cease display of a representation of the user of the computer system (e.g., in FIGS. 9B1, 9B2, and 9D, based on detection of one or more environment-tracking errors at HMD X700 and/or electronic device 900, electronic device 910 and/or HMD X910 ceases display of representation 936); and/or causing the one or more external computer systems participating in the real-time communication session to cease displaying movement of a representation of the user of the computer system (e.g., cause electronic device 910 and/or HMD X910 to cease displaying movement of representation 936). For example, in some embodiments, limiting visual participation includes ceasing to display (and/or causing the one or more external computer systems to cease displaying) the representation (e.g., ceasing to display representation 936 in self-view representation 924) and/or ceasing to display (and/or causing the one or more external computer systems to cease displaying) movement of the representation (e.g., 936) that indicates movement of one or more portions of the user's body relative to each other (e.g., movement of one or more hands relative to a head, movement of one or more hands relative to each other, movement of a head of the user relative to a user's body, and/or changes in the user's facial expressions) and optionally displaying a representation (e.g., 942) of the user that does not include separate elements that correspond to different portions of the user's body (e.g., to indicate that information about the movement of the portions of the user's body relative to each other is no longer being provided to the real-time communication session). In some embodiments, limiting visual participation of the user of the computer system within the real-time communication session includes not displaying, ceasing display of, and/or forgoing display of visual representations (e.g., 926) of the other participants in the real-time communication session, including the representation of the first participant (e.g., 926); and/or not displaying, ceasing display of, and/or forgoing display of movement of visual representations of the other participants in the real-time communication session, including the representation of the first participant. For example, in some embodiments, limiting visual participation includes ceasing to display a first representation of a first participant and/or ceasing to display movement of a first representation of a first participant that indicates movement of one or more portions of the first participant's body relative to each other (e.g., movement of one or more hands relative to a head, movement of one or more hands relative to each other, movement of a head of the first participant relative to the first participant's body, and/or changes in the first participant's facial expressions) and optionally displaying a representation of the first participant that does not include separate elements that correspond to different portions of the first participant's body (e.g., to indicate that information about the movement of the portions of the first participant's body relative to each other is no longer being provided to the real-time communication session).

In some embodiments, the user of the computer system (e.g., X700, 900, 910, and/or X910) participating visually in the real-time communication session further includes transmitting video content depicting the user of the computer system and/or depicting movement of the user of the computer system; and/or displaying video content depicting one or more other participants of the real-time communication session (e.g., depicting movement of the one or more other participants of the real-time communication session). In some embodiments, limiting visual participation of the user of the computer system includes ceasing to transmit video content depicting the user of the computer system and/or ceasing display of video content depicting the one or more other participants of the real-time communication session.

Limiting visual participation of the user within the real-time communication session when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, the user of the computer system (e.g., X700, 900, 910, and/or X910) participating visually in the real-time communication session further includes: causing a representation (e.g., 926 and/or 936) of the user of the computer system (e.g., a live camera feed of the user of the computer system, an avatar of the user of the computer system, and/or a virtual representation of the user of the computer system) that moves based on detected movement of the user of the computer system (e.g., detected by the computer system and/or detected via the one or more input devices) to be displayed by one or more external computer systems (e.g., X700, 900, 910, and/or X910) associated with the one or more participants in the real-time communication session. Limiting visual participation of the user within the real-time communication session when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, while limiting visual participation of the user of the computer system (e.g., X700, 900, 910, and/or X910) within the real-time communication session, the computer system ceases to detect the one or more error conditions pertaining to the environment tracking of the physical environment (e.g., detecting that the one or more error conditions pertaining to the environment tracking of the physical environment have been resolved; detecting that the one or more error conditions pertaining to the environment tracking of the physical environment are no longer active; and/or detecting that the one or more error conditions pertaining to the environment tracking of the physical environment are no longer satisfied). In response to ceasing to detecting the one or more error conditions pertaining to the environment tracking of the physical environment, the computer system ceases to limit visual participation of the user of the computer system within the real-time communication session (e.g., in FIGS. 9B1 and/or 9B2, if computer system 900 and/or HMD X700 ceases to detect one or more environment-tracking errors, HMD X700, computer system 900, computer system 910, and/or HMD X910 return to the state of FIG. 9A. In some embodiments, ceasing to limit visual participation of the user of the computer system (e.g., X700, 900, 910, and/or X910) within the real-time communication session includes one or more of: causing the representation (e.g., 926 and/or 936) of the user of the computer system to be visible to the other participants in the real-time communication session; causing the one or more external computer systems (e.g., 910 and/or X910) participating in the real-time communication session to display the representation (e.g., 936) of the user of the computer system; and/or causing the one or more external computer systems (e.g., 910 and/or X910) participating in the real-time communication session to resume displaying movement of the representation (e.g., 936) of the user of the computer system. In some embodiments, ceasing to limit visual participation of the user of the computer system within the real-time communication session includes displaying visual representations (e.g., 926) of the other participants in the real-time communication session, including the representation of the first participant; and/or displaying and/or resuming display of movement of visual representations (e.g., 926) of the other participants in the real-time communication session, including the representation of the first participant. Automatically ceasing limitations on the visual participation of the user in the real-time communication session when the one or more error conditions cease to be detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has determined that the one or more error conditions are no longer detected).

In some embodiments, limiting visual participation of the user of the computer system (e.g., X700, 900, 910, and/or X910) within the real-time communication session includes removing the user from the real-time communication session (e.g., FIG. 9C) (e.g., removing the user as a participant in the real-time communication session, ceasing to transmit data into the real-time communication session, and/or ceasing to receive data from the real-time communication session). Removing the user from the real-time communication session when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, limiting visual participation of the user of the computer system within the real-time communication session comprises: in accordance with a determination that the one or more error conditions pertaining to environment tracking of the physical environment have been detected for less than a threshold duration of time (e.g., less than 10 seconds, less than 30 seconds, less than 1 minute, less than 2 minutes, less than 3 minutes, less than 4 minutes, or less than 5 minutes), limiting visual participation of the user of the computer system within the real-time communication session while maintaining the user as a participant in the real-time communication session (e.g., suspending the real-time communication session and/or suspending the user's participation in the real-time communication session) (e.g., FIGS. 9B1 and/or 9B2); and in accordance with a determination that the one or more error conditions pertaining to environment tracking of the physical environment have been detected for greater than the threshold duration of time (e.g., greater than 10 seconds, greater than 30 seconds, greater than 1 minute, greater than 2 minutes, greater than 3 minutes, greater than 4 minutes, or greater than 5 minutes), removing the user from the real-time communication session (e.g., removing the user as a participant in the real-time communication session, ceasing to transmit data into the real-time communication session, and/or ceasing to receive data from the real-time communication session) (e.g., FIG. 9C). Suspending the user's participation in the real-time communication session when environment tracking errors are detected for less than a threshold amount of time, and removing the user from the real-time communication session when environment tracking errors are detected for greater than the threshold amount of time, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, detecting the one or more error conditions pertaining to environment tracking of the physical environment comprises detecting one or more data error conditions pertaining to data received from one or more environment tracking sensors (e.g., one or more cameras, one or more radar sensors, one or more accelerometers, and/or one or more gyroscopes) that are configured to record data pertaining to the physical environment (e.g., FIGS. 9B1 and/or 9B2) (e.g., images and/or video of the physical environment, movement of the computer system relative to the physical environment, position of the computer system within the physical environment, and/or the positions of one or more objects within the physical environment). In some embodiments, detecting the one or more data error conditions comprises detecting one or more error conditions pertaining to lighting and/or lighting conditions in the physical environment (e.g., an inadequate amount of light in the physical environment; an inadequate amount of light in the physical environment to identify and/or track one or more objects in the physical environment; and/or less than a threshold amount of light (e.g., less than 1000 lumens, less than 500 lumens, less than 250 lumens, less than 100 lumens, less than 50 lumens, less than 25 lumens, and/or less than 10 lumens)). In some embodiments, detecting the one or more data error conditions comprises determining that the computer system is unable to track and/or has failed to track the positions of one or more objects in the physical environment. Limiting visual participation of the user within the real-time communication session when one or more data error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, detecting the one or more error conditions pertaining to environment tracking of the physical environment comprises detecting that the computer system (e.g., X700, 900, 910, and/or X910) has transitioned from operating in a first mode (e.g., a default mode and/or a non-motion mode) to operating in a second mode (e.g., a motion mode and/or a mode indicating the user and/or the computer system are in motion (e.g., in a vehicle)), wherein the second mode is different from the first mode and is indicative of the computer system being in motion (e.g., in motion within a vehicle) (e.g., user input 956 to enable the motion mode of operation (e.g., transition the computer system from operating in a first mode in which the motion mode of operation is not enabled, to operating in a second mode of operation in which the motion mode of operation is enabled)). In some embodiments, the first mode is indicative of the computer system not being in motion and/or not being in motion within a vehicle. Limiting visual participation of the user within the real-time communication session when the computer system is operating in the second mode enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while the computer system (e.g., X700, 900, 910, and/or X910) is operating in the second mode (e.g., a motion mode of operation), the computer system prohibits the computer system from joining real-time communication sessions (e.g., similar to FIG. 9E in which electronic device 900 indicates that enabling motion mode will end the call, enabling motion mode prohibits real-time communication sessions) (e.g., while the computer system is operating in the second mode, the computer system is not permitted to join and/or start real-time communication sessions). Prohibiting the computer system from joining real-time communication sessions while operating in the second mode enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to detecting that the computer system has transitioned from operating in the first mode to operating in the second mode (e.g., in response to user input 956) (in some embodiments, in response to detecting that the computer system is operating in the second mode and/or while the computer system is operating in the second mode), the computer system (e.g., X700, 900, 910, and/or X910) permits audio participation of the user of the computer system within the real-time communication session (e.g., the computer system transmits audio data captured by the computer system (e.g., via one or more microphones) into the real-time communication session and/or the computer system receives and outputs audio data received from other participants in the real-time communication session) while limiting visual participation of the user of the computer system within the real-time communication session (e.g., FIGS. 9F-9G). Limiting visual participation of the user within the real-time communication session while permitting audio participation when the computer system is operating in the second mode (e.g., a motion mode) enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device is operating in the second mode).

In some embodiments, limiting visual participation of the user of the computer system (e.g., X700, 900, 910, and/or X910) within the real-time communication session comprises: in accordance with a determination that the one or more error conditions pertaining to environment tracking comprises detecting that the computer system (e.g., X700, 900, 910, and/or X910) has transitioned from operating in a first mode of operation (e.g., a default mode and/or a non-motion mode) to operating in a second mode of operation (e.g., a motion mode and/or a mode indicating the user and/or the computer system are in motion (e.g., in a vehicle)), wherein the second mode of operation is different from the first mode of operation and is indicative of the computer system being in motion (e.g., in motion within a vehicle): removing the user from the real-time communication session (e.g., removing the user as a participant in the real-time communication session, ceasing to transmit data into the real-time communication session, and/or ceasing to receive data from the real-time communication session) (e.g., FIGS. 9D-9E); and in accordance with a determination that the one or more error conditions pertaining to environment tracking comprises detecting one or more data error conditions (e.g., FIGS. 9B1 and/or 9B2) pertaining to data received from one or more environment tracking sensors (e.g., one or more cameras, one or more depth sensors, one or more IR sensors, one or more proximity sensors, one or more radar sensors, one or more accelerometers, and/or one or more gyroscopes) that are configured to record data pertaining to the physical environment (e.g., images and/or video of the physical environment, movement of the computer system relative to the physical environment, position of the computer system within the physical environment, and/or the positions of one or more objects within the physical environment) (and, in some embodiments, in accordance with a determination that the computer system is operating in the first mode of operation): limiting visual participation of the user of the computer system within the real-time communication session while maintaining the user as a participant in the real-time communication session (e.g., suspending the real-time communication session and/or suspending the user's participation in the real-time communication session) (e.g., FIGS. 9B1 and/or 9B2). In some embodiments, detecting the one or more data error conditions comprises detecting one or more error conditions pertaining to lighting and/or lighting conditions in the physical environment (e.g., an inadequate amount of light in the physical environment; an inadequate amount of light in the physical environment to identify and/or track one or more objects in the physical environment; and/or less than a threshold amount of light (e.g., less than 1000 lumens, less than 500 lumens, less than 250 lumens, less than 100 lumens, less than 50 lumens, less than 25 lumens, and/or less than 10 lumens)). In some embodiments, detecting the one or more data error conditions comprises determining that the computer system is unable to track and/or has failed to track the positions of one or more objects in the physical environment. Suspending the user's participation in the real-time communication session when the computer system fails to track the physical environment, and removing the user from the real-time communication session when the computer system is operating in the second mode of operation, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to detecting the one or more error conditions pertaining to the environment tracking of the physical environment that surrounds the computer system, the computer system (e.g., X700, 900, 910, and/or X910) suspends (e.g., limits, pauses, and/or ceases) audio participation of the user of the computer system within the real-time communication session (e.g., in some embodiments, in FIGS. 9B1, 9B2, and/or 9D, computer system 900 and/or HMD X700 suspends audio participation of the user of computer system 900 and/or HMD X700) (e.g., the computer system forgoes transmitting and/or does not transmit audio data captured by the computer system (e.g., via one or more microphones) into the real-time communication session and/or the computer system forgoes receiving, does not receive, and/or does not output audio data received from other participants in the real-time communication session). Suspending audio participation of the user within the real-time communication session when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, while at least a portion of the computer system (e.g., X700, 900, 910, and/or X910) is worn on the body of the user (e.g., while at least a portion of the computer system is placed on the head of the user and/or on the face of the user; and/or while at least a portion of the body of the user (e.g., one or more eyes, a face, a nose, and/or a mouth) is detected by the computer system), and while displaying the real-time communication user interface (e.g., 920, 924, 926, 930, 934, and/or 936), the computer system detects, via the one or more input devices, that the at least the portion of the computer system is removed from the body of the user (in some embodiments, electronic device 900 and/or electronic device 910 are wearable devices, such as a head-mounted system). In response to detecting that the at least the portion of the computer system is removed from the body of the user (e.g., ceasing to detect at least a portion of the body of the user (e.g., one or more eyes, a face, a nose, and/or a mouth)), the computer system suspends audio participation of the user of the computer system within the real-time communication session (and, in some embodiments, limiting visual participation of the user of the computer system within the real-time communication session either by changing how the user is represented in the real-time communication, ceasing to display representations of one or more participants, or because the user interface is no longer visible to the user after the computer system has been removed from the body of the user). Limiting visual participation of the user within the real-time communication session and suspending audio participation of the user within the real-time communication session when the user removes the computer system from his or her body enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, in response to detecting the one or more error conditions pertaining to the environment tracking of the physical environment that surrounds the computer system (e.g., X700, 900, 910, and/or X910), the computer system permits audio participation of the user of the computer system within the real-time communication session (e.g., FIGS. 9F-9G, and/or in FIGS. 9B1, 9B2, and/or 9D, electronic device 900 and/or HMD X700 permits audio participation of the user of electronic device 900 and/or HMD X700 within the real-time communication session) (e.g., the computer system transmits audio data captured by the computer system (e.g., via one or more microphones) into the real-time communication session and/or the computer system receives and outputs audio data received from other participants in the real-time communication session) while limiting visual participation of the user of the computer system within the real-time communication session (e.g., the computer system forgoes transmitting video data captured by the computer system into the real-time communication session and/or the computer system forgoes receiving, does not receive, and/or does not display video data received from other participants in the real-time communication session). Limiting visual participation of the user within the real-time communication session while permitting audio participation when the computer system is operating in the second mode (e.g., a motion mode) enhances the operability of the system and makes the user-system interface more efficient (e.g., by helping the user to provide proper inputs and reducing errors) which, additionally, reduces power usage and improves battery life of the device by enabling the aser to use the system more quickly and efficiently. Doing so also provides the user with feedback about a state of the device (e.g., the device is operating in the second mode).

In some embodiments, the real-time communication session is an avatar-based communication session (e.g., a communication session in which one or more of the participants in the real-time communication session and/or all participants in the real-time communication session are represented by virtual representations and/or virtual avatars); the user of the computer system (e.g. 900 and/or X700) is represented by a first virtual representation (e.g., 936)

(e.g., a first visual representation and/or a first avatar); and the representation (e.g., 926) of the first participant of the one or more participants in the real-time communication session is a second virtual representation (e.g., a second visual representation and/or a second avatar) different from the first virtual representation. In some embodiments, a second participant of the one or more participants in the real-time communication session is visually represented by a third virtual representation (e.g., a third visual representation and/or a third avatar) different from the first and second virtual representations. In some embodiments, when the first virtual representation (e.g., 936) is used to represent the user within the real-time communication session, the first virtual representation moves based on physical movements made by the user of the computer system (e.g., 900 and/or X700) (e.g., movement of the user's hands causes movement of a first portion of the first virtual representation; movement of the user's face causes movement of a second portion of the first virtual representation; movement of the user's head causes movement of a third portion of the first virtual representation; movement of the user's torso causes movement of a fourth portion of the first virtual representation; and/or movement of the user's legs causes movement of a fifth portion of the first virtual representation). In some embodiments, the first virtual representation of the user copies and/or mirrors movements made by the user. In some embodiments, when the second virtual representation (e.g., 926) is used to represent the first participant within the real-time communication session, the second virtual representation moves based on physical movements made by the first participant (e.g., movement of the first participant's hands causes movement of a first portion of the second virtual representation; movement of the first participant's face causes movement of a second portion of the second virtual representation; movement of the first participant's head causes movement of a third portion of the second virtual representation; movement of the first participant's torso causes movement of a fourth portion of the second virtual representation; and/or movement of the first participant's legs causes movement of a fifth portion of the second virtual representation). In some embodiments, the second virtual representation copies and/or mirrors movements made by the first participant. Limiting visual participation of the user within the avatar-based real-time communication session when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, the computer system (e.g., 900 and/or X700) is configured to transition between a plurality of operating modes, including a first operating mode (e.g., a default mode and/or a non-motion mode) and a second operating mode (e.g., a motion mode and/or a mode indicating the user and/or the computer system are in motion (e.g., in a vehicle)), wherein the second operating mode is different from the first operating mode and is indicative of the computer system being in motion (e.g., in motion within a vehicle). In some embodiments, the first mode is indicative of the computer system not being in motion and/or not being in motion within a vehicle. In some embodiments, the computer system (e.g., 900 and/or X700) receives, via the one or more input devices, one or more user inputs (e.g., 980) corresponding to a user request to edit the first virtual representation (e.g., 936) (e.g., one or more user inputs corresponding to a user request to display an avatar editing user interface (e.g., 982) (e.g., a user interface that includes one or more selectable options for modifying one or more visual characteristics of the first virtual representation); and/or one or more user inputs corresponding to a user request to modify a first visual characteristic of the first virtual representation (e.g., change the first visual characteristic from a first value and/or setting to a second value and/or setting)). In some embodiments, editing the first virtual representation includes modifying one or more visual characteristics (e.g., one or more face appearance settings, one or more clothing appearance settings, one or more hair appearance settings, one or more eye appearance settings, and/or one or more skin appearance settings) of the first virtual representation (e.g., changing a first visual characteristic of the first virtual representation from a first value to a second value). In response to receiving the one or more user inputs (e.g., 980) corresponding to the user request to edit the first virtual representation: in accordance with a determination that the computer system is operating in the first operating mode, the computer system displays, via the one or more display generation components, an avatar editing user interface (e.g., 982) that includes one or more selectable options for modifying a visual appearance of the first virtual representation; and in accordance with a determination that the computer system is operating in the second operating mode, the computer system displays, via the one or more display generation components, an indication (e.g., 990) that the first virtual representation (e.g., 936) cannot be modified while the computer system is operating in the second operating mode. In some embodiments, in accordance with a determination that the computer system is operating in the second operating mode, the computer system forgoes display of the avatar editing user interface and/or forgoes display of the one or more selectable options for modifying the visual appearance of the first virtual representation. Prohibiting editing of the first virtual representation when the computer system is operating in the second operating mode enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected that the computer system is operating in the second operating mode and editing of the first virtual representation is prohibited).

In some embodiments, the computer system (e.g., 900 and/or X700) is configured to transition between a plurality of operating modes, including a first operating mode (e.g., a default mode and/or a non-motion mode) and a second operating mode (e.g., a motion mode and/or a mode indicating the user and/or the computer system are in motion (e.g., in a vehicle)), wherein the second operating mode is different from the first operating mode and is indicative of the computer system being in motion (e.g., in motion within a vehicle). In some embodiments, the first mode is indicative of the computer system not being in motion and/or not being in motion within a vehicle. In some embodiments, the computer system receives, via the one or more input devices, one or more user inputs (e.g., 980) corresponding to a user request to view the first virtual representation (e.g., 936). In response to receiving the one or more user inputs (e.g., 980)

corresponding to the user request to view the first virtual representation: in accordance with a determination that the computer system is operating in the first operating mode, the computer system displays, via the one or more display generation components, the first virtual representation (e.g., 936, FIG. 9I); and in accordance with a determination that the computer system is operating in the second operating mode: the computer system forgoes display of the first virtual representation (e.g., FIG. 9J); and displays, via the one or more display generation components, an indication (e.g., 990) that the first virtual representation cannot be displayed while the computer system is operating in the second operating mode. In some embodiments, the first virtual representation, when displayed, moves in response to detected movement by a user of the computer system. For example, in some embodiments, the first virtual representation mirrors movements made by the user and/or partially mirrors movements made by the user. In some embodiments, movement by the user of the computer system is detected by the computer system, at least in part, based on environment tracking of a physical environment that surrounds the computer system. Accordingly, in some embodiments, when one or more errors are detected pertaining to environment tracking of the physical environment, the computer system forgoes displaying the first virtual representation. Prohibiting viewing of the first virtual representation when the computer system is operating in the second operating mode enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected that the computer system is operating in the second operating mode and viewing and/or display of the first virtual representation is prohibited).

In some embodiments, limiting visual participation of the user of the computer system within the real-time communication session includes: ceasing display of a representation of the user (e.g., 936) of the computer system within the real-time communication session that indicates movement of one or more portions of the user's body relative to each other (e.g., movement of one or more hands relative to a head or movement of one or more hands relative to each other) using the first virtual representation (e.g., causing one or more external computer systems associated with the one or more participants in the real-time communication session to cease display of the first virtual representation to represent the user of the computer system; and/or ceasing display of the first virtual representation); and representing the user of the computer system with a placeholder visual representation (e.g., 942) that is different from the first virtual representation (e.g., a placeholder visual representation that includes less detail than the first virtual representation (e.g., a name, a monogram, a text representation, and/or a geometric shape (e.g., square, circle, triangle, and/or diamond)) (e.g., causing one or more external computer systems associated with the one or more participants in the real-time communication session to display the placeholder visual representation to represent the user of the computer system; and/or displaying the placeholder visual representation). Replacing the first virtual representation of the user with a placeholder visual representation within the real-time communication session when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, the user of the computer system (e.g., 900 and/or X700) participating visually in the real-time communication session further includes: causing a representation (e.g., 936) of the user of the computer system (e.g., a live camera feed of the user of the computer system, an avatar of the user of the computer system, and/or a virtual representation of the user of the computer system) that moves based on detected movement of the user of the computer system (e.g., detected by the computer system and/or detected via the one or more input devices) to be displayed by one or more external computer systems (e.g., 910 and/or X910) associated with the one or more participants in the real-time communication session; and limiting visual participation of the user of the computer system within the real-time communication session includes causing the one or more external computer systems (e.g., 910 and/or X910) associated with the one or more participants in the real-time communication session to cease display of the representation (e.g., 936) of the user of the computer system (e.g., FIGS. 9B1-9G). Limiting visual participation of the user within the real-time communication session when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, the user of the computer system (e.g., 900 and/or X700) participating visually in the real-time communication session further includes: causing a representation (e.g., 936) of the user of the computer system (e.g., a live camera feed of the user of the computer system, an avatar of the user of the computer system, and/or a virtual representation of the user of the computer system) that moves based on detected movement of the user of the computer system (e.g., detected by the computer system and/or detected via the one or more input devices) to be displayed by one or more external computer systems (e.g., 910 and/or X910) associated with the one or more participants in the real-time communication session; and limiting visual participation of the user of the computer system within the real-time communication session includes causing the one or more external computer systems (e.g., 910 and/or X910) participating in the real-time communication session to cease displaying movement of the representation (e.g., 936) of the user of the computer system (e.g., FIGS. 9B1-9G). Limiting visual participation of the user within the real-time communication session when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, limiting visual participation of the user of the computer system (e.g., 900 and/or X700) within the real-time communication session includes ceasing display of (e.g., not displaying and/or forgoing display of) visual representations (e.g., 926) of the other participants in the real-time communication session, including the representation of the first participant (e.g., 926) (e.g., electronic device 900 and/or HMD X700 in FIGS. 9B1-9G). Limiting visual participation of the user within the real-time communication session when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, limiting visual participation of the user of the computer system (e.g., 900 and/or X700) within the real-time communication session includes ceasing display of (e.g., forgoing display of and/or not displaying) movement of visual representations (e.g., 926) of the other participants in the real-time communication session, including ceasing to display movement of the representation of the first participant (e.g., 926) (e.g., electronic device 900 and/or HMD X700 in FIGS. 9B1-9G). Limiting visual participation of the user within the real-time communication session when one or more error conditions pertaining to environment tracking are detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more error conditions pertaining to environment tracking).

In some embodiments, aspects/operations of methods 800 and/or 1000 may be interchanged, substituted, and/or added between these methods. For example, in some embodiments, the visual content in method 800 includes the real-time communication user interface of method 1000. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components and one or more input devices, the computer system comprising:
   one or more processors; and
   memory storing one or more programs configured to be executed by the one or more processors, the one or more programs including instructions for:
      displaying, via the one or more display generation components, visual content that utilizes environment tracking of a physical environment that surrounds the computer system;
      while displaying the visual content, detecting, via the one or more input devices, one or more error conditions pertaining to the environment tracking of the physical environment that surrounds the computer system;
      in response to detecting the one or more error conditions pertaining to the environment tracking of the physical environment that surrounds the computer system:
         ceasing display of the visual content; and
         in accordance with a determination that the one or more error conditions pertain to motion of the computer system, displaying, via the one or more display generation components, a first selectable option that is selectable to re-display the visual content while the one or more error conditions persist;
      while displaying the first selectable option and not displaying the visual content, receiving, via the one or more input devices, a user input corresponding to selection of the first selectable option; and
      in response to receiving the user input corresponding to selection of the first selectable option, re-displaying, via the one or more display generation components, the visual content while the one or more error conditions pertaining to motion of the computer system persist.

2. The computer system of claim 1, wherein ceasing display of the visual content includes revealing at least a portion of representation of a three-dimensional environment.

3. The computer system of claim 1, the one or more programs further including instructions for:
   in response to detecting the one or more error conditions pertaining to the environment tracking of the physical environment that surrounds the computer system:
      in accordance with a determination that the one or more error conditions do not pertain to motion of the computer system, forgoing display of the first selectable option.

4. The computer system of claim 1, the one or more programs further including instructions for:
   in response to detecting the one or more error conditions pertaining to the environment tracking of the physical environment that surrounds the computer system:
      in accordance with a determination that the one or more error conditions pertain to lighting in the physical environment, forgoing display of the first selectable option.

5. The computer system of claim 1, the one or more programs further including instructions for:
   subsequent to ceasing display of the visual content and while not displaying the visual content, ceasing to detect the one or more error conditions pertaining to the environment tracking of the physical environment; and
   in response to ceasing to detecting the one or more error conditions pertaining to the environment tracking of the physical environment:
      displaying, via the one or more display generation components, the visual content.

6. The computer system of claim 1, wherein:
   displaying the visual content that utilizes environment tracking of the physical environment comprises:
      displaying the visual content at a first position within a three-dimensional environment based on a detected ground plane in the physical environment; and
   re-displaying the visual content while the one or more error conditions pertaining to motion of the computer system persist comprises:
      displaying the visual content at a second position within the three-dimensional environment based on a simulated surface plane that does not rely on detection of a ground plane in the physical environment.

7. The computer system of claim 1, the one or more programs further including instructions for:
   in response to receiving the user input corresponding to selection of the first selectable option, transitioning the computer system from operating in a first mode to operating in a second mode, wherein:
      in the first mode, the visual content is not permitted to be displayed while the one or more error conditions pertaining to motion of the computer system persist; and
      in the second mode, the visual content is permitted to be displayed while the one or more error conditions pertaining to motion of the computer system persist; and
   while operating the computer system in the second mode, displaying, via the one or more display generation components, an indication that the computer system is operating in the second mode.

8. The computer system of claim 7, the one or more programs further including instructions for:
displaying, via the one or more display generation components and concurrently with the indication that the computer system is operating in the second mode, a mode selection option;
while displaying the mode selection option, receiving, via the one or more input devices, one or more user inputs that correspond to selection of the mode selection option; and
in response to receiving the one or more user inputs that correspond to selection of the mode selection option, transitioning the computer system from operating in the second mode to operating in the first mode.

9. The computer system of claim 8, wherein the one or more user inputs that correspond to selection of the mode selection option includes:
a first user input corresponding to selection of the mode selection option; and
a second user input subsequent to the first user input that is indicative of user confirmation of a user request to transition the computer system from operating in the second mode to operating in the first mode.

10. The computer system of claim 1, the one or more programs further including instructions for:
in response to receiving the user input corresponding to selection of the first selectable option, transitioning the computer system from operating in a first mode of operation to operating in a second mode of operation, wherein:
in the first mode of operation, the visual content is not permitted to be displayed while the one or more error conditions pertaining to motion of the computer system persist; and
in the second mode of operation, the visual content is permitted to be displayed while the one or more error conditions pertaining to motion of the computer system persist; and
transitioning the computer system from a powered off state to a powered on state, wherein:
in accordance with a determination that the computer system was operating in the first mode of operation when the computer system was most recently transitioned from the powered on state to the powered off state, the computer system is operated in the first mode of operation when transitioned from the powered off state to the powered on state; and
in accordance with a determination that the computer system was operating in the second mode of operation when the computer system was most recently transitioned from the powered on state to the powered off state, the computer system is operated in the second mode of operation when transitioned from the powered off state to the powered on state.

11. The computer system of claim 1, the one or more programs further including instructions for:
in response to receiving the user input corresponding to selection of the first selectable option, transitioning the computer system from operating in a first state to operating in a second state, wherein:
in the first state, the visual content is not permitted to be displayed while the one or more error conditions pertaining to motion of the computer system persist; and
in the second state, the visual content is permitted to be displayed while the one or more error conditions pertaining to motion of the computer system persist;
while operating the computer system in the second state, detecting that the computer system has been operating in the second state for a threshold duration of time; and
in response to detecting that the computer system has been operating in the second state for the threshold duration of time, transitioning the computer system from operating in the second state to operating in the first state.

12. The computer system of claim 1, the one or more programs further including instructions for:
in response to receiving the user input corresponding to selection of the first selectable option, transitioning the computer system from operating in a first state of operation to operating in a second state of operation, wherein:
in the first state of operation, the visual content is not permitted to be displayed while the one or more error conditions pertaining to motion of the computer system persist; and
in the second state of operation, the visual content is permitted to be displayed while the one or more error conditions pertaining to motion of the computer system persist;
while operating the computer system in the second state of operation, detecting that one or more device context criteria are satisfied; and
in response to detecting that the one or more device context criteria are satisfied, transitioning the computer system from operating in the second state of operation to operating in the first state of operation.

13. The computer system of claim 12, wherein the one or more device context criteria include a calendar criterion that is satisfied based on calendar information.

14. The computer system of claim 12, wherein the one or more device context criteria include a vehicle connection criterion that is satisfied when the computer system transitions from being connected to one or more systems corresponding to a vehicle to no longer being connected to one or more systems corresponding to a vehicle.

15. The computer system of claim 12, wherein the one or more device context criteria include a digital wallet criterion that is satisfied when the computer system detects digital wallet information indicating that the computer system has completed scheduled travel.

16. A non-transitory computer-readable storage medium storing one or more programs configured to be executed by one or more processors of a computer system that is in communication with one or more display generation components and one or more input devices, the one or more programs including instructions for:
displaying, via the one or more display generation components, visual content that utilizes environment tracking of a physical environment that surrounds the computer system;
while displaying the visual content, detecting, via the one or more input devices, one or more error conditions pertaining to the environment tracking of the physical environment that surrounds the computer system;
in response to detecting the one or more error conditions pertaining to the environment tracking of the physical environment that surrounds the computer system:
ceasing display of the visual content; and
in accordance with a determination that the one or more error conditions pertain to motion of the computer system, displaying, via the one or more display generation components, a first selectable option that is selectable to re-display the visual content while the one or more error conditions persist;

while displaying the first selectable option and not displaying the visual content, receiving, via the one or more input devices, a user input corresponding to selection of the first selectable option; and in response to receiving the user input corresponding to selection of the first selectable option, re-displaying, via the one or more display generation components, the visual content while the one or more error conditions pertaining to motion of the computer system persist.

17. The non-transitory computer-readable storage medium of claim 16, wherein ceasing display of the visual content includes revealing at least a portion of representation of a three- dimensional environment.

18. The non-transitory computer-readable storage medium of claim 16, the one or more programs further including instructions for:

in response to detecting the one or more error conditions pertaining to the environment tracking of the physical environment that surrounds the computer system:

in accordance with a determination that the one or more error conditions do not pertain to motion of the computer system, forgoing display of the first selectable option.

19. The non-transitory computer-readable storage medium of claim 16, the one or more programs further including instructions for:

in response to detecting the one or more error conditions pertaining to the environment tracking of the physical environment that surrounds the computer system:

in accordance with a determination that the one or more error conditions pertain to lighting in the physical environment, forgoing display of the first selectable option.

20. The non-transitory computer-readable storage medium of claim 16, the one or more programs further including instructions for:

subsequent to ceasing display of the visual content and while not displaying the visual content, ceasing to detect the one or more error conditions pertaining to the environment tracking of the physical environment; and in response to ceasing to detecting the one or more error conditions pertaining to the environment tracking of the physical environment:

displaying, via the one or more display generation components, the visual content.

21. The non-transitory computer-readable storage medium of claim 16, wherein:

displaying the visual content that utilizes environment tracking of the physical environment comprises:

displaying the visual content at a first position within a three-dimensional environment based on a detected ground plane in the physical environment; and re-displaying the visual content while the one or more error conditions pertaining to motion of the computer system persist comprises:

displaying the visual content at a second position within the three-dimensional environment based on a simulated surface plane that does not rely on detection of a ground plane in the physical environment.

22. The non-transitory computer-readable storage medium of claim 16, the one or more programs further including instructions for:

in response to receiving the user input corresponding to selection of the first selectable option, transitioning the computer system from operating in a first mode to operating in a second mode, wherein:

in the first mode, the visual content is not permitted to be displayed while the one or more error conditions pertaining to motion of the computer system persist; and in the second mode, the visual content is permitted to be displayed while the one or more error conditions pertaining to motion of the computer system persist; and while operating the computer system in the second mode, displaying, via the one or more display generation components, an indication that the computer system is operating in the second mode.

23. The non-transitory computer-readable storage medium of claim 22, the one or more programs further including instructions for:

displaying, via the one or more display generation components and concurrently with the indication that the computer system is operating in the second mode, a mode selection option;

while displaying the mode selection option, receiving, via the one or more input devices, one or more user inputs that correspond to selection of the mode selection option; and in response to receiving the one or more user inputs that correspond to selection of the mode selection option, transitioning the computer system from operating in the second mode to operating in the first mode.

24. The non-transitory computer-readable storage medium of claim 23, wherein the one or more user inputs that correspond to selection of the mode selection option includes:

a first user input corresponding to selection of the mode selection option; and a second user input subsequent to the first user input that is indicative of user confirmation of a user request to transition the computer system from operating in the second mode to operating in the first mode.

25. The non-transitory computer-readable storage medium of claim 16, the one or more programs further including instructions for:

in response to receiving the user input corresponding to selection of the first selectable option, transitioning the computer system from operating in a first mode of operation to operating in a second mode of operation, wherein:

in the first mode of operation, the visual content is not permitted to be displayed while the one or more error conditions pertaining to motion of the computer system persist; and in the second mode of operation, the visual content is permitted to be displayed while the one or more error conditions pertaining to motion of the computer system persist; and transitioning the computer system from a powered off state to a powered on state, wherein:

in accordance with a determination that the computer system was operating in the first mode of operation when the computer system was most recently transitioned from the powered on state to the powered off state, the computer system is operated in the first mode of operation when transitioned from the powered off state to the powered on state; and in accordance with a determination that the computer system was operating in the second mode of operation when the computer system was most recently transitioned from the powered on state to the powered off state, the computer system is operated in the second mode of operation when transitioned from the powered off state to the powered on state.

26. The non-transitory computer-readable storage medium of claim 16, the one or more programs further including instructions for:
in response to receiving the user input corresponding to selection of the first selectable option, transitioning the computer system from operating in a first state to operating in a second state, wherein:
in the first state, the visual content is not permitted to be displayed while the one or more error conditions pertaining to motion of the computer system persist; and
in the second state, the visual content is permitted to be displayed while the one or more error conditions pertaining to motion of the computer system persist;
while operating the computer system in the second state, detecting that the computer system has been operating in the second state for a threshold duration of time; and
in response to detecting that the computer system has been operating in the second state for the threshold duration of time, transitioning the computer system from operating in the second state to operating in the first state.

27. The non-transitory computer-readable storage medium of claim 16, the one or more programs further including instructions for:
in response to receiving the user input corresponding to selection of the first selectable option, transitioning the computer system from operating in a first state of operation to operating in a second state of operation, wherein:
in the first state of operation, the visual content is not permitted to be displayed while the one or more error conditions pertaining to motion of the computer system persist; and
in the second state of operation, the visual content is permitted to be displayed while the one or more error conditions pertaining to motion of the computer system persist;
while operating the computer system in the second state of operation, detecting that one or more device context criteria are satisfied; and
in response to detecting that the one or more device context criteria are satisfied, transitioning the computer system from operating in the second state of operation to operating in the first state of operation.

28. The non-transitory computer-readable storage medium of claim 27, wherein the one or more device context criteria include a calendar criterion that is satisfied based on calendar information.

29. The non-transitory computer-readable storage medium of claim 27, wherein the one or more device context criteria include a vehicle connection criterion that is satisfied when the computer system transitions from being connected to one or more systems corresponding to a vehicle to no longer being connected to one or more systems corresponding to a vehicle.

30. The non-transitory computer-readable storage medium of claim 27, wherein the one or more device context criteria include a digital wallet criterion that is satisfied when the computer system detects digital wallet information indicating that the computer system has completed scheduled travel.

31. A method, comprising:
at a computer system that is in communication with one or more display generation components and one or more input devices:
displaying, via the one or more display generation components, visual content that utilizes environment tracking of a physical environment that surrounds the computer system;
while displaying the visual content, detecting, via the one or more input devices, one or more error conditions pertaining to the environment tracking of the physical environment that surrounds the computer system;
in response to detecting the one or more error conditions pertaining to the environment tracking of the physical environment that surrounds the computer system:
ceasing display of the visual content; and
in accordance with a determination that the one or more error conditions pertain to motion of the computer system, displaying, via the one or more display generation components, a first selectable option that is selectable to re-display the visual content while the one or more error conditions persist;
while displaying the first selectable option and not displaying the visual content, receiving, via the one or more input devices, a user input corresponding to selection of the first selectable option; and
in response to receiving the user input corresponding to selection of the first selectable option, re-displaying, via the one or more display generation components, the visual content while the one or more error conditions pertaining to motion of the computer system persist.

32. The method of claim 31, wherein ceasing display of the visual content includes revealing at least a portion of representation of a three-dimensional environment.

33. The method of claim 31, further comprising:
in response to detecting the one or more error conditions pertaining to the environment tracking of the physical environment that surrounds the computer system:
in accordance with a determination that the one or more error conditions do not pertain to motion of the computer system, forgoing display of the first selectable option.

34. The method of claim 31, further comprising:
in response to detecting the one or more error conditions pertaining to the environment tracking of the physical environment that surrounds the computer system:
in accordance with a determination that the one or more error conditions pertain to lighting in the physical environment, forgoing display of the first selectable option.

35. The method of claim 31, further comprising:
subsequent to ceasing display of the visual content and while not displaying the visual content, ceasing to detect the one or more error conditions pertaining to the environment tracking of the physical environment; and
in response to ceasing to detecting the one or more error conditions pertaining to the environment tracking of the physical environment:
displaying, via the one or more display generation components, the visual content.

36. The method of claim 31, wherein:
displaying the visual content that utilizes environment tracking of the physical environment comprises:
displaying the visual content at a first position within a three-dimensional environment based on a detected ground plane in the physical environment; and
re-displaying the visual content while the one or more error conditions pertaining to motion of the computer system persist comprises:
displaying the visual content at a second position within the three-dimensional environment based on a simulated surface plane that does not rely on detection of a ground plane in the physical environment.

37. The method of claim 31, further comprising:
in response to receiving the user input corresponding to selection of the first selectable option, transitioning the computer system from operating in a first mode to operating in a second mode, wherein:
in the first mode, the visual content is not permitted to be displayed while the one or more error conditions pertaining to motion of the computer system persist; and
in the second mode, the visual content is permitted to be displayed while the one or more error conditions pertaining to motion of the computer system persist; and
while operating the computer system in the second mode, displaying, via the one or more display generation components, an indication that the computer system is operating in the second mode.

38. The method of claim 37, further comprising:
displaying, via the one or more display generation components and concurrently with the indication that the computer system is operating in the second mode, a mode selection option;
while displaying the mode selection option, receiving, via the one or more input devices, one or more user inputs that correspond to selection of the mode selection option; and
in response to receiving the one or more user inputs that correspond to selection of the mode selection option, transitioning the computer system from operating in the second mode to operating in the first mode.

39. The method of claim 38, wherein the one or more user inputs that correspond to selection of the mode selection option includes:
a first user input corresponding to selection of the mode selection option; and
a second user input subsequent to the first user input that is indicative of user confirmation of a user request to transition the computer system from operating in the second mode to operating in the first mode.

40. The method of claim 31, further comprising:
in response to receiving the user input corresponding to selection of the first selectable option, transitioning the computer system from operating in a first mode of operation to operating in a second mode of operation, wherein:
in the first mode of operation, the visual content is not permitted to be displayed while the one or more error conditions pertaining to motion of the computer system persist; and
in the second mode of operation, the visual content is permitted to be displayed while the one or more error conditions pertaining to motion of the computer system persist; and transitioning the computer system from a powered off state to a powered on state, wherein:
in accordance with a determination that the computer system was operating in the first mode of operation when the computer system was most recently transitioned from the powered on state to the powered off state, the computer system is operated in the first mode of operation when transitioned from the powered off state to the powered on state; and
in accordance with a determination that the computer system was operating in the second mode of operation when the computer system was most recently transitioned from the powered on state to the powered off state, the computer system is operated in the second mode of operation when transitioned from the powered off state to the powered on state.

41. The method of claim 31, further comprising:
in response to receiving the user input corresponding to selection of the first selectable option, transitioning the computer system from operating in a first state to operating in a second state, wherein:
in the first state, the visual content is not permitted to be displayed while the one or more error conditions pertaining to motion of the computer system persist; and
in the second state, the visual content is permitted to be displayed while the one or more error conditions pertaining to motion of the computer system persist;
while operating the computer system in the second state, detecting that the computer system has been operating in the second state for a threshold duration of time; and
in response to detecting that the computer system has been operating in the second state for the threshold duration of time, transitioning the computer system from operating in the second state to operating in the first state.

42. The method of claim 31, further comprising:
in response to receiving the user input corresponding to selection of the first selectable option, transitioning the computer system from operating in a first state of operation to operating in a second state of operation, wherein:
in the first state of operation, the visual content is not permitted to be displayed while the one or more error conditions pertaining to motion of the computer system persist; and
in the second state of operation, the visual content is permitted to be displayed while the one or more error conditions pertaining to motion of the computer system persist;
while operating the computer system in the second state of operation, detecting that one or more device context criteria are satisfied; and
in response to detecting that the one or more device context criteria are satisfied, transitioning the computer system from operating in the second state of operation to operating in the first state of operation.

43. The method of claim 42, wherein the one or more device context criteria include a calendar criterion that is satisfied based on calendar information.

44. The method of claim 42, wherein the one or more device context criteria include a vehicle connection criterion that is satisfied when the computer system transitions from being connected to one or more systems corresponding to a vehicle to no longer being connected to one or more systems corresponding to a vehicle.

45. The method of claim 42, wherein the one or more device context criteria include a digital wallet criterion that is satisfied when the computer system detects digital wallet information indicating that the computer system has completed scheduled travel.

* * * * *